US008090209B2

(12) United States Patent
Ogawa et al.

(10) Patent No.: US 8,090,209 B2
(45) Date of Patent: Jan. 3, 2012

(54) IMAGE CODING DEVICE, DIGITAL STILL CAMERA, DIGITAL CAMCORDER, IMAGING DEVICE, AND IMAGE CODING METHOD

(75) Inventors: Mayu Ogawa, Osaka (JP); Kunihiro Imamura, Osaka (JP); Shinji Kitamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/069,708

(22) Filed: Mar. 23, 2011

(65) Prior Publication Data

US 2011/0170794 A1    Jul. 14, 2011

Related U.S. Application Data

(63) Continuation of application No. PCT/JP2009/004642, filed on Sep. 16, 2009.

(30) Foreign Application Priority Data

Sep. 25, 2008   (JP) ................................ 2008-245478

(51) Int. Cl.
*G06K 9/36* (2006.01)
(52) U.S. Cl. ........ 382/251; 382/232; 382/233; 382/250; 375/240.01; 375/240.03
(58) Field of Classification Search .................. 382/232, 382/233, 250, 251, 270, 271, 272, 273; 348/405, 348/384.1, 440; 375/240.01, 240.03, 240.12, 375/240.16; 358/426.01, 426.16; 345/555
See application file for complete search history.

(56) References Cited

U.S. PATENT DOCUMENTS

| 4,984,076 | A | | 1/1991 | Watanabe et al. |
| 5,337,087 | A | * | 8/1994 | Mishima ................... 375/240.04 |
| 5,623,424 | A | * | 4/1997 | Azadegan et al. ............ 708/203 |
| 6,831,947 | B2 | * | 12/2004 | Ribas Corbera ......... 375/240.03 |
| 7,110,608 | B2 | * | 9/2006 | Chan et al. ..................... 382/239 |
| 2002/0181583 | A1 | * | 12/2002 | Corbera ................... 375/240.03 |
| 2003/0169811 | A1 | | 9/2003 | Kitamura et al. |
| 2005/0063461 | A1 | * | 3/2005 | Lee et al. ................. 375/240.03 |

(Continued)

FOREIGN PATENT DOCUMENTS

| JP | 2002-152757 | 5/2002 |
| JP | 2006-148235 | 6/2006 |
| JP | 2006-261835 | 9/2006 |

(Continued)

OTHER PUBLICATIONS

International Search Report and Written Opinion for PCT/JP2009/004642, dated Nov. 24, 2009 along with an english translation of ISR.

*Primary Examiner* — Samir Ahmed
*Assistant Examiner* — Ali Bayat
(74) *Attorney, Agent, or Firm* — Greenblum & Bernstein,P.L.C.

(57) ABSTRACT

Coding processing performed by an image coding device (100) includes: processing (S133) of performing coding by leaving surplus bit(s), when the digit number B of binary data of the difference value between (a) a value of a to-be-coded pixel and (b) a prediction value is smaller than the predetermined bit number M; and processing (S133) of performing coding by using the surplus bit(s), when the digit number B is greater than M and there are the surplus bit(s). Pieces of coded data each having a predetermined coding amount are generated, by performing processing for each of consecutive T pixels so as to perform the coding processing for each of U pixels among the consecutive T pixels (S136).

20 Claims, 22 Drawing Sheets

| U.S. PATENT DOCUMENTS | | | | FOREIGN PATENT DOCUMENTS | | |
|---|---|---|---|---|---|---|
| 2005/0157785 A1 | 7/2005 | Kitamura et al. | | JP | 2007-036566 | 2/2007 |
| 2005/0175094 A1 | 8/2005 | Kitamura et al. | | JP | 2007-181051 | 7/2007 |
| 2006/0222241 A1 | 10/2006 | Sasaki | | WO | 02/080567 | 10/2002 |
| 2010/0142811 A1 | 6/2010 | Okamoto et al. | | | | |

\* cited by examiner

FIG. 6

| Prediction Difference Absolute Value | Prediction Difference Binary Digit Number | Code-Added Prediction Difference Binary Digit Number | Quantization Width Q | Surplus Bit Number |
|---|---|---|---|---|
| 0~31 | 5 | 6 | 0 | 2 |
| 32~63 | 6 | 7 | 0 | 1 |
| 64~127 | 7 | 8 | 0 | 0 |
| 128~255 | 8 | 9 | 1 | 0 |
| 256~511 | 9 | 10 | 2 | 0 |
| 512~1023 | 10 | 11 | 3 | 0 |
| 1024~2047 | 11 | 12 | 4 | 0 |
| 2048~4095 | 12 | 13 | 6 | 0 |

DT100

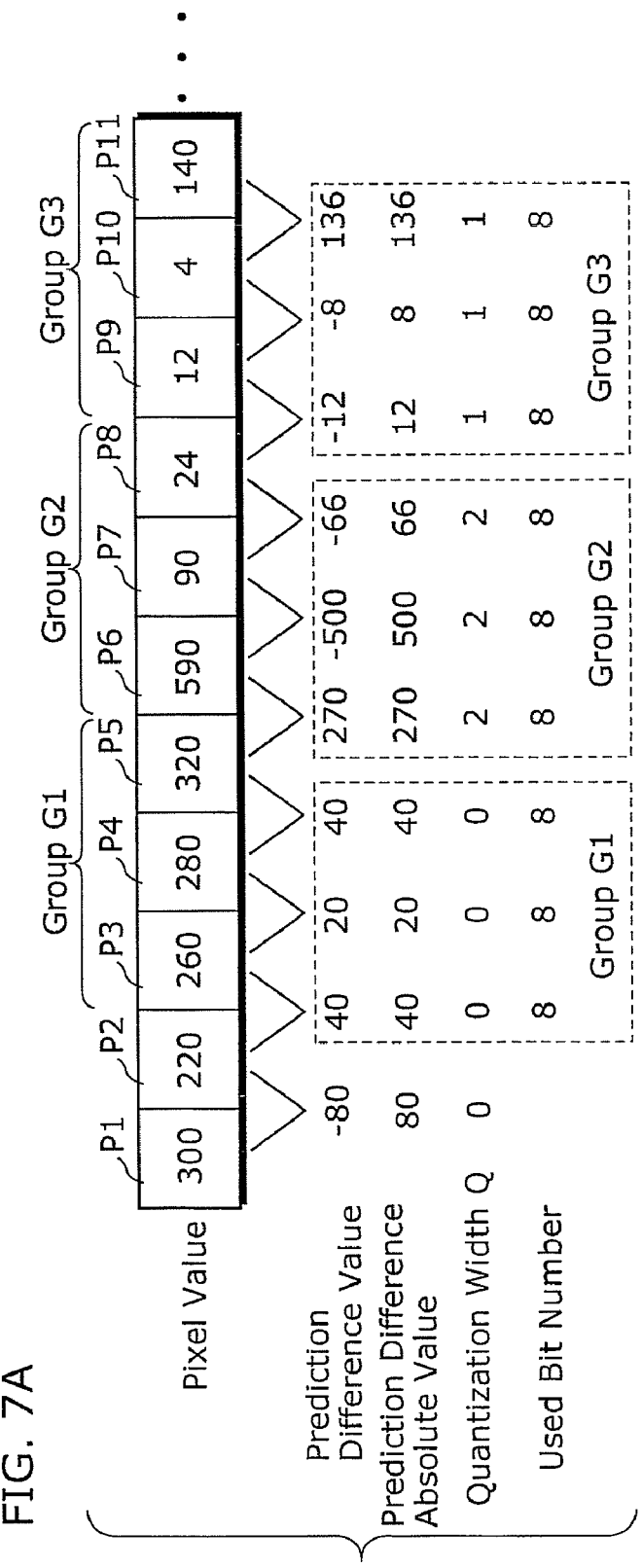
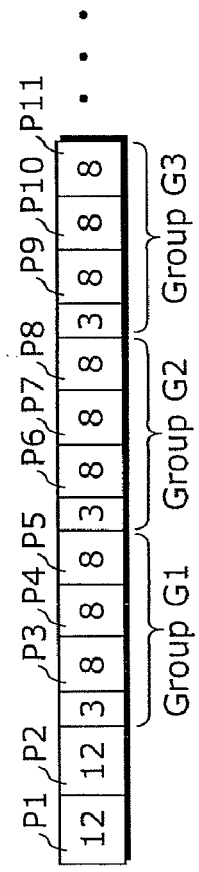
FIG. 7A
FIG. 7B

FIG. 8

| Code | Prediction Difference Absolute Value | Prediction Difference Binary Digit Number | Code-Added Prediction Difference Binary Digit Number | Quantization Width Q | Surplus Bit Number |
|---|---|---|---|---|---|
| 000 | 0~31 | 5 | 6 | 0 | 2 |
| 001 | 32~63 | 6 | 7 | 0 | 1 |
| 010 | 64~127 | 7 | 8 | 0 | 0 |
| 011 | 128~255 | 8 | 9 | 1 | 0 |
| 100 | 256~511 | 9 | 10 | 2 | 0 |
| 101 | 512~1023 | 10 | 11 | 3 | 0 |
| 110 | 1024~2047 | 11 | 12 | 4 | 0 |
| 111 | 2048~4095 | 12 | 13 | 6 | 0 |

DT110

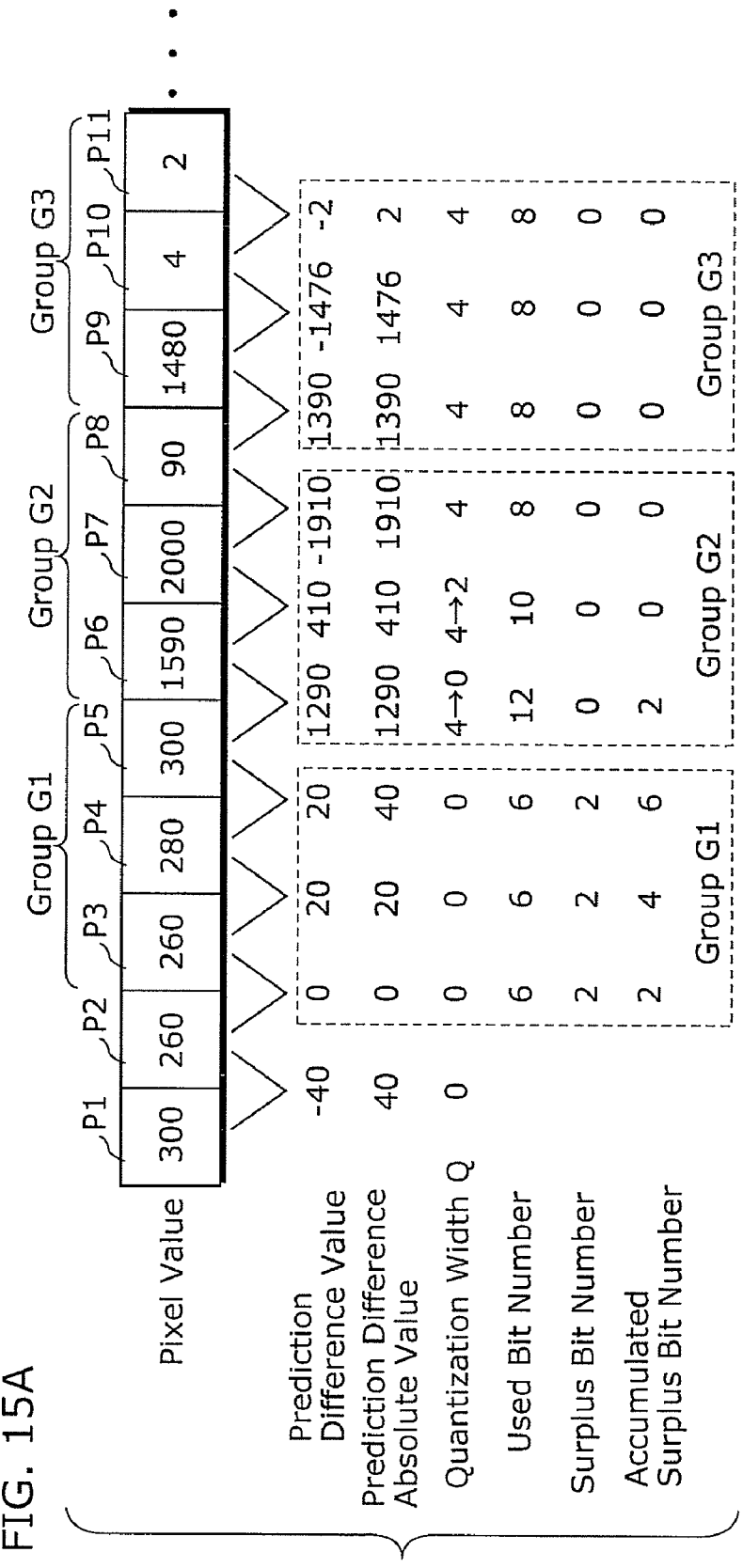
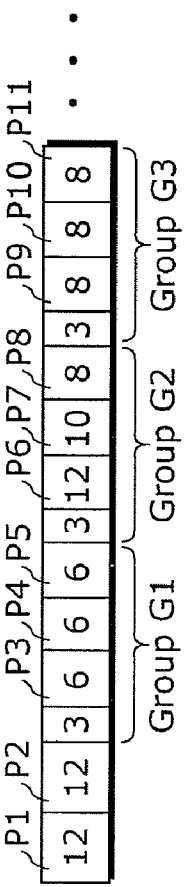
FIG. 15A
FIG. 15B

IMAGE CODING DEVICE, DIGITAL STILL CAMERA, DIGITAL CAMCORDER, IMAGING DEVICE, AND IMAGE CODING METHOD

CROSS REFERENCE TO RELATED APPLICATION(S)

This is a continuation application of PCT application No. PCT/JP2009/004642 filed on Sep. 16, 2009, designating the United States of America.

BACKGROUND OF THE INVENTION (1) Field of the Invention

The present invention relates to devices and methods for coding image.

(2) Description of the Related Art

In resent years, with the increase of pixels in imaging devices used in image capturing apparatuses such as digital still cameras and digital camcorders, an amount of image data processed by an integrated circuit embedded in such an apparatus has been increased. In order to allow the integrated circuit in the image capturing apparatus to handle a large amount of image data, speeding-up of operation frequency, increase of a memory capacity, and the like are considered to secure a bus width of data transfer in the integrated circuit. However, the above results directly in cost increase.

Moreover, in general, after the integrated circuit completes all image processing, the image capturing apparatus such as a digital still camera or a digital camcorder performs compression processing for the image data when the image data is to be recorded onto an external recording device such as a memory card. After that, the image capturing apparatus records the compressed data generated by the compression processing onto the external recording device. In the compression processing, a coding method such as Joint Photographic Experts Group (JPEG) or Moving Picture Experts Group (MPEG) is used. Therefore, it is possible to record, onto the external recording device, image data with a size larger or with an amount larger than the case where the image data is not compressed.

Patent Reference 1 discloses a technique of performing such image data compression processing, not only for data for which image processing has been performed, but also for pixel signals (raw data) provided from an imaging device. This technique makes it possible to increase the number of continuous capturing pictures of the same size for the same memory capacity. In addition, Patent Reference 1 discloses a digital signal compression coding device and a digital signal decoding device, each of which does not need a memory to realize a high compression rate in a state where a low coding operation processing load is secured.

On the other hand, Patent Reference 2 discloses an image coding device capable of printing, at high accuracy and at high speed, a print object on which various pieces of image data having different properties are mixed, such as a poster or an advertisement on which single-color characters or graphics are included in a natural image such as a photograph. Since image properties of the characters or graphics differ from image properties of the natural image, adoption of the same coding method deteriorates image quality.

The image coding device disclosed in Patent Reference 2 includes an irreversible coding unit for coding pixel data by fixed length codes, a reversible coding unit, a surplus code counter, and a coding control unit.

When a compression rate of pixel data of a to-be-coded pixel is higher than a specified compression rate, the reversible coding unit codes the pixel data of the to-be-coded pixel by leaving surplus code(s) from fixed length codes. On the other hand, when a compression rate of pixel data of a to-be-coded pixel is lower than the specified compression rate, the reversible coding unit codes the pixel data of the to-be-coded pixel by consuming the surplus code(s) added to the fixed length codes.

The surplus code counter counts up the surplus code(s) from the fixed length codes when the reversible coding unit codes the image data, and counts down the surplus code(s) consumed by the reversible coding unit. The coding control unit performs processing for continuing coding operations of the reversible coding unit, in a range where a count value of a surplus counter is not lower than the specified compression rate. The image coding device performing the above-described processing can improve data reproducibility.

Prior Arts

Patent References

Patent Reference 1: Japanese Unexamined Patent Application Publication No. 2007-036566

Patent Reference 2: Japanese Unexamined Patent Application Publication No. 2007-181051

DISCLOSURE OF INVENTION

Problems that Invention is to Solve

However, the digital signal compression coding device disclosed in Patent Reference 1, a zone quantization width determination unit 201 shown in FIG. 21 quantizes, by a fixed quantization width (zone quantization width), each pixel value included in a "zone" that means a group of neighboring pixels.

The zone quantization width is equal to a difference between (a) a value which corresponds to a maximum pixel value difference and is calculated by adding 1 to a quantization range value and (b) the number of compression coding pixel data bits (s). Here, the maximum pixel value difference is a maximum value of a difference value (hereinafter, referred to as a "pixel difference value") between a value of each pixel included in a zone and a value of a neighboring same-color pixel. Furthermore, the quantization range value represents the number of digits required to express an absolute value of the pixel difference value by binary number. Moreover, the number of compression coding pixel data bits (s) is the number of bits of data generated by performing compression coding for pixel value data.

Thereby, even if a sharp edge exists in the zone and only a difference value of a certain single pixel is large, all pixels in the same zone are influenced by it and the quantization width is increased. Therefore, the digital signal compression coding device disclosed in Patent Reference 1 causes quantization errors more than necessary, even if a difference value is small and quantization is not so necessary. As a result, there is a problem that a degree of deterioration of image quality is large.

On the other hand, in the image coding device disclosed in Patent Reference 2, a surplus code counter 301 shown in FIG. 22 counts up or down surplus code(s) from or added to the fixed length codes, and manages the counted count value. Thereby, the image coding device controls the reversible coding processing to be continued.

In addition, in the reversible coding processing, if a value of a to-be-coded pixel X is registered in a dictionary, an index of the value in the dictionary is coded. If the value of the to-be-coded pixel X is not registered in the dictionary, a neighboring pixel value evaluation unit 302 calculates a correlation among a plurality of pixels (P, A, B) positioned prior and subsequent to the to-be-coded pixel, and codes a code indicating the correlation.

In other words, if the value of the to-be-coded pixel X is not registered in the dictionary, the to-be-coded pixel X and the plurality of codes prior and subsequent to the to-be-coded pixel X are coded by the same code. Therefore, if the reversible coding processing disclosed in Patent Reference 2 is performed, the coded data is expressed by a variable length. In other words, the data coded by the reversible coding processing disclosed in Patent Reference 2 is variable length coded data. Therefore, when decoding the variable length coded data, the data is traced from a beginning of the compressed variable length coded data in the same order as the image scanning order used in the coding processing.

On the other hand, in image processing performed by integrated circuit generally embedded in a digital still camera or the like, digital pixel signals provided from an imaging device are temporarily stored in a memory such as a Synchronous Dynamic Random Access Memory (SDRAM). Then, the integrated circuit performs, for the temporarily stored data, predetermined image processing, YC signal generation processing, zoom processing such as enlarging and reducing, and the like. After that, the integrated circuit temporarily stores the resulting data into the SDRAM again.

In the above processing, for example, when image of a desired region is to be cut out from the stored image, when image processing requiring reference/correlation between above and below pixels is to be performed, it is often required to read pixel data of the desired region from the memory. In this case, if the image data stored in the memory is variable length coded data, it is impossible to specify the region where image data of the desired region is stored. In other words, the image data of the desired region cannot be read from the memory. Therefore, if the image data stored in the memory is variable length coded data, random accessibility is lost.

The present invention is made to solve the above-described problems. An object of the present invention is to provide an image coding device and the like which are capable of reducing a degree of deterioration of image quality, while keeping random accessibility

SUMMARY OF THE INVENTION

In accordance with an aspect of the present invention for solving the above-described problems, there is provided an image coding device that codes image, the image coding device performing coding processing for coding image, the image including a plurality of pixels which are previously ordered, the coding processing including: when a digit number B of binary data of a difference value between (a) a value of a to-be-coded pixel that is a pixel to be coded and (b) a prediction value that is a value generated by predicting the value of the to-be-coded pixel is smaller than a predetermined bit number M, processing of coding the difference value corresponding to the digit number B smaller than M by leaving J surplus bit which are calculated by M−B; and when the digit number B is greater than M and there are K surplus bit, processing of coding the difference value corresponding to the digit number B greater than M by using L surplus bit, where L≦K, and the image coding device generating pieces of coded data each having a predetermined coding amount, by performing processing for each of consecutive T pixels, where T≧2, among the plurality of pixels so as to perform the coding processing for each of U pixels, where U≦T, among the consecutive T pixels, wherein the pieces of coded data each having the predetermined coding amount are pieces of data necessary to reconstruct the image, and each of the pieces of coded data each having the predetermined coding amount is a piece of data necessary to reconstruct the corresponding T pixels.

More specifically, the coding processing performed by the image coding device includes: performing coding by leaving surplus bit(s), when the digit number B of binary data of the difference value between (a) a value of a to-be-coded pixel and (b) a prediction value is smaller than the predetermined bit number M; and performing coding by using the surplus bit(s), when the digit number B is greater than M and there are the surplus bit(s). Pieces of coded data each having a predetermined coding amount are generated, by performing processing for each of consecutive T pixels so as to perform the coding processing for each of U pixels among the consecutive T pixels. The pieces of coded data each having the predetermined coding amount are pieces of data necessary to reconstruct the image.

Therefore, since surplus bit(s) is used to perform coding when there is the surplus bit(s), it is possible to reduce a degree of deterioration of image quality of the image which is caused by coding. In addition, pieces of coded data each having a predetermined coding amount are generated. Therefore, if the generated pieces of coded data each having the predetermined coding amount are stored into a memory or the like, it is possible to easily specify a piece of coded data corresponding to a pixel at a specific position in the image. As a result, random accessibility for the pieces of coded data can be kept.

Therefore, the present invention can reduce a degree of deterioration of image quality of the image while keeping random accessibility.

EFFECTS OF THE INVENTION

An image coding device codes image, the image coding device performing coding processing for coding image, the image including a plurality of pixels which are previously ordered, the coding processing including: when a digit number B of binary data of a difference value between (a) a value of a to-be-coded pixel that is a pixel to be coded and (b) a prediction value that is a value generated by predicting the value of the to-be-coded pixel is smaller than a predetermined bit number M, processing of coding the difference value corresponding to the digit number B smaller than M by leaving J surplus bit which are calculated by M−B; and when the digit number B is greater than M and there are K surplus bit, processing of coding the difference value corresponding to the digit number B greater than M by using L surplus bit, where L≦K, and the image coding device generating pieces of coded data each having a predetermined coding amount, by performing processing for each of consecutive T pixels, where T≧2, among the plurality of pixels so as to perform the coding processing for each of U pixels, where U≦T, among the consecutive T pixels, wherein the pieces of coded data each having the predetermined coding amount are pieces of data necessary to reconstruct the image, and each of the pieces of coded data each having the predetermined coding amount is a piece of data necessary to reconstruct the corresponding T pixels.

Therefore, since surplus bit(s) is used to perform coding when there is the surplus bit(s), it is possible to reduce a degree of deterioration of image quality of the image which is caused by coding. In addition, pieces of coded data each having a predetermined coding amount are generated. Therefore, if the generated pieces of coded data each having the predetermined coding amount are stored into a memory or the like, it is possible to easily specify a piece of coded data corresponding to a pixel at a specific position in the image. As a result, random accessibility for the pieces of coded data can be kept.

Therefore, the present invention can reduce a degree of deterioration of image quality of the image while keeping random accessibility.

FURTHER INFORMATION ABOUT TECHNICAL BACKGROUND TO THIS APPLICATION

The disclosure of Japanese Patent Application No. 2008-245478 filed on Sep. 25, 2008 including specification, drawings and claims is incorporated herein by reference in its entirety.

The disclosure of PCT application No. PCT/P2009/004642 filed on Sep. 16, 2009, including specification, drawings and claims is incorporated herein by reference in its entirety.

BRIEF DESCRIPTION OF THE DRAWINGS

FIG. 6 is a diagram showing a data table as an example.

FIG. 7A is a diagram for explaining coding processing without using any surplus bits.

FIG. 7B is a diagram for explaining coding processing without using any surplus bits.

FIG. 8 is a diagram showing a data table as an example.

FIG. 15A is a diagram for explaining image coding processing in the case where the number of used surplus bits is not controlled.

FIG. 15B is a diagram for explaining image coding processing in the case where the number of used surplus bits is not controlled.

DESCRIPTION OF THE PREFERRED EMBODIMENT(S)

Figure 1:
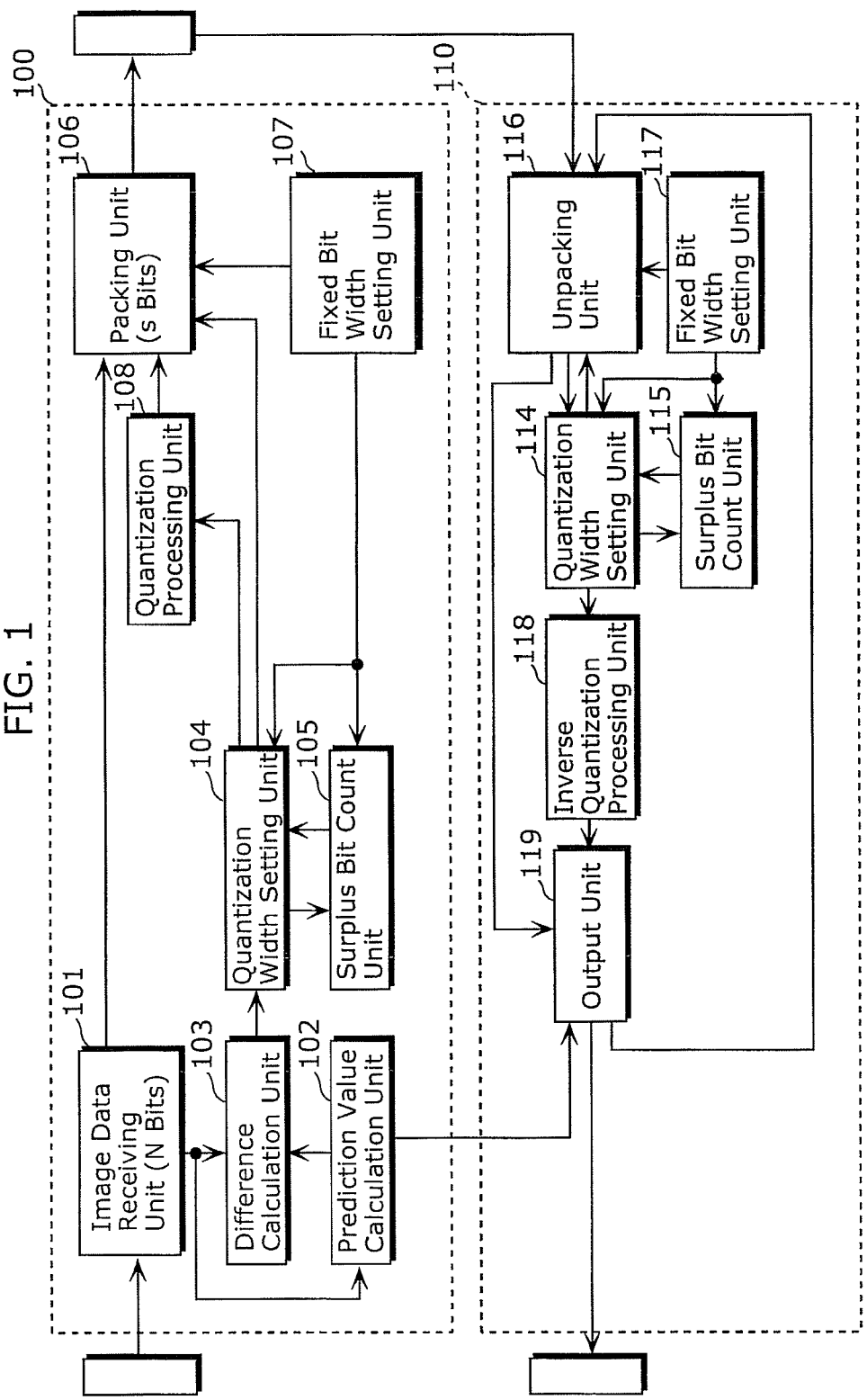
FIG. 1 is a block diagram showing structures of an image coding device and an image decoding device according to a first embodiment of the present invention.

The following describes embodiments of the present invention with reference to the drawings. It should be noted in the following description of various embodiments and variations that the same reference numerals are assigned to the identical structural elements having the identical functions, so that the identical structural elements are explained only once.

First Embodiment

FIG. 1 is a block diagram showing structures of an image coding device 100 and an image decoding device 110 according to the first embodiment of the present invention.

(Coding Processing Performed by Image Coding Device)

First, description is given for processing performed by the image coding device 100 to code image (hereinafter, referred to as "image coding processing") with reference to FIGS. 1, 2, and 3.

Figure 2:
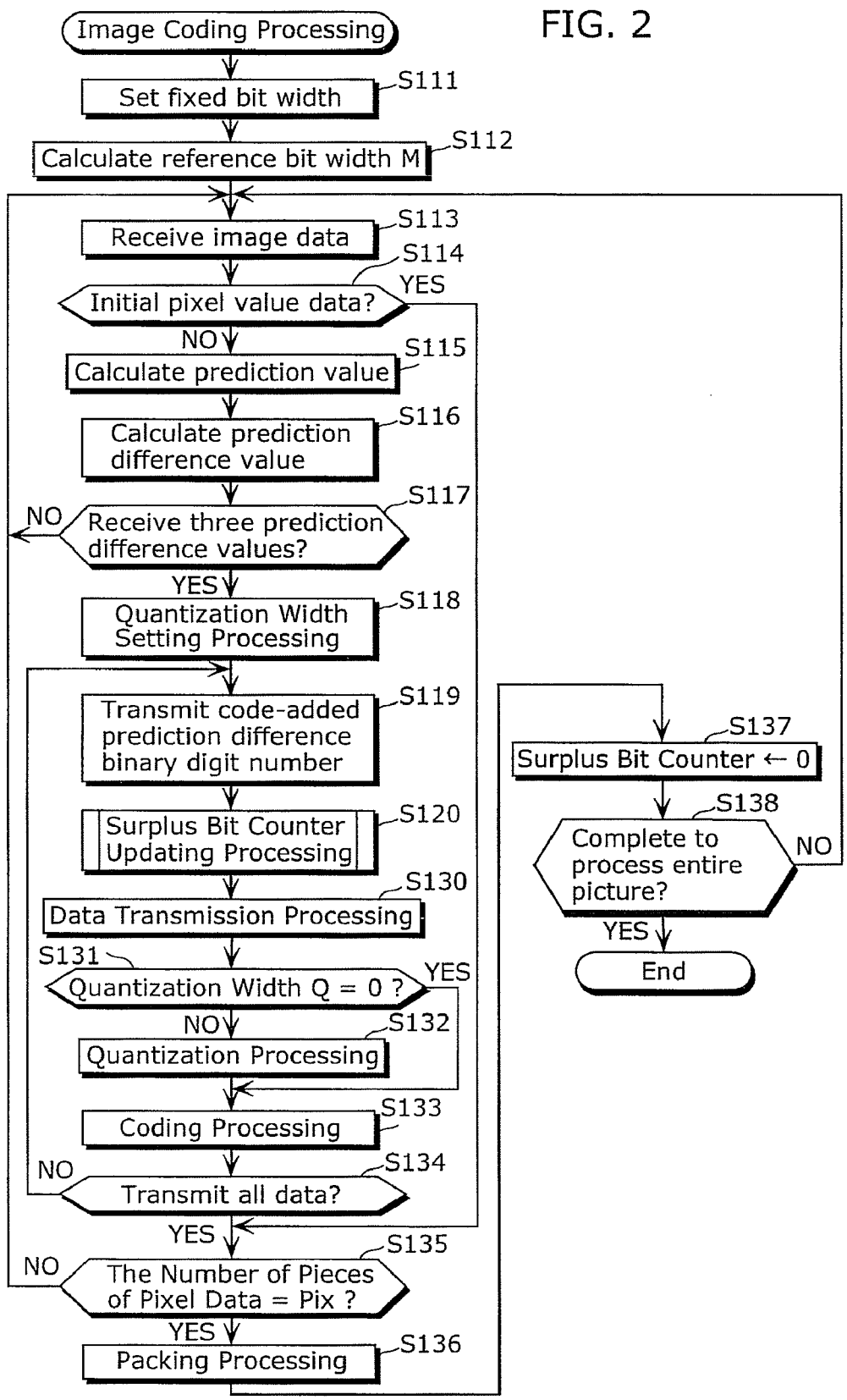
FIG. 2 is a flowchart of image coding processing.

FIG. 2 is a flowchart of the image coding processing. FIG. 3 is a flowchart of surplus bit counter updating processing performed in the image coding processing.

The image coding device 100 includes a pixel data receiving unit 101, a prediction value calculation unit 102, a difference calculation unit 103, a quantization processing unit 108, and a packing unit 106.

The pixel data receiving unit 101 sequentially receives pieces of pixel data from an imaging device 1312 that will be described later. The pixel data receiving unit 101 includes a buffer not shown. The buffer is a memory on which at least one piece of pixel data can be recorded.

Figure 4:
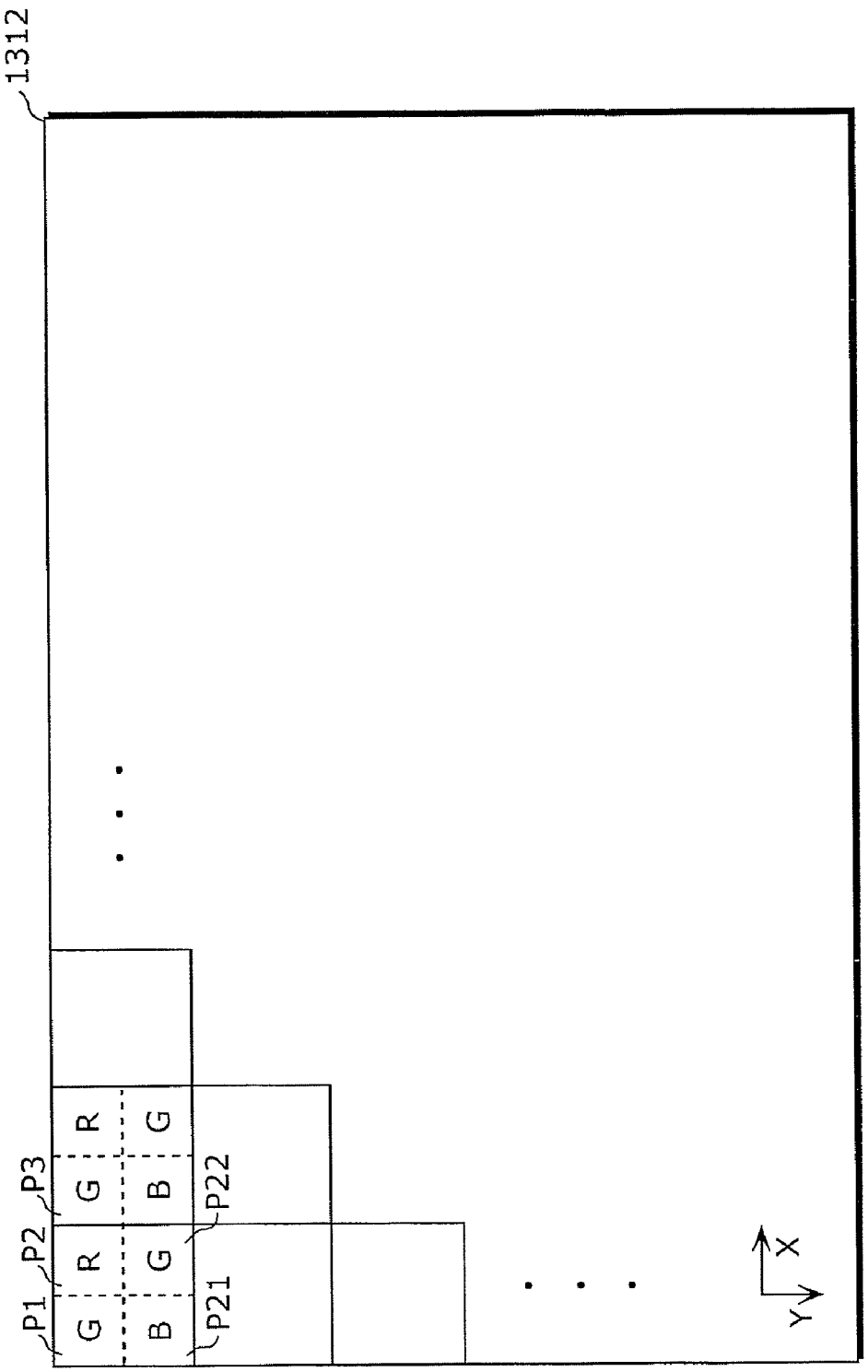
FIG. 4 is a diagram showing an imaging device as an example.

FIG. 4 is a diagram showing the imaging device 1312 as an example. As shown in FIG. 4, in the imaging device 1312, a plurality of pixels are arranged in rows and columns. Here, it is assumed in the imaging device 1312 that xa pieces of pixels are arranged in an X direction, and that ya pieces of pixels are arranged in an Y direction.

Each of the pixels has a color filter of one of red (R), green (G), and blue (B). The color filters in the imaging device 1312 are arrayed, for example, in a Bayer pattern. In this example, one pixel among a plurality of pixels forming one picture is, for example, expressed by a pixel P1, P2, P21, and P22.

For example, the pixel P1 has a color filter of green (G), and a pixel P2 has a color filter of red (R). Furthermore, the pixel P21 has a color filter of blue (B), and a pixel P22 has a color filter of green (G).

The pixel data receiving unit 101 sequentially receives pieces of pixel data of pixels from a pixel (pixel P1) in the first row and the first column to a pixel in the first row and the xa-th column. In other words, the pixel data receiving unit 101 sequentially receives pieces of pixel data of pixels from the first column to the xa-th column in the same row. For example, the pixel data receiving unit 101 sequentially receives pieces of data of pixels P1, P2, P3, . . . .

Here, after the pixel data receiving unit 101 receives a piece of pixel data of a pixel in the xa-th column in the same row, the pixel data receiving unit 101 receives a piece of pixel data of a pixel in the first column in a next row. By repeating the above-described processing, the pixel data receiving unit 101 finally receives a piece of data of a pixel in the ya-th row and xa-th column.

Although details will be described later, the pieces of pixel data are assumed to be coded in units of fixed bit width. The fixed bit width indicates a data amount (bits) obtained by coding pixel data. The fixed bit width is assumed to be s (where s is a natural number). Although details will be described later, the image coding device 100 outputs, in units of the fixed bit width, pieces of data having the fixed bit width (s bits) which are generated by coding pieces of pixel data.

Hereinafter, a piece of pixel data of a color (for example, red, blue, green, or the like), which is processed first when pieces of pixel data are coded in units of the fixed bit width (s bits), is refereed to as an initial pixel value data. For example, a piece of data of the pixel P1 shown in FIG. 4 is an initial pixel value data of green. Furthermore, a piece of data of the pixel P2 is an initial pixel value data of red. Still further, in the first embodiment, each piece of pixel data received by the pixel data receiving unit 101 is assumed to be a piece of digital data (N=12) having a 12-bit length. In other words, each pixel value of pixel data received by the pixel data receiving unit 101 is assumed to be expressed by 12 bits.

The pixel data receiving unit 101 stores a received piece of pixel data into an internal buffer. Here, if the pixel data receiving unit 101 receives a new piece of pixel data while the internal buffer stores the piece of pixel data, the pixel data receiving unit 101 provides the piece of pixel data stored in the initial buffer to the prediction value calculation unit 102. Furthermore, the pixel data receiving unit 101 provides the received new piece of pixel data to the difference calculation unit 103. Moreover, the pixel data receiving unit 101 overwrites the new pixel data onto the internal buffer to be stored therein.

As shown in FIG. 1, the pixel data receiving unit 101 provides the received piece of pixel data to the prediction value calculation unit 102 and the difference calculation unit 103 at an appropriate timing. Hereinafter, a piece of the n-th pixel data received by the pixel data receiving unit 101 is referred to simply as the "n-th pixel data".

More specifically, when the pixel data receiving unit 101 receives the n-th pixel data (where n is a natural number of 2 or more), the pixel data receiving unit 101 provides the (n−1)th pixel data to the prediction value calculation unit 102, and provides the n-th pixel data to the difference calculation unit 103.

If the received piece of pixel data is an initial pixel value data (YES at S114 in FIG. 2), then the pixel data receiving unit 101 provides the received piece of pixel data to the packing unit 106.

Hereinafter, a target pixel to be coded is referred to as a "to-be-coded pixel". Furthermore, a pixel value of the to-be-coded pixel is referred to as a "to-be-coded pixel value". Still further, a piece of pixel data indicating the to-be-coded pixel value is referred to as a "to-be-coded pixel data". The to-be-coded pixel data is assumed to be the n-th pixel data that has been described earlier.

Each piece of pixel data received by the prediction value calculation unit 102 is one of the first pixel data, the second pixel data, and the third pixel data which are described below.

The first pixel data is a piece of pixel data which is received by the pixel data receiving unit 101 prior to the to-be-coded pixel data. The second pixel data is a piece of pixel data that indicates a value calculated by an operation using pieces of pixel data which are received by the pixel data receiving unit 101 prior to the to-be-coded pixel data. The third pixel data is a piece of pixel data that is generated by decoding, by the image decoding device 110, a piece of coded data that has been generated by coding, by the image coding device 100, a piece of pixel data prior to the to-be-coded pixel data.

The prediction value calculation unit 102, which will be described in detail later, calculates a prediction value of the to-be-coded pixel data using a received piece of pixel data (S115 in FIG. 2).

Here, one of methods for coding pixel data is a prediction coding method. The prediction coding method is a coding method by which a prediction value, which will be described later, for the to-be-coded pixel is calculated, and then a difference value between a value of the to-be-coded pixel and the calculated prediction value is quantized. Hereinafter, the prediction value for the to-be-coded pixel is referred to simply as a "to-be-coded pixel prediction value".

The to-be-coded pixel prediction value is a value that is generated by predicting the to-be-coded pixel value using values of one or more neighboring pixels of the to-be-coded pixel. The above employs characteristics that a value of a neighboring pixel of the to-be-coded pixel has a high possibility of having the same value as the to-be-coded pixel value or having a value close to the to-be-coded pixel value. In the prediction coding method, by employing the to-be-coded pixel prediction value, it is possible to calculate the calculated difference value as small as possible and thereby suppress a quantization width.

Figure 5:
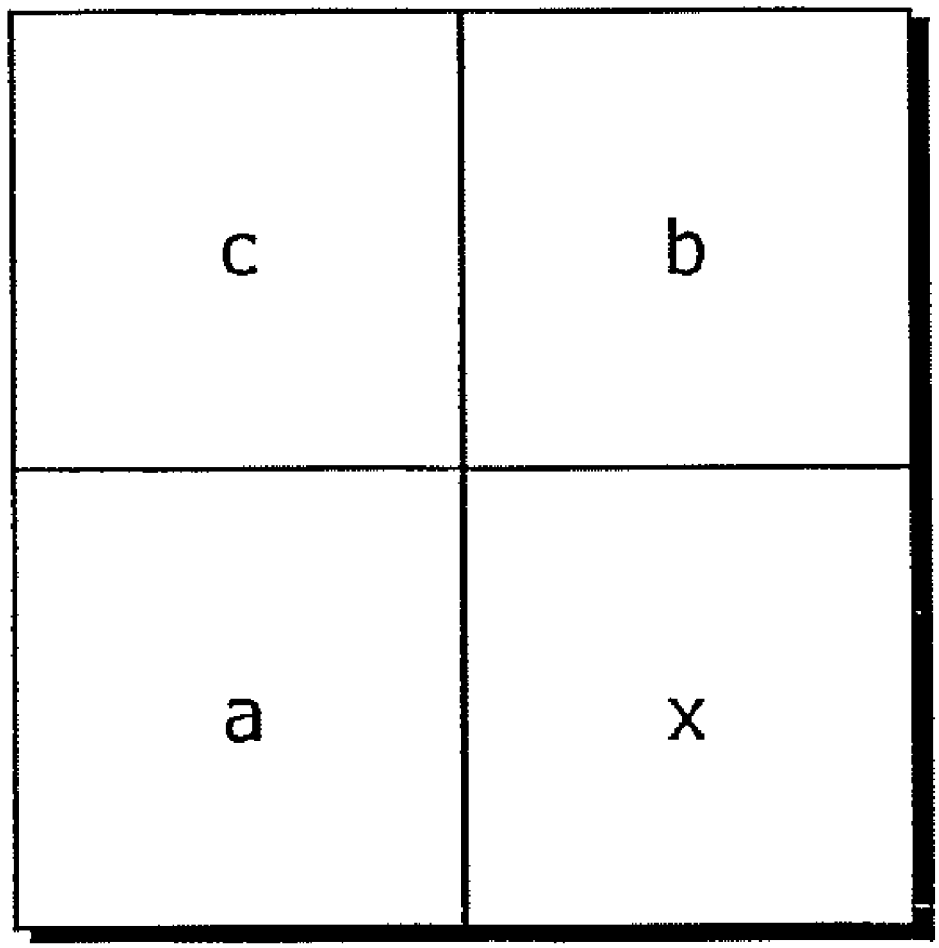
FIG. 5 is a diagram showing an arrangement of neighboring pixels of a to-be-coded pixel, which are used in calculating a prediction value.

FIG. 5 is a diagram showing an arrangement of neighboring pixels of the to-be-coded pixel, which are used in calculating the prediction value. "x" shown in FIG. 5 represents the to-be-coded pixel value. Furthermore, "a", "b", and "c" shown in FIG. 5 are pixel values of the neighboring pixels used to calculate the to-be-coded pixel prediction value "y". The following presents prediction equations (1) to (7) which are generally used to calculate a to-be-coded pixel prediction value.

$$y=a \quad \text{(Equation 1)}$$

$$y=b \quad \text{(Equation 2)}$$

$$y=c \quad \text{(Equation 3)}$$

$$y=a+b-c \quad \text{(Equation 4)}$$

$$y=a+(b-c)/2 \quad \text{(Equation 5)}$$

$$y=b+(a-c)/2 \quad \text{(Equation 6)}$$

$$y=(a+b)/2 \quad \text{(Equation 7)}$$

As described above, the prediction value calculation unit 102 calculates the to-be-coded pixel prediction value "y" using pixels values "a", "b", and "c" of neighboring pixels of the to-be-coded pixel. A prediction difference $\Delta(=y-x)$ between the prediction value "y" and the to-be-coded pixel "x" is calculated, and the prediction difference $\Delta$ is coded.

Using any one of the above-presented prediction equations (1) to (7) for a received piece of pixel data, the prediction value calculation unit 102 calculates a to-be-coded pixel prediction value and provides the calculated prediction value to the difference calculation unit 103.

It should be noted that the method of calculating a to-be-coded pixel prediction value a is not limited to the method using one of the prediction equations (1) to (7). For example, if it is possible to secure enough capacity of the internal memory buffer in compression processing, values of other neighboring pixels except pixels adjacent to the to-be-coded pixel are also held in the memory buffer and used in the prediction. Thereby, it is possible to enhance an accuracy of the prediction.

The image coding device 100 further includes a quantization width setting unit 104, a fixed bit width setting unit 107, and a surplus bit count unit 105. It should be noted that all or a part of units included in the image coding device 100 may be implemented as hardware. It should also be noted that all or a part of the units included in the image coding device 100 may be implemented as module(s) of a program executed by a Central Processing Unit (CPU) or the like.

The difference calculation unit 103 calculates a difference value between (a) the to-be-coded pixel value provided from the pixel data receiving unit 101 and (b) the prediction value provided from the prediction value calculation unit 102. Hereinafter, the difference value calculated by the difference calculation unit 103 is referred to as a "prediction difference value". The prediction difference value is a value calculated by subtracting the prediction value from the to-be-coded pixel value. The difference calculation unit 103 provides the calculated prediction difference value to the quantization width setting unit 104 (S116 in FIG. 2).

The fixed bit width setting unit 107 sets the previously-described fixed bit width according to instructions from the outside. Hereinafter, information indicating the fixed bit width is referred to as "fixed bit width information". Then, the fixed bit width setting unit 107 provides the fixed bit width information to the packing unit 106, the quantization width setting unit 104, and the surplus bit count unit 105.

It should be noted that the fixed bit width setting unit 107 may set the fixed bit width without any instructions from the outside.

In the first embodiment, as described previously, the fixed bit with is assumed to be s bits. The fixed bit width is, for example, set to a bus width of data transfer of a used integrated circuit (S111 in FIG. 2).

The quantization width setting unit 104 sets a quantization width Q of the prediction difference value, based on the prediction difference value that is provided from the difference calculation unit 103 regarding each to-be-coded pixel. The quantization width setting unit 104 outputs the prediction difference value and the set quantization width Q to the quantization processing unit 108.

Hereinafter, an absolute value of the prediction difference value is referred to as a "prediction difference absolute value". Furthermore, hereinafter, the number of digits of binary data expressing the prediction difference absolute value by binary number is referred to as a "prediction difference binary digit number" (in units of bits). Still further, hereinafter, the number of digits of binary data expressing the prediction difference value by binary number is referred to as a "code-added prediction difference binary digit number" (in units of bits).

The quantization width Q is a value calculated by subtracting a reference bit width M from a code-added prediction difference binary digit number. If the calculated value is a negative value, a value of the quantization width Q is "0". Here, the reference bit width M is a bit amount used to express one pixel.

The reference bit width M is calculated according to the following equation (8) based on the fixed bit width (s bits) provided from the fixed bit width setting unit 107. Here, if the calculated value of the reference bit width M has a value after the decimal point, the reference bit width truncates the value after the decimal point.

$$M=(s-N\times q)/(Pix-q)-\text{Code} \quad \text{(Equation 8)}$$

In the equation (8), s represents the fixed bit width. N represents a data amount (in units of bits) of pixel data provided to the pixel data receiving unit 101. q represents the number of pieces of pixel data as pieces of initial pixel value data, which are received by the packing unit 106 in performing coding for each fixed bit width (s bits). Pix represents the number of pixels to be included in coded data for each fixed bit width (s bits). A value of Pix is a predetermined value.

In the equation (8), Code represents quantization width information that indicates a quantization width Q in quantizing a to-be-coded pixel. Hereinafter, Code is referred to as "quantization width information Code". The quantization width information Code is expressed by one or more bits. For example, if the quantization width information Code is expressed by three bits, a value of Code calculated according to the equation (8) is "3".

The quantization width information Code is packed with the quantized pixel data by the packing unit 106, and the packed data is outputted (S136 in FIG. 2).

Here, it is also possible that a quantization width Q is calculated from a maximum value of the prediction difference absolute value (hereinafter, referred to as a "maximum pixel value difference") for each of pixels to be coded, and that the pixels to be coded are quantized by the same quantization width Q. Thereby, it is possible to decrease the number of bits allocated to the quantization width information Code.

However, if the number of pixels to be coded which correspond to the same Code is increased, there are disadvantages that an accuracy of quantization determination in units of pixel is deteriorated due to the use of the above-mentioned maximum pixel value difference, as disclosed in Patent Reference 1.

The surplus bit count unit 105 includes a surplus bit counter indicating the number of surplus bit. The surplus bit(s) is a bit(s) that is not used and then left when a quantized value of a prediction difference value or a prediction difference value is expressed in units of the reference bit width M.

The surplus bit counter indicates "0" in an initial state. If a code-added prediction difference binary digit number corresponding to a to-be-coded pixel is smaller than M bits (where M is a natural number), the surplus bit count unit 105 increments a value indicated by the surplus bit counter by a difference value between M and the code-added prediction difference binary number.

Figure 3:
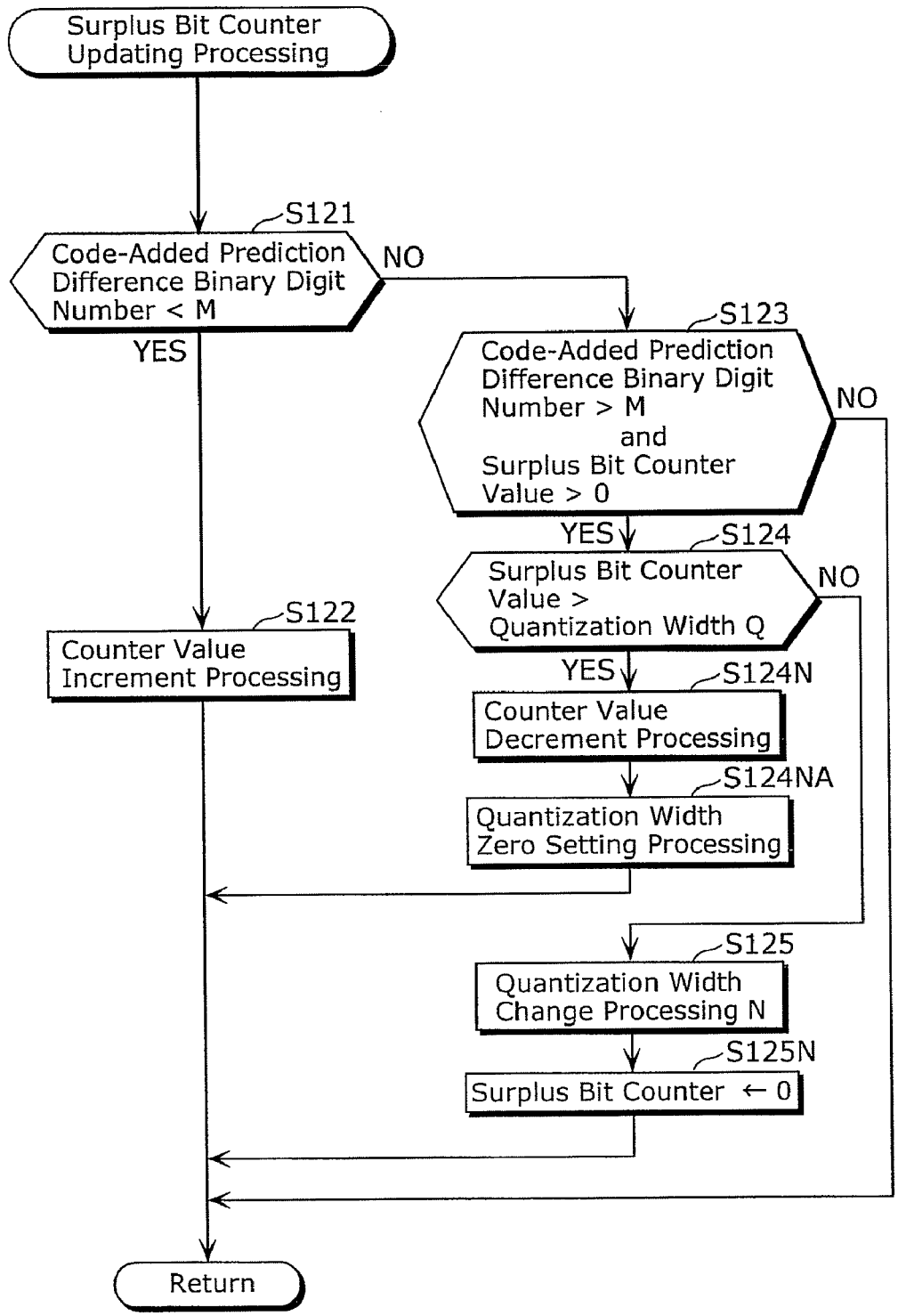
FIG. 3 is a flowchart of surplus bit counter updating processing performed in the image coding processing.

On the other hand, if the code-added prediction difference binary number is greater than M and the value indicated by the surplus bit counter is a positive value, the surplus bit count unit 105 provides information indicating the number of surplus bits to the quantization width setting unit 104, and decrements the value indicated by the surplus bit counter (S124N in FIG. 3).

Next, there is presented a data table DT100 indicating various pieces of data in the case of coding 12-bit pixel data when the reference bit width M is 8 bits.

FIG. 6 is a diagram showing the data table DT100 as an example. The "prediction difference absolute value" indicated in the data table DT100 is an absolute value of the prediction difference value which has been described earlier. The "prediction difference binary digit number", the "code-added prediction difference binary digit number", and the "quantization width Q" have already been explained earlier, and will not be therefore explained again.

A value of the quantization width Q indicated in the data table DT100 is a value calculated by subtracting the reference bit width M from the code-added prediction difference binary number, when the reference bit width M is 8 bits. Here, if the calculated value is a negative value, a value of the quantization width Q is "0".

The "surplus bit number" indicates the number of surplus bits. The surplus bit number is a value calculated by subtracting the code-added prediction difference binary number from the reference bit width M.

Here, it is assumed that the fixed bit width set by the fixed bit width setting unit 107 is 256 bits. It is also assumed that a data amount of pixel data provided to the pixel data receiving unit 101 is 12 bits. It is further assumed that the number of pieces of pixel data as pieces of initial pixel value data, which are received by the packing unit 106 in performing coding in units of the fixed bit width (s bits) is "2". It is still further assumed that the number of pixels to be included in coded data for each fixed bit width (s bits) is "26". It is still further assumed that the quantization width information Code is expressed by 1 bit.

In other words, it is assumed in the equation (8) that a value of s is "256", a value of N is "12", a value of q is "2", a value of Pix is "26", and a value of Code is "1". Under the assumption, according to the above-presented equation (8), M=(256−12×2)/(26−2)−1=26/3=8.7.

Therefore, the value of 8.7 truncates the value after the decimal point, in order to set the coded data amount to be equal to or smaller than 256 bits. Thereby, the reference bit width M is 8. In other words, basically, 12-bit pixel data is compressed to 8-bit pixel data. In this case, since 256/12=21.3, before the data compression, 256-bit data can indicate 21 pieces of 12-bit pixel data. On the other hand, after the data compression, 256-bit data can indicate 26 pieces of pixel data.

As shown in FIG. 6, if the code-added prediction difference binary number is smaller than the reference bit width M of "8" (YES at S121 in FIG. 3), the surplus bit count unit 105 increments a value of the surplus bit counter by a value that is calculated by subtracting the code-added prediction difference binary number from 8 (S122 in FIG. 3). As described above, the surplus bit counter indicates the number of surplus bits. Here, if the code-added prediction difference binary number is equal to or greater than the reference bit width M of "8", the value of the surplus bit counter is not incremented.

The quantization processing unit 108 performs quantization processing for quantizing a prediction difference value corresponding to a to-be-coded pixel, using the quantization width Q set by the quantization width setting unit 104. Then, the quantization processing unit 108 provides the packing unit 106 with data (hereinafter, referred to as "coded pixel data") that is generated by expressing, by binary number, a value obtained in the quantization processing. The quantization processing using the quantization width Q is processing of dividing the prediction difference value corresponding to the to-be-coded pixel by the Q-th power of 2. Here, if the quantization width Q is "0", the quantization processing unit 108 does not perform quantization processing. In this case, the pixel data (hereinafter, referred to as "coded pixel data") that is generated by expressing the prediction difference value by a designated bit number is provided to the packing unit 106.

The packing unit 106 combines (a) at least one initial pixel value data, (b) plural pieces of coded pixel data, and (c) quantization width information Code corresponding to at least one pixel, in order to pack them into s-bit data (S136 in FIG. 2).

Hereinafter, the data generated in the packing is referred to as "packing data". The packing unit 106 performs processing of storing the s-bit packing data into a memory such as a SDRAM, or performs processing of providing the s-bit packing data to the unpacking unit 116. Here, if there is/are any not-used bit(s) in the s-bit packing data, the packing unit 106 replaces the not-used bit(s) by dummy data.

Each of FIGS. 7A and 7B is a diagram for explaining coding processing without using any surplus bits.

Here, it is assumed that the pixel data receiving unit 101 sequentially receives the same number of pieces of pixel data as the number (26) of pixels to be included in data of the fixed bit width (s bits). It is also assumed that a data amount of a piece of pixel data provided to the pixel data receiving unit 101 is 12 bits. In other words, a dynamic range of a piece of pixel data is 12 bits. It is assumed that the reference bit width M is 8 bits. It is further assumed that the quantization width information Code is expressed by 3 bits.

FIG. 7A shows, as an example, 11 pieces of pixel data among 26 pieces of pixel data which are provided into the pixel data receiving unit 101.

It is assumed that the pixel data receiving unit 101 receives pieces of 12-bit pixel data corresponding to respective pixels in an order of the pixel P1, P2, . . . , P11. A numeral value indicated in each of the pixels P1 to P11 is a pixel value indicated in each piece of pixel data. It is also assumed that the pixel data corresponding to the pixel P1 is an initial pixel value data of green, and that the pixel data corresponding to the pixel P2 is an initial pixel value data of red.

In the first embodiment, the to-be-coded pixel prediction value is, for example, calculated according to the prediction equation (1). In this case, the calculated to-be-coded pixel prediction value is a value of a pixel on the immediately left of the to-be-coded pixel. It is therefore predicted that the pixel value of the to-be-coded pixel has a high possibility of being the same value (level) as that of a pixel received immediately prior to the to-be-coded pixel.

The prediction difference value is a value generated by subtracting a pixel value of the (n−1)th pixel from a pixel value of the n-th pixel.

The prediction difference absolute value indicates an absolute value of a difference value of values of two adjacent pixels. In other words, the prediction difference absolute value is an absolute value of the prediction difference value. For example, if a pixel value of the pixel P1 is "300" and a pixel value of the pixel P2 is "200", a prediction difference absolute value calculated from the pixel values of the pixels P1 and P2 is "80".

If the prediction difference absolute value is "80", the prediction difference absolute value of "80" is not quantized because "80" can be expressed by the reference bit width M (8 bits). In other words, a quantization width Q of the prediction difference absolute value of "80" is "0" (see FIG. 6).

In FIG. 7A, when to-be-coded pixel values are to be coded in units of the fixed bit width (s bits), a plurality of pixels except pixels corresponding to the pieces of initial pixel value data among the to-be-coded pixel values are classified into groups in units of adjacent three pixels.

In the example of FIG. 7A, a maximum value (hereinafter, referred to as a "maximum prediction difference absolute value") of three prediction difference absolute values corresponding to respective three pixels belonging to each group is set to a value to be used in calculating a quantization width Q to be used in quantizing the prediction difference values.

Furthermore, in the example of FIG. 7A, pixel values belonging to the same group are quantized by the same quantization width Q.

For example, three prediction difference absolute values corresponding to respective pixels P3, P4, and P5 which belong to a group G1 are "40", "20", and "40", respectively. In this case, a maximum prediction difference absolute value is "40". In this case, since the maximum prediction difference absolute value of "40" is included in a range from "32" to "63" shown in FIG. 6, a quantization width Q for quantizing the pixels P3, P4, and P5 belonging to the group G1 is "0".

Moreover, three prediction difference absolute values corresponding to respective pixels P6, P7, and P8 which belong to a group G2 are "270", "500", and "66", respectively. In this case, a maximum prediction difference absolute value is "500". In this case, since the maximum prediction difference absolute value of "500" is included in a range from "256" to "511" shown in FIG. 6, a quantization width Q for quantizing the pixels P6, P7, and P8 belonging to the group G2 is "2". Therefore, all prediction difference values corresponding to the pixels P6, P7, and P8 belonging to the group G2 are quantized by the quantization width Q of "2".

The "used bit number" indicated in FIG. 7A is the number of bits of pixel data used to express a value that is generated by quantizing a corresponding prediction difference value.

For example, since the quantization width Q corresponding to the pixel P3 is "0", the prediction difference value of "40" corresponding to the pixel P3 is quantized by the quantization width Q of "0". In other words, the prediction difference value of "40" is divided by the 0-th power of 2 (=1). A value obtained by the division is "40". In other words, the prediction difference value of "40" is not quantized. In the example of the processing, 8-bit data is used to express the value "40" obtained by the division.

Furthermore, for example, since the quantization width Q corresponding to the pixel P7 is "2", the prediction difference value of "−500" corresponding to the pixel P7 is quantized by the quantization width Q of "2". In other words, the prediction difference value of "−500" is divided by the second power of 2 (=4). A value obtained by the division is "−125". In the example of the processing, 8-bit data is used to express the value "−125" obtained by the division.

FIG. 7B is a diagram showing data of a fixed bit width (s bits) which is provided from the image coding device 100 when the processing and operation explained in FIG. 7A are performed. In FIG. 7B, a numeral value indicated in each of the pixels P1 and P2 indicates the number of bits of pixel data of the corresponding pixel. As shown in FIG. 7B, a pixel value of each of the pixels P1 and P2 corresponding to a piece of initial pixel value data is expressed by 12-bit pixel data. Here, 3-bit quantization width information Code is added by the packing unit 106 to the beginning of a set of three pieces of pixel data included in each group.

As shown in FIG. 7B, a pixel value of each of three pixels included in each group is expressed by 8-bit pixel data.

It is assumed in the first embodiment that, when the reference bit width M is 8 bits and 12-bit pixel data is to be coded and 12-bit coded data is to be decoded, a data table DT110 described below is used. It is also assumed in the first embodiment that the quantization width information Code is expressed by 3 bits.

FIG. 8 is a diagram showing the data table DT110 as an example. As shown in FIG. 8, the data table DT110 differs from the data table DT100 in FIG. 6 in that an item "Code" is added. Except the item "Code", the data table DT110 is the same as the data table DT100, and therefore the detailed description of the data table DT110 is not repeated below.

In the item "Code", decimal numbers from "0" to "7" are expressed by pieces of 3-bit quantization width information Code. Thereby, the pieces of 3-bit quantization width information Code can indicate quantization widths Q corresponding to respective prediction difference absolute values that are classified into 8 kinds. More specifically, as shown in the data table DT110, the 8 kinds of codes ("000", "001", and the like) which are indicated by the respective pieces of 3-bit quantization width information Code are associated with respective quantization widths Q corresponding to respective prediction difference absolute values that are classified into 8 kinds.

For example, in the data table DT110, a code "000" indicated by a piece of quantization width information Code is associated with prediction difference absolute values from "0" to "31". Thereby, the code "000" indicated by the quantization width information Code indicates a quantization width Q of "0".

Moreover, for example, in the data table DT110, a code "100" indicated by a piece of the quantization width information Code is associated with prediction difference absolute values from "256" to "511". Thereby, the code "100" indicated by quantization width information Code indicates a quantization width Q of "2".

Here, the data table DT110 is previously stored in a storage device such as a memory (not shown) which is included in each of the image coding device 100 and the image decoding device 110. In other words, both the image coding device 100 and the image decoding device 110 use the same data table to perform various kinds of processing.

(Image Coding Processing)

Next, the image coding processing according to the first embodiment is described in detail.

Figure 9A:
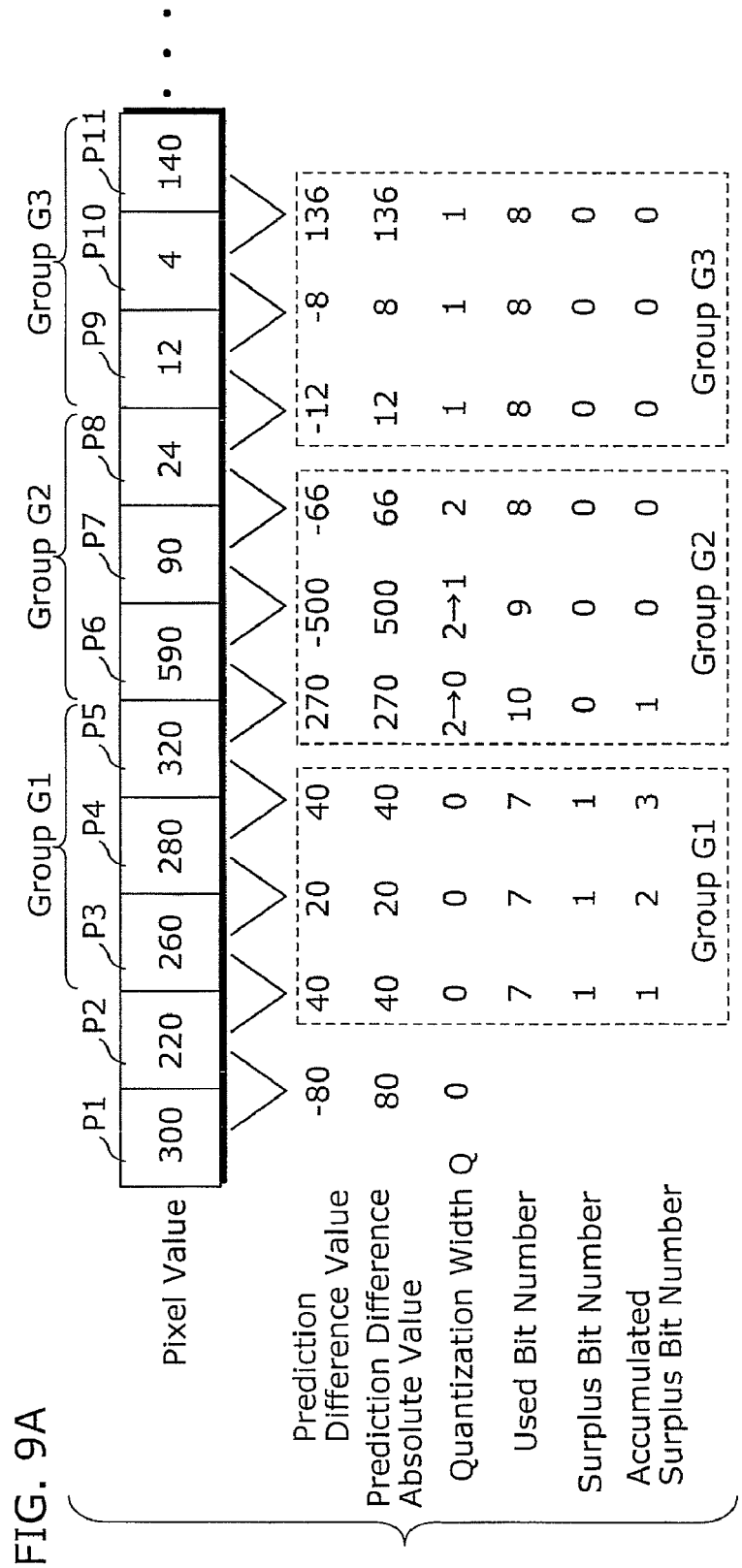
FIG. 9A is a diagram for explaining image coding processing using surplus bits in the first embodiment.
Figure 9B:
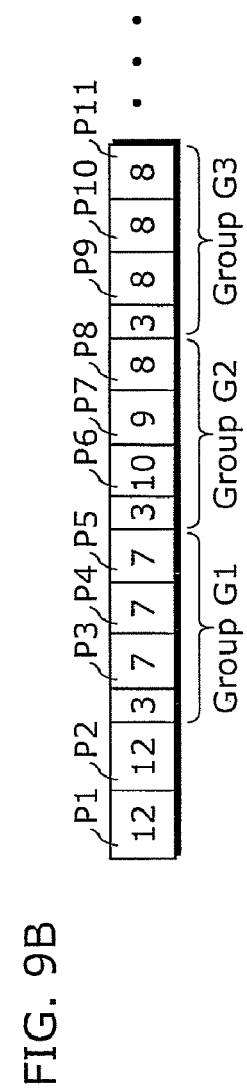
FIG. 9B is a diagram for explaining image coding processing using surplus bits in the first embodiment.

FIG. 9A and FIG. 9B are diagrams for explaining image coding processing using surplus bits in the first embodiment.

Here, it is assumed that the pixel data receiving unit 101 sequentially receives the same number of pieces of pixel data as the number of pixels (26) included in data of the fixed bit width (s bits). It is also assumed that a data amount of a piece of pixel data provided to the pixel data receiving unit 101 is 12 bits. In other words, a dynamic range of a piece of pixel data is 12 bits. It is assumed that the reference bit width M is 8 bits. It is further assumed that the quantization width information Code is expressed by 3 bits.

FIG. 9A shows, as an example, 11 pieces of pixel data among 26 pieces of pixel data which are provided into the pixel data receiving unit 101.

It is assumed that the pixel data receiving unit 101 receives pieces of 12-bit pixel data corresponding to respective pixels in an order of the pixel P1, P2, . . . , P11. A numeral value indicated in each of the pixels P1 to P11 is a pixel value indicated in each piece of pixel data. It is also assumed that the pixel data corresponding to the pixel P1 is an initial pixel value data of green, and that the pixel data corresponding to the pixel P2 is an initial pixel value data of red.

In the first embodiment, the to-be-coded pixel prediction value is, for example, calculated according to the prediction equation (1). In this case, the calculated to-be-coded pixel prediction value is a value of a pixel on the immediately left of the to-be-coded pixel. It is therefore predicted that the pixel value of the to-be-coded pixel has a high possibility of being the same value (level) as that of a pixel received immediately prior to the to-be-coded pixel.

The "prediction difference value", "prediction difference absolute value", "quantization width Q", and "used bit number" indicated in FIG. 9A have already been described with reference to FIG. 7A, and therefore the description is not repeated again below.

The "surplus bit number" is the number of bit(s) (surplus bit(s)) that are not used and then left when a quantized value of a corresponding prediction difference value or prediction difference value is expressed in units of the reference bit width M.

The "accumulated surplus bit number" is a value indicated by a surplus bit counter when coding is performed according to a corresponding used bit number.

In FIG. 9A, when to-be-coded pixel values are to be coded in units of the fixed bit width (s bits), a plurality of pixels except pixels corresponding to the pieces of initial pixel value data among the to-be-coded pixel values are classified into groups in units of adjacent three pixels. The groups have already been described with reference to FIG. 7A, and therefore the description is not repeated again below.

Here, it is assumed that a memory (not shown) in which data is stored is provided in the quantization width setting unit 104 in the image coding device 100 in FIG. 1. It is assumed that the data table DT110 in FIG. 8 is previously stored in the quantization width setting unit 104. It should be noted that the memory in which the data table DT110 is stored may be provided outside the quantization width setting unit 104.

It is also assumed that a memory (not shown) in which data is stored is provided in the packing unit 106 in the image coding device 100. It is further assumed that a memory (not shown) in which data is stored is provided in the prediction value calculation unit 102.

In the image coding processing in FIG. 2, Step S111 is first performed.

At Step S111, the fixed bit width setting unit 107 sets a fixed bit width (s bits). The fixed bit width is, for example, set to a bus width of data transfer of a used integrated circuit. Then, the fixed bit width setting unit 107 provides the fixed bit width information indicating the fixed bit width (s bits) to the packing unit 106, the quantization width setting unit 104, and the surplus bit count unit 105.

At Step S112, the quantization width setting unit 104 calculates the reference bit width M according to the equation (8), as described earlier. Here, it is assumed that the calculated reference bit width M is "8". The quantization width setting unit 104 provides the calculated reference bit width M to the surplus bit count unit 105.

At Step S113, the pixel data receiving unit 101 receives a piece of pixel data.

At Step S114, the pixel data receiving unit 101 determines whether or not the received piece of pixel data is a piece of initial image value data. If the determination is YES at Step S114, then the pixel data receiving unit 101 stores the received piece of pixel data into an internal buffer, and provides the received piece of pixel data to the packing unit 106. Then, the processing proceeds to Step S135 that will be described later. On the other hand, if the determination is NO at Step S114, then the step described later is performed and then the processing proceeds to Step S115.

Here, it is assumed that the pixel data receiving unit 101 receives, as a piece of initial pixel value data, a piece of pixel data corresponding to the pixel P1. Under the assumption, the pixel data receiving unit 101 stores the received piece of pixel data into the internal buffer, and provides the received piece of pixel data to the packing unit 106. Here, if a piece of pixel data has already been stored in the buffer, the pixel data receiving unit 101 overwrites the received piece of pixel data on the stored data, thereby storing the received one into the internal buffer.

When the piece of pixel data is received as the piece of initial pixel value data, the packing unit 106 stores the received piece of pixel data (initial pixel value data) into an internal memory. Then, the processing proceeds to Step S135.

At Step S135, the packing unit 106 determines whether or not the number of received piece(s) of pixel data is equal to the predetermined value Pix. Each received piece of pixel data is an piece of initial pixel value data or a piece of to-be-coded pixel data. Pix represents the number of pixels to be included in s-bit coded data (packing data), as described previously. A value of Pix is, for example, "26".

If the determination is YES at Step S135, then it is determined that the number of received piece(s) of image data is "0". Here, after that, for example, if the packing unit 106 receives one piece of pixel data, the number of received pieces of pixel data is "1". Then, the processing proceeds to Step S136.

On the other hand, if the determination is NO at Step S135, then Step S113 is performed again. Here, it is assumed that the number of the received piece(s) of pixel data is not equal to the predetermined value Pix. Therefore, Step S113 is performed again.

Next, it is assumed that the pixel data receiving unit 101 receives, as a piece of initial pixel value data, a piece of pixel data corresponding to the pixel P2 (S113).

Under the assumption, the determination at Step S114 is YES, and therefore the pixel data receiving unit 101 overwrites the received piece of pixel data onto the internal buffer to be stored and provides the received piece of pixel data to the packing unit 106.

Then, Step S135 described previously is performed, and Step S113 is performed again.

Here, the pixel P3 is assumed to be a to-be-coded pixel. Under the assumption, the pixel data receiving unit 101 receives a piece of pixel data (to-be-coded pixel data) corresponding to the pixel P3. A pixel value of the to-be-coded pixel data is assumed to be "260". Under the assumption, since the received piece of pixel data is not a piece of initial pixel value data (NO at S114), the pixel data receiving unit 101 provides the received piece of pixel data to the difference calculation unit 103.

Hereinafter, a group to which a to-be-coded pixel not corresponding to a piece of initial pixel value data belongs is referred to a "group to be processed". For example, when a to-be-coded pixel is the pixel P3, the group G1 to which the pixel P3 belongs is a group to be processed.

On the other hand, if the determination at Step S114 is NO, then the pixel data receiving unit 101 provides a piece of pixel data stored in the internal buffer to the prediction value calculation unit 102. Here, the provided piece of pixel data is assumed to have a pixel value of "220" of the pixel P2. Each time the prediction value calculation unit 102 receives a piece of pixel data, the prediction value calculation unit 102 stores the received piece of pixel data into the internal memory.

Moreover, the pixel data receiving unit 101 overwrites the received piece of pixel data onto the internal buffer to be stored therein. Furthermore, the pixel data receiving unit 101 provides the received piece of pixel data (to-be-coded pixel data) to the difference calculation unit 103. Then, the processing proceeds to Step S115.

At Step S115, the prediction value calculation unit 102 calculates the prediction value of the to-be-coded pixel. More specifically, the prediction value calculation unit 102 calculates a prediction value by using the prediction equation (1). In this case, the pixel value ("220") indicted by the received piece of pixel data is calculated as the prediction value. The prediction value calculation unit 102 provides the calculated prediction value of "220" to the difference calculation unit 103.

Furthermore, when a prediction value of the h-th to-be-coded pixel is to be calculated, the prediction value is set to a value indicated by the (h−1)th pixel data if the (h−1)th pixel data is a piece of initial pixel value data, while the prediction value of the to-be-coded pixel is set to a pixel value indicated by a piece of pixel data that is generated by providing data coded by the image coding device 100 to the image decoding device 110 and decoding the coded data by the image decoding device 110 if the (h−1)th pixel data is not a piece of initial pixel value data. Thereby, even in the situation where quantization processing performed by the quantization processing unit 108 causes errors, the image coding device 100 and the image decoding device 110 can generate the same prediction value.

At Step S116 calculates a prediction difference value. More specifically, the difference calculation unit 103 subtracts the received prediction value of "220" from the pixel value ("260") indicated by the received to-be-coded pixel data, in order to obtain the prediction difference value of "40". The difference calculation unit 103 provides the calculated prediction difference value of "40" to the quantization width setting unit 104.

Hereinafter, prediction difference values corresponding to respective three pixels belonging to a group to be processed are referred to as "to-be-processed prediction difference values". For example, if a group to be processed is the group G1, prediction difference values of the respective pixels P3, P4, and P5 belonging to the group G1 are to-be-processed prediction difference values.

The quantization width setting unit 104 has a difference value counter. The difference value counter is a counter indicating the number of received prediction difference values. An initial value of the difference value counter is "0". Each time of receiving a prediction difference value, the quantization width setting unit 104 stores the received prediction difference value into an internal memory, and increments a value indicated by the difference value counter by "1".

At Step S117, the quantization width setting unit 104 determines whether or not three prediction difference values are received. In other words, the quantization width setting unit 104 determines whether or not the value indicated by the difference value counter is "3". If the determination at Step S117 is YES, then the quantization width setting unit 104 sets the value of the difference value counter to "0", and the processing proceeds to Step S118. On the other hand, if the determination at Step S117 is NO, then Step S113 is performed again. Here, it is assumed that the value indicated by the difference value counter is "1". Therefore, Step S113 is performed again.

Then, the set of Steps S113 to S116 as described previously is repeated twice, so that the quantization width setting unit 104 receives three prediction difference values. The three prediction difference values received by the quantization width setting unit 104 are three prediction difference values corresponding to the respective three pixels in a group. In this case, the internal memory holds the three prediction difference values. If the quantization width setting unit 104 receives three prediction difference values (YES at S117), then the quantization width setting unit 104 sets the value of the difference value counter to "0".

At Step S118, quantization width setting processing is performed. In the quantization width setting processing, the quantization width setting unit 104 calculates the number of digits (code-added prediction difference binary digit number) of binary data expressing, by code-added binary number, each of the three prediction difference values stored in the internal memory. Here, it is assumed that the three prediction difference values are three prediction difference values "40", "20", and "40", respectively, which correspond to the respective pixels P3, P4, and P5 belonging to the group G1 in FIG. 9A. Under the assumption, the calculated three code-added prediction difference binary numbers are "7", "7", and "7", respectively.

Furthermore, the quantization width setting unit 104 calculates respective absolute values (prediction difference absolute values) of the three prediction difference values. Here, the three prediction difference values are assumed to be "40", "20", and "40", respectively. Under the assumption, the calculated three prediction difference absolute values are "40", "20", and "40", respectively.

Then, the quantization width setting unit 104 calculates a maximum value of the three prediction difference absolute values (hereinafter, referred to as a "maximum prediction difference absolute value"). In this case, the maximum prediction difference absolute value is "40".

Then, the quantization width setting unit 104 sets a quantization width Q by using the data table DT110 in FIG. 8 that is stored in the internal memory and the maximum prediction difference absolute value (for example, "40").

If the maximum prediction difference absolute value is "40", it is included in a value range from "32" to "63" indicated in the data table DT110. Therefore, the quantization width Q is set to "0". The set quantization width Q is set to correspond to each of the three pixels belonging to the group to be processed. In this case, all of the three quantization widths Q corresponding to the respective three pixels (for example, the pixels P3, P4, and P5) belonging to the group to be processed (for example, the group G1) are set to "0".

Furthermore, the quantization width setting unit 104 provides the quantization width information Code to the packing unit 106. In this case, since the maximum prediction difference absolute value of "40" is included in a value range from "32" to "63" indicated in the data table DT110, the quantization width information Code is information indicating the code "001".

Furthermore, in receiving the quantization width information Code, the packing unit 106 stores the received quantization width information Code to an internal memory.

At Step S119, the quantization width setting unit 104 provides the surplus bit count unit 105 with a maximum code-added prediction difference binary number among three code-added prediction difference binary numbers corresponding to the respective three pixels belonging to the group to be processed (for example, the group G1).

At Step S120, surplus bit counter updating processing is performed.

As shown in FIG. 3, in the surplus bit counter updating processing, Step S121 is first performed.

At Step S121, the surplus bit count unit 105 determines whether or not the received code-added prediction difference binary number is smaller than the reference bit width M. If the determination at Step S121 is YES, then the processing proceeds to Step S122. On the other hand, if the determination at Step S121 is NO, then the processing proceeds to Step S123 as described later. Here, it is assumed that the received code-added prediction difference binary number is "7" and the reference bit width M is 8 bits. Under the assumption, the determination is YES, and therefore Step S122 is performed.

At Step S122, counter value increment processing is performed. In the counter value increment processing, the surplus bit count unit 105 increments a value indicated by the surplus bit counter by a value (for example, "1") that is generated by subtracting the received code-added prediction difference binary number (for example, "7") from the reference bit width M (for example, "8"). By the above processing, the surplus bit counter is assumed to indicate "1".

Then, the surplus bit counter updating processing is completed, and the processing returns to the image coding processing in FIG. 2 again and proceeds to Step S130.

At Step S130, data transmission processing is performed. In the data transmission processing, the quantization width setting unit 104 provides the quantization processing unit 108 with a quantization width Q and a prediction difference value which correspond to the p-th pixel belonging to the group to be processed (for example, the group G1). Here, an initial value of p is "1". For example, if the group to be processed is the group G1, the pixels P3, P4, and P5 belonging to the group G1 are the first, second, and third pixels, respectively.

At Step S131, the quantization width setting unit 104 determines whether or not the quantization width Q corresponding to the p-th pixel belonging to the group to be processed is "0". If the determination at Step S131 is YES, then the processing proceeds to Step S133. On the other hand, if the determination at Step S131 is NO, then the processing proceeds to Step S132 as described later.

Here, it is assumed that the quantization width Q corresponding to the p-th pixel belonging to the group to be processed is "0" and that the processing proceeds to Step S133.

At Step S133, coding processing is performed. In the coding processing, the quantization processing unit 108 performs the following processing NA, when the quantization width Q provided from the quantization width setting unit 104 is "0" and the quantization processing unit 108 does not receive any counter decrement value information described layer.

In the processing NA, the quantization processing unit 108 generates data (hereinafter, referred to as "coded pixel data") that expresses the prediction difference value provided from the quantization width setting unit 104 by bits of the code-added prediction difference binary digit number corresponding to the prediction difference value. Then, the quantization processing unit 108 provides the generated coded pixel data to the packing unit 106.

Here, the received quantization width Q is assumed to be "0". In addition, the received prediction difference value is assumed to be "40". Moreover, the code-added prediction difference binary digit number corresponding to the prediction difference value of "40" is assumed to be "7".

Under the assumption, the quantization processing unit 108 generates a piece of coded pixel data that expresses the prediction difference value of "40" by "7" bits. More specifically, the number of bits used to generate the piece of coded pixel data is "7" as indicated in FIG. 9A. In this case, if the reference bit width M is 8 bits, one surplus bit occurs.

Then, the generated piece of coded pixel data is provided to the packing unit 106. Here, the packing unit 106 stores the received piece of coded pixel data to the internal memory.

Moreover, in the coding processing, the quantization processing unit 108 performs processing NB described below, when the quantization width Q provided from the quantization width setting unit 104 is "0" and the quantization processing unit 108 receives counter decrement value information described layer.

Moreover, in the coding processing, the quantization processing unit 108 performs processing NC described below, when the quantization width Q provided from the quantization width setting unit 104 is equal to or more than "1" and the quantization processing unit 108 receives counter decrement value information described layer.

At Step S134, it is determined whether or not the quantization width setting unit 104 provides the surplus bit count unit 105 with all (three) of the calculated code-added prediction difference binary numbers corresponding to the group to be processed. If the determination at Step S134 is YES, then the quantization width setting unit 104 sets a value of p to "1" and the processing proceeds to Step S135. On the other hand, if the determination at Step S134 is NO, then the quantization width setting unit 104 increments the value of p by "1". Then, Step S119 is performed again.

Here, the determination is assumed to be NO, and therefore Step S119 described previously is performed again. It is assumed that, by the processing, a code-added prediction difference binary number of "7" corresponding to the pixel P4 is provided to the surplus bit count unit 105.

Then, again, Steps S121 and S122 in FIG. 3 are performed, and thereby the value indicated by the surplus bit counter is assumed to be "2".

Then, the surplus bit counter updating processing is completed, and Step S130 in FIG. 2 is performed again. It is assumed that, by the processing, the quantization width Q which corresponds to a p-th pixel belonging to the group to be processed and the prediction difference value which corresponds to the second pixel belonging to the group to be processed are provided to the quantization processing unit 108.

Then, Steps S131 and S133 described previously are performed. By the processing, the coded pixel data expressed by "7" bits is provided to the packing unit 106. Here, the packing unit 106 stores the received coded pixel data to the internal memory.

Then, the determination at Step S134 is NO, and therefore the quantization width setting unit 104 increments the value of p by "1". Then, Step S119 is performed again. It is assumed that, by the processing, a code-added prediction difference binary number of "7" corresponding to the pixel P5 is provided to the surplus bit count unit 105.

Then, again, Steps S121 and S122 in FIG. 3 are performed, and thereby the value indicated by the surplus bit counter is assumed to be "3".

Then, the surplus bit counter updating processing is completed, and Step S130 in FIG. 2 is performed again. It is assumed that, by the processing, the quantization width Q and the prediction difference value which correspond to the third pixel belonging to the group to be processed are provided to the quantization processing unit 108.

Then, Steps S131 and S133 described previously are performed. By the processing, the coded pixel data expressed by "7" bits is provided to the packing unit 106. Here, the packing unit 106 stores the received coded pixel data to the internal memory.

Then, the determination at Step S134 is YES, and therefore the quantization width setting unit 104 sets the value of p to "1" and Step S135 is performed.

At Step S135, the same processing as described previously is performed, so that the details are not explained again. Here, it is assumed that the number of the received piece(s) of pixel data is not equal to the predetermined value Pix. Therefore, Step S113 is performed again.

Here, it is assumed that, at this time, as shown in FIG. 9B, the packing unit 106 have received (a) pieces of initial pixel value data (each 12 bits) corresponding to the respective pixels P1 and P2, (b) quantization width information Code (3 bits), and (c) pieces of coded pixel data (each 7 bits) corresponding to the respective pixels P3, P4, and P5. In this case, the internal memory in the packing unit 106 holds consecutive pieces of data as shown in FIG. 9B from the piece of initial pixel value data corresponding to the pixel P1 to the piece of the coded pixel data corresponding to the pixel P5 which are shown in FIG. 9B.

Next, it is assumed that the pixel data receiving unit 101 receives a piece of pixel data corresponding to the pixel P6 having a pixel value of "590" which is shown in FIG. 9A.

Under the assumption, the determination at Step S114 is NO, and therefore Step S115 and S116 are performed as described previously.

By the processing at Step S115 and S116 described previously, a prediction difference value of "270" is calculated. Furthermore, the difference calculation unit 103 provides the calculated prediction difference value of "270" to the quantization width setting unit 104.

At Step S117, the same processing as described previously is performed, so that the details are not explained again. Here, it is assumed that the value indicated by the difference value counter is "1". Therefore, Step S113 is performed again.

Then, the set of Steps S113 to S116 as described previously is repeated twice, so that the quantization width setting unit 104 receives three prediction difference values of "270", "−500", and "−66" shown in FIG. 9A. If the quantization width setting unit 104 receives the three prediction difference values (YES at S117), then the quantization width setting unit 104 sets the value of the difference value counter to "0".

At Step S118, the same quantization width setting processing as described previously is performed, so that the details are not explained again. Here, it is assumed that the three prediction difference values are three prediction difference values "270", "−500", and "−66", respectively, which correspond to the respective pixels P6, P7, and P8 belonging to the group G2 in FIG. 9A. Under the assumption, the calculated three code-added prediction difference binary numbers are "10", "10", and "8", respectively. In this case, the calculated three code-added prediction difference binary numbers "10", "10", and "8" correspond to the pixels P6, P7, and P8, respectively.

Furthermore, the quantization width setting unit 104 calculates three prediction difference absolute values "270", "500", and "66", as described previously. In this case, a maximum prediction difference absolute value is "500".

Then, the quantization width setting unit 104 sets a quantization width Q by using the data table DT110 in FIG. 8 that is stored in the internal memory and the maximum prediction difference absolute value of "500".

If the maximum prediction difference absolute value is "500", then it is included in a value range from "256" to "511" indicated in the data table DT110. Therefore, the quantization width Q is set to "2". The set quantization width Q of "2" is set to correspond to the three pixels belonging to the group to be processed (the group G2).

Furthermore, the quantization width setting unit 104 provides the quantization width information Code to the packing unit 106. In this case, since the maximum prediction difference absolute value of "500" is included in a value range from "256" to "511" indicated in the data table DT110, the quantization width information Code is information indicating the code "100".

Furthermore, in receiving the quantization width information Code, the packing unit 106 stores the received quantization width information Code to the internal memory.

Then, Step S119 described earlier is performed. At Step S119, it is assumed that a maximum code-added prediction difference binary number of "10" among three code-added prediction difference binary numbers corresponding to the respective three pixels belonging to the group to be processed (the group G2) is provided to the surplus bit count unit 105.

Then, the surplus bit counter updating processing at Step S120 is performed.

At Step S121, the same processing as described previously is performed, so that the details are not explained again. Here, it is assumed that the received code-added prediction difference binary number is "10" and the reference bit width M is 8 bits. Under the assumption, the determination at Step S121 is NO, and therefore the processing proceeds to Step S123.

At Step S123, the surplus bit count unit 105 determines whether or not the received code-added prediction difference binary number is greater than the reference bit width M, and whether or not a value of the surplus bit counter is greater than "0". If the determinations at Step S123 are YES, then the processing proceeds to Step S124.

Here, it is assumed that the code-added prediction difference binary number ("10") is greater than the reference bit width M of "8". Furthermore, it is assumed that the surplus bit counter indicates "3" as a result of the above-described processing. Under the assumption, the determination at Step S123 is YES, and therefore the processing proceeds to Step S124.

At Step S124, the surplus bit count unit 105 determines whether or not the value of the surplus bit counter is greater than the quantization width Q corresponding to the p-th pixel belonging to group to be processed (for example, the group G2). If the determination at Step S124 is YES, then the processing proceeds to Step S124N. On the other hand, if the determination at Step S124 is NO, then the processing proceeds to Step S125 as described later.

Here, it is assumed that the surplus bit counter indicates "3". Furthermore, it is assumed that the quantization width Q corresponding to the p-th pixel belonging to the group to be processed is set to "2". Under the assumption, the determination at Step S124 is YES, and therefore the processing proceeds to Step S124N.

At Step S124N, counter value decrement processing is performed. In the counter value decrement processing, the surplus bit count unit 105 decrements the value (for example, "3") indicated by the surplus bit counter by the value (for example, "2") of the quantization width Q corresponding to the p-th pixel belonging to the group to be processed.

Furthermore, the surplus bit count unit 105 provides counter decrement value information to the quantization width setting unit 104. The counter decrement value information is information indicating a value (for example, "2") by which the value of the surplus bit counter is decremented. In this case, the counter decrement value information indicates the number of surplus bit(s) available in the processing described later.

In receiving the counter decrement value information, the quantization width setting unit 104 provides the received counter decrement value information to the quantization processing unit 108.

At Step S124NA, quantization width zero setting processing is performed. In the quantization width zero setting processing, the surplus bit count unit 105 issues quantization width zero change instruction to the quantization width setting unit 104. The quantization width zero change instruction is instruction for setting the quantization width Q corresponding to the p-th pixel belonging to the group to be processed, to "0".

Then, the surplus bit counter updating processing is completed, and the processing returns to the image coding processing in FIG. 2 again and proceeds to Step S130.

In receiving the quantization width zero change instruction, the quantization width setting unit 104 changes a value (for example, "2") of a quantization width Q corresponding to a pixel (for example, the pixel P6) designated by the quantization width zero change instruction, to "0".

At Step S130, the same processing as described previously is performed, so that the details are not explained again. It is assumed that, by the processing, the quantization width Q of "0" and the prediction difference value which correspond to the first pixel belonging to the group to be processed are provided to the quantization processing unit 108.

At Step S131, the same processing as described previously is performed, so that the details are not explained again. Here, it is assumed that a value of the quantization width Q corresponding to the p-th pixel belonging to the group to be processed is "0" and that the processing proceeds to Step S133.

At Step S133, the above-described coding processing is performed. Here, it is assumed that the quantization processing unit 108 receives a quantization width Q of "0" from the quantization width setting unit 104, and receives the counter decrement value information. Under the assumption, the processing NB described below is performed in the coding processing.

In the processing NB, the quantization processing unit 108 generates data (hereinafter, referred to as "coded image data") that expresses a prediction difference value received from the quantization width setting unit 104, by bits (reference bit width M+a value indicated by the counter decrement value information).

Then, the quantization processing unit 108 provides the generated coded pixel data to the packing unit 106.

In addition, the received prediction difference value is assumed to be "270". It is assumed that the reference bit width M is 8 bits. Furthermore, the value indicated by the counter decrement value information is assumed to be "2". Under the assumption, the quantization processing unit 108 generates a piece of coded pixel data that expresses the prediction difference value of "270" by "10" bits. More specifically, the number of bits used to generate the piece of coded pixel data is "10" as indicated in FIG. 9A.

As described above, the value indicated by the counter decrement value information is the number of available surplus bits. Therefore, if the value indicated by the counter decrement value information is "2", the generated piece of coded pixel data is a piece of data generated by using two surplus bits.

Then, the determination at Step S134 is NO, and therefore the quantization width setting unit 104 increments the value of p by "1". Then, Step S119 is performed again. It is assumed that, by the processing, the code-added prediction difference binary number of "10" corresponding to the pixel P7 is provided to the surplus bit count unit 105.

Then, the surplus bit counter updating processing at Step S120 is performed.

At Step S121, the same processing as described previously is performed, so that the details are not explained again. Here, it is assumed that the received code-added prediction difference binary number is "10" and the reference bit width M is 8 bits. Under the assumption, the determination at Step S121 is NO, and therefore the processing proceeds to Step S123.

At Step S123, the same processing as described previously is performed, so that the details are not explained again. Here, it is assumed that the received code-added prediction difference binary number ("10") is greater than the reference bit width M of "8". Here, it is assumed that the surplus bit counter indicates "1". Under the assumption, the determination at Step S123 is YES, and therefore the processing proceeds to Step S124.

At Step S124, the same processing as described previously is performed, so that the details are not explained again. Here, it is assumed that the surplus bit counter indicates "1". Furthermore, it is assumed that a quantization width Q corresponding to the p(2)-th pixel belonging to the group (for example, the group G2) to be processed is set to "2". Under the assumption, the determination at Step S124 is NO, and therefore the processing proceeds to Step S125.

At Step S125, quantization width change processing N is performed. In the quantization width change processing N, the surplus bit count unit 105 issues quantization width change instruction N to the quantization width setting unit 104. The quantization width change instruction N is instruction for changing a quantization width Q (for example, "2") corresponding to the p-th pixel belonging to the group to be processed, to a value generated by subtracting the quantization width Q by a value (for example, "1") of the surplus bit counter.

In receiving the quantization width change instruction N, the quantization width setting unit 104 changes the quantization width Q (for example, "2") corresponding to the p-th pixel belonging to the group to be processed, to a value generated by subtracting the quantization width Q by the value (for example, "1") of the surplus bit counter.

At Step S125N, the surplus bit count unit 105 sets the value indicated by the surplus bit counter to "0".

Furthermore, the surplus bit count unit 105 provides the counter decrement value information to the quantization width setting unit 104. The counter decrement value information is information indicating a value (for example, "1") by which the value of the surplus bit counter is decremented. In this case, the counter decrement value information indicates the number of surplus bits available in the processing described later.

In receiving the counter decrement value information, the quantization width setting unit 104 provides the received counter decrement value information to the quantization processing unit 108.

Then, the surplus bit counter updating processing is completed, and the processing returns to the image coding processing in FIG. 2 again and proceeds to Step S130.

At Step S130, the same processing as described previously is performed, so that the details are not explained again. It is assumed that, by the processing, the quantization width Q of "1" and the prediction difference value which correspond to the second pixel belonging to the group to be processed are provided to the quantization processing unit 108.

At Step S131, the same processing as described previously is performed, so that the details are not explained again. Here, it is assumed that a value of the quantization width Q corresponding to the second pixel belonging to the group to be processed is "1" and that the processing proceeds to Step S132.

Hereinafter, a quantization width Q indicating a value of 1 or greater is referred to as a "non-zero quantization width Q".

At Step S132, quantization processing is performed. In the quantization processing, the quantization processing unit 108 quantizes a prediction difference value corresponding to a non-zero quantization width Q corresponding to the p-th pixel belonging to the group to be processed, by dividing the prediction difference value by the Q-th power of 2. Hereinafter, a value generated by quantization is referred to as a "quantized value".

Here, the p-th pixel belonging to the group to be processed is assumed to be the pixel P7. Furthermore, it is assumed that the quantization width Q corresponding to the prediction difference value of "−500" corresponding to the pixel P7 indicates "1". Under the assumption, the quantization processing unit 108 obtains a quantized value of "−250", by dividing the prediction difference value of "−500" by the first power of 2 (2).

At Step S133, the above-described coding processing is performed. Here, it is assumed that the quantization processing unit 108 receives a quantization width Q of "1" from the quantization width setting unit 104, and receives the counter decrement value information. Under the assumption, the processing NC described below is performed in the coding processing.

In the processing NC, the quantization processing unit 108 generates data (hereinafter, referred to as "coded image data") that expresses a quantized value by bits (reference bit width M+a value indicated by the counter decrement value information). As described above, the value of the counter decrement value information is the number of available surplus bit(s). Therefore, by the processing, the resulting coded pixel data is data generated by using surplus bit(s).

Then, the quantization processing unit 108 provides the generated coded pixel data to the packing unit 106.

Here, the quantized value is assumed to be "−250". It is also assumed that the reference bit width M is 8 bits. Furthermore, the value indicated by the counter decrement value information is assumed to be "1". Under the assumption, the quantization processing unit 108 generates the coded pixel data that expresses the quantized value of "−250" by "9" bits. More specifically, the number of bits used to generate the coded pixel data is "9" as indicated in FIG. 9A.

Then, the determination at Step S134 is NO, and therefore the quantization width setting unit 104 increments the value of p by "1". Then, Step S119 is performed again. It is assumed that, by the processing, a code-added prediction difference binary number of "10" is provided to the surplus bit count unit 105.

Then, the surplus bit counter updating processing at Step S120 is performed.

At Step S121, the same processing as described previously is performed, so that the details are not explained again. Here, it is assumed that the received code-added prediction difference binary number is "10" and the reference bit width M is 8 bits. Under the assumption, the determination at Step S121 is NO, the determination at Step S123 is NO, thereby the surplus bit counter updating processing is completed, and the processing returns to the image coding processing in FIG. 2 again, and proceeds to Step S130.

At Step S130, the same processing as described previously is performed, so that the details are not explained again. It is assumed that, by the processing, the quantization width Q of "2" and the prediction difference value which correspond to the third pixel belonging to the group to be processed are provided to the quantization processing unit 108.

At Step S131, the same processing as described previously is performed, so that the details are not explained again. Here, it is assumed that a value of the quantization width Q corresponding to the p-th pixel belonging to the group to be processed is "2" and that the processing proceeds to Step S132.

At Step S132, the same processing as described previously is performed, so that the details are not explained again.

Here, the p-th pixel belonging to the group to be processed is assumed to be the pixel P8. Furthermore, it is assumed that the quantization width Q corresponding to the prediction difference value of "−66" corresponding to the pixel P8 indicates "2". Under the assumption, the quantization processing unit 108 obtains a quantized value of "−16", by dividing the prediction difference value of "−66" by the second power of 2 (4).

At Step S133, the above-described coding processing is performed. Here, it is assumed that the quantization processing unit 108 receives a quantization width Q of "2" from the quantization width setting unit 104, and receives the counter decrement value information. Under the assumption, the quantization processing unit 108 generates data (hereinafter, referred to as "coded pixel data") that expresses a quantized value by the reference bit width M.

Then, the quantization processing unit 108 provides the generated coded pixel data to the packing unit 106.

Under the assumption, the quantization processing unit 108 generates a piece of coded pixel data that expresses the prediction difference value of "−16" by "8" bits. More specifically, the number of bits used to generate the piece of coded pixel data is "8" as indicated in FIG. 9A.

Then, the generated piece of coded pixel data is provided to the packing unit 106. Here, the packing unit 106 stores the received piece of coded pixel data to the internal memory.

Then, the determination at Step S134 is YES, and therefore the quantization width setting unit 104 sets the value of p to "1" and Step S135 is performed.

At Step S135, the same processing as described previously is performed, so that the details are not explained again. Here, it is assumed that the number of the received piece(s) of pixel data is not equal to the predetermined value Pix. Therefore, Step S113 is performed again.

In this case, the internal memory in the packing unit 106 holds consecutive pieces of data as shown in FIG. 9B from the piece of initial pixel value data corresponding to the pixel P1 to the piece of the coded pixel data corresponding to the pixel P8 which are shown in FIG. 9B.

Then, at least a part of Steps S113 to S134 is repeated until the determination at Step S135 is YES.

If the determination at Step S135 is YES, then the processing proceeds to Step S136.

At Step S136, packing processing is performed. In the packing processing, the packing unit 106 generates data (coded data) by the fixed bit width (s bits) which includes plural pieces of data (for example, pieces of data shown in FIG. 9B) stored in the internal memory. In other words, the packing unit 106 generates coded data having a predetermined coding amount. Here, if there is/are any not-used bit(s) in the s-bit coded data, the packing unit 106 replaces the not-used bit(s) by dummy data.

The generated coded data includes, for example as shown in FIG. 9B, one or more pieces of initial pixel value data, Pix pieces of coded pixel data, and pieces of quantization width information Code (each 3 bits). Pix has already been explained, so that it will not be explained again below.

Moreover, the packing unit 106 stores the generated piece of coded data each having the fixed bit width (s bits) into an external memory not shown. Here, each time of repeating Step S136, the packing unit 106 stores a generated piece of coded data into the external memory so that the pieces of coded data is consecutively stored with pieces of coded data which have already been stored in the external memory.

At Step S137, the surplus bit count unit 105 sets the value indicated by the surplus bit counter to "0".

At Step S138, the packing unit 106 determines whether or not coding processing is completed for the entire to-be-coded picture. If the determination at Step S138 is YES, then the image coding processing is completed. On the other hand, if the determination at Step S138 is NO, then Step S113 is performed again.

Then, at least a part of Steps S113 to S137 is repeated until the determination at Step S138 is YES. Thereby, pieces of coded data each having the fixed bit width (s bits) are stored consecutively in the external memory. In this case, the pieces of coded data stored in the external memory are pieces of data used to reconstruct a picture.

By the above-described processing, the first embodiment can offer the following advantages in comparison to coding processing without using surplus bits (hereinafter, referred to as "processing without using surplus bits") which has been described with reference to FIGS. 7A and 7B.

As shown in FIG. 7A and 9A, for example, in the processing without using surplus bits, the prediction difference value of "270" corresponding to the pixel P6 is quantized by the quantization width Q of "2" (by the second power of 2=4). In this case, in the processing without using surplus bits, the quantization causes a quantization error of "3" at maximum.

On the other hand, in the first embodiment, the prediction difference value of "270" corresponding to the pixel P6 can be expressed by 10 bits which are the reference bit width M (8 bits) and two surplus bits. Therefore, processing for quantizing the prediction difference value of "270" is not necessary. Therefore, the quantization error is suppressed to "0".

Moreover, for example, in the processing without using surplus bits, the prediction difference value of "−500" corresponding to the pixel P7 is quantized by the quantization width Q of "2" (by the second power of 2=4). In this case, in the processing without using surplus bits, the quantization causes a quantization error of "3" at maximum.

On the other hand, in the first embodiment, the prediction difference value of "−500" corresponding to the pixel P7 can be expressed by 9 bits which are the reference bit width M (8 bits) and one surplus bit. In this case, if the prediction difference value of "−500" is quantized by the quantization width Q of "1" (by the first power of 2=2), the quantized value of "−250" can be expressed by 9 bits. In this case, the quantization error can be suppressed to "1" at maximum.

More specifically, when a pixel quantized by the quantization width Q of "2" shown in FIG. 7A (for example, a pixel at a sharp edge portion) is to be coded, the coding is performed using surplus bits in the first embodiment. Therefore, in the first embodiment, it is possible to reduce the quantization processing, or decrease the quantization width Q in the quantization processing (for example, decrease "2" to "1"). Therefore, it is possible to suppress deterioration of image quality caused by quantization errors. In other words, it is possible to reduce a degree of deterioration of image quality caused by coding.

In addition, in the first embodiment, pieces of coded data each having the fixed bit width (s bits) are consecutively stored in the external memory. One piece of coded data includes pieces of coded pixel data necessary for reconstructing a picture. Therefore, if it is required to access a certain piece of coded pixel data, it is necessary only to access a piece of coded data including the piece of coded pixel data. Therefore, random accessibility for data can be kept.

Furthermore, the fixed bit width (s bits) is set to a bus width of data transfer of a used integrated circuit. The fixed length of the bus width can be secured. Therefore, implementation is possible without losing random accessibility.

As described above, the first embodiment can reduce a degree of deterioration of image quality while keeping random accessibility.

It should be noted that the image coding processing according to the first embodiment may be implemented as a hardware of a Large Scale Integration (LSI).

(Image Decoding Processing)

Next, the image decoding processing according to the first embodiment is described in detail.

As shown in FIG. 1, the image decoding device 110 includes a fixed bit width setting unit 117, an unpacking unit 116, a quantization width setting unit 114, a surplus bit count unit 115, an output unit 119, and an inverse quantization processing unit 118. It should be noted that all or a part of units included in the image decoding device 110 may be implemented as hardware. It should also be noted that all or a part of units included in the image decoding device 110 may be implemented as module(s) of a program executed by a Central Processing Unit (CPU) or the like.

The surplus bit count unit 115 includes a surplus bit counter RC indicating the number of surplus bits. The surplus bit counter RC indicates "0" in an initial state.

Here, it is assumed that pieces of coded data each having the fixed bit width (s bits) are consecutively stored in an external memory not shown, by the image coding processing shown in FIG. 2 which has been described previously. It is also assumed that a memory (not shown) in which data is stored is provided in the packing unit 116 in the image decoding device 110.

Here, it is assumed that a memory (not shown) in which data is stored is provided in the quantization width setting unit 114 in the image coding device 110 in FIG. 1. It is assumed that the data table DT110 in FIG. 8 is previously stored in the quantization width setting unit 114.

Figure 10:
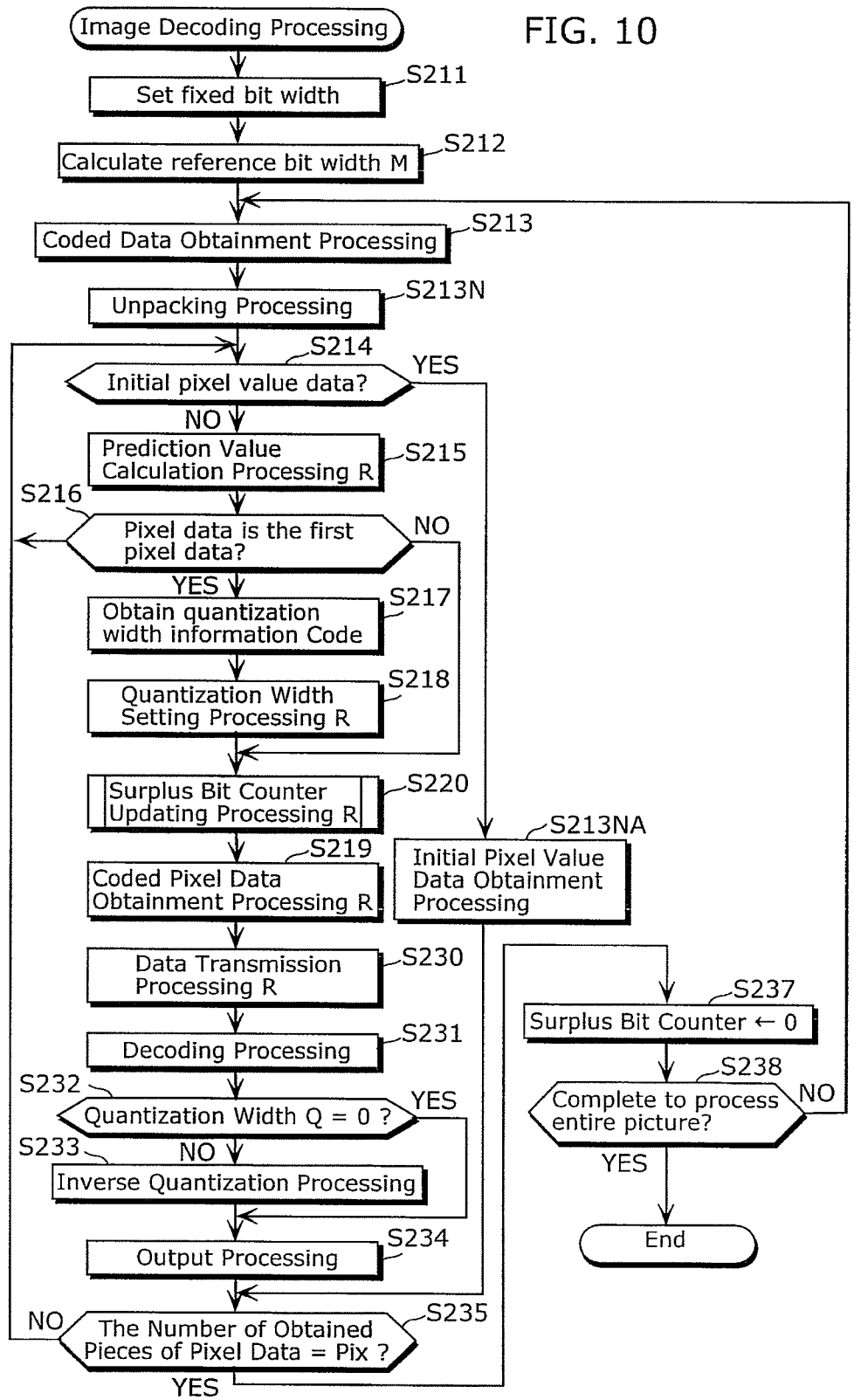
FIG. 10 is a flowchart of image decoding processing.

FIG. 10 is a flowchart of the image decoding processing. In the image decoding processing in FIG. 10, Step S211 is first performed.

At Step S211, the fixed bit width setting unit 117 sets a fixed bit width (s bits). The fixed bit width is set to a bit amount (for example, 256 bits) of coded data having a predetermined coding amount which is generated by the image coding processing in FIG. 2. The fixed bit width may be, for example, set to a bus width of data transfer of a used integrated circuit. Then, the fixed bit width setting unit 117 provides the fixed bit width information indicating the fixed bit width (s bits) to the unpacking unit 116, the quantization width setting unit 114, and the surplus bit count unit 115.

At Step S212, the quantization width setting unit 114 calculates the reference bit width M according to the equation (8), as described earlier. Here, it is assumed that the calculated reference bit width M is "8". The quantization width setting unit 114 provides the calculated reference bit width M to the surplus bit count unit 115.

At Step S213, coding data obtainment processing is performed. In the coding data obtainment processing, the unpacking unit 116 obtains the t-th piece of coded data among the pieces of coded data consecutively stored in the external memory. Here, an initial value of t is "1". It should be noted that the obtainment processing is not limited to the method of obtaining the piece of coded data from the external memory. For example, the piece of coded data may be obtained from the packing unit 106.

Here, when the t-th coded data is obtained, the unpacking unit 116 increments the value of t by "1".

At Step S213N, unpacking processing is performed. In the unpacking processing, the unpacking unit 116 unpacks the obtained t-th coded data. In other words, pieces of data are obtained from the piece of coded data. Then, the unpacking unit 116 stores the obtained pieces of data into an internal memory. In this case, it is assumed that pieces of data are consecutively stored in the internal memory as shown in FIG. 9B.

After that, as the method of obtaining a piece of pixel data, the unpacking unit 116 obtains the g-th piece of pixel data by reading the g-th piece of pixel data among the pieces of pixel data stored in the internal memory. Here, an initial value of a is "1". g indicates the number of pieces of pixel data which are obtained by the unpacking unit 116.

For example, the first to eleventh pieces of pixel data are 11 pieces of pixel data corresponding to the respective pixels P1 to P11 shown in FIG. 9B. Each of the 11 pieces of pixel data is a piece of initial pixel value data or a piece of coded pixel data.

Hereinafter, a pixel corresponding to the g-th piece of pixel data which is obtained by the unpacking unit 116 is referred to as a "to-be-decoded pixel". The to-be-decoded pixel is a pixel to be decoded.

At Step S214, the unpacking unit 116 determines whether or not a piece of image data corresponding to a to-be-decoded pixel is a piece of initial pixel value data. If the determination at Step S214 is YES, then the processing proceeds to Step S213NA.

At Step S213NA, initial pixel value data obtainment processing is performed. In the initial pixel value data obtainment processing, the unpacking unit 116 obtains a piece of initial pixel value data, by reading, from the internal memory, the piece of initial pixel value data among the pieces of pixel data stored in the internal memory.

When the piece of pixel data as a piece of initial pixel value data is obtained, the unpacking unit 116 provides the obtained piece of pixel data to the output unit 119. Then, the processing proceeds to Step S235 that will be described later. On the other hand, if the determination at Step S214 is YES, then the processing proceeds to Step S215.

Here, when the piece of initial pixel value data is received, the output unit 119 stores the received piece of initial pixel value data into an external memory. It should be noted that the output unit 119 may output the received piece of initial pixel value data not to the external memory to store the received piece in the external memory, but to an external circuit or the like which processes image.

Here, it is assumed that the obtained piece of pixel data is a piece of initial pixel value data, and therefore the processing proceeds to Step S235.

At Step S235, the unpacking unit 116 determines whether or not the number (g) of obtained pieces of pixel data is equal to the predetermined value Pix. Each of the obtained pieces of pixel data is a piece of initial pixel value data or a piece of coded pixel data. Pix represents the number of pixels to be included in coded data (packing data) having the fixed bit width (s bits), as described previously. A value of Pix is, for example, "26".

If the determination at Step S235 is YES, then the unpacking unit 116 sets a value of g to "1" and the processing proceeds to Step S237. On the other hand, if the determination at Step S235 is NO, then the unpacking unit 116 increments the value of g by "1". Then, Step S214 is performed again. Here, it is assumed that it is determined that the number (g) of the obtained pieces of pixel data is not equal to the predetermined value Pix, and therefore Step S214 is performed again.

Here, it is assumed that the piece of pixel data corresponding to the to-be-decoded pixel is a piece of initial pixel value data corresponding to the pixel P2.

Under the assumption, the determination at Step S214 is YES, and at Step S213NA, the unpacking unit 116 obtains a piece of pixel data (a piece of pixel data corresponding to the pixel P2) as a piece of initial pixel value data. Then, the unpacking unit 116 provides the obtained piece of pixel data as a piece of initial pixel value data to the output unit 119, and the processing proceeds to Step S235.

Here, when the piece of initial pixel value data is received, the output unit 119 stores the received piece of initial pixel value data into the external memory.

Then, Step S235 described previously is performed to increment the value of g by "1", and then Step S214 is performed again.

Next, it is assumed that the piece of pixel data corresponding to the to-be-decoded pixel is a piece of pixel data corresponding to the pixel P3 as a piece of coded pixel data. Under the assumption, the determination at Step S214 is NO, and therefore the processing proceeds to Step S215.

At Step S215, prediction value calculation processing R is performed to calculate a prediction value of a to-be-decoded pixel. In the prediction value calculation processing R, the following calculation processing RA is performed when the (g−1)th pixel data is a piece of initial pixel value data.

In the calculation processing RA, the unpacking unit 116 calculates a prediction value of the to-be-decoded pixel, by using an equation having the same meaning as that of the prediction equation (1) used in calculating the prediction value at Step S115 in the image coding processing in FIG. 2. In other words, when the g-th pixel data is to be decoded, the unpacking unit 116 sets the prediction value of the to-be-decoded pixel to a value indicated by the (g−1)th pixel data.

Here, it is assumed that the piece of pixel data to be decoded is a piece of pixel data corresponding to the pixel P3. Under the assumption, a value of "220" indicated by a piece of pixel data corresponding to the pixel P2 is a prediction value.

In the prediction value calculation processing R, if the (g−1)th pixel data is not a piece of initial pixel value data, the following calculation processing RB is performed.

At Step S216, the unpacking unit 116 determines whether or not the piece of pixel data corresponding to the to-be-decoded pixel is the first piece of pixel data in a group. The first piece of pixel data in the group is a piece of pixel data corresponding to the first pixel of three pixels belonging to the c-th group among pieces of pixel data stored in the internal memory. Here, an initial value of c is "1".

For example, the first, second, and third groups are the groups G1, G2, and G3, respectively, shown in FIG. 9B. Moreover, when the c-th group is the group G1, the first, second, and third pixels belonging to the group G1 are the pixels P3, P4, and P5, respectively.

If the determination at Step S216 is YES, then the processing proceeds to Step S217. On the other hand, if the determination at Step S216 is NO, then the processing proceeds to Step S220 as described later.

Here, the obtained piece of pixel data is assumed to be the first piece of pixel data in the group. Under the assumption, the processing proceeds to Step S217.

At Step S217, the unpacking unit 116 obtains quantization width information Code corresponding to the c-th group from pieces of data stored in the internal memory, by reading the quantization width information Code from the internal memory. Then, the unpacking unit 116 provides the obtained quantization width information Code to the quantization width setting unit 114. Here, an initial value of c is "1".

For example, the first, second, and third groups are the groups G1, G2, and G3, respectively, shown in FIG. 9B. Here, it is assumed that quantization width information Code ("001") corresponding to the group G1 is obtained.

At Step S218, quantization width setting processing is performed. In the quantization width setting processing, the quantization width setting unit 114 sets a quantization width Q by using (a) the data table DT110 in FIG. 8 stored in the internal memory and (b) the code indicated by the quantization width information Code provided from the unpacking unit 116, and also calculates a surplus bit number.

The set quantization width Q is a quantization width set for the three pixels belonging to the c-th group. Furthermore, the calculated surplus bit number is the number of surplus bits corresponding to each of the three pixels belonging to the c-th group.

Here, the received quantization width information Code is assumed to indicate a code of "001". The code of "001" is associated with the quantization width Q of "0" and the surplus bit number of "1" in the data table DT110. In this case, the quantization width Q is set to "0". Furthermore, the calculated surplus bit number is "1".

Then, the quantization width setting unit 114 provides quantization information indicating the set quantization width Q and the calculated surplus bit number, to the surplus bit count unit 115.

At Step S220, surplus bit counter updating processing R is performed.

Figure 11:
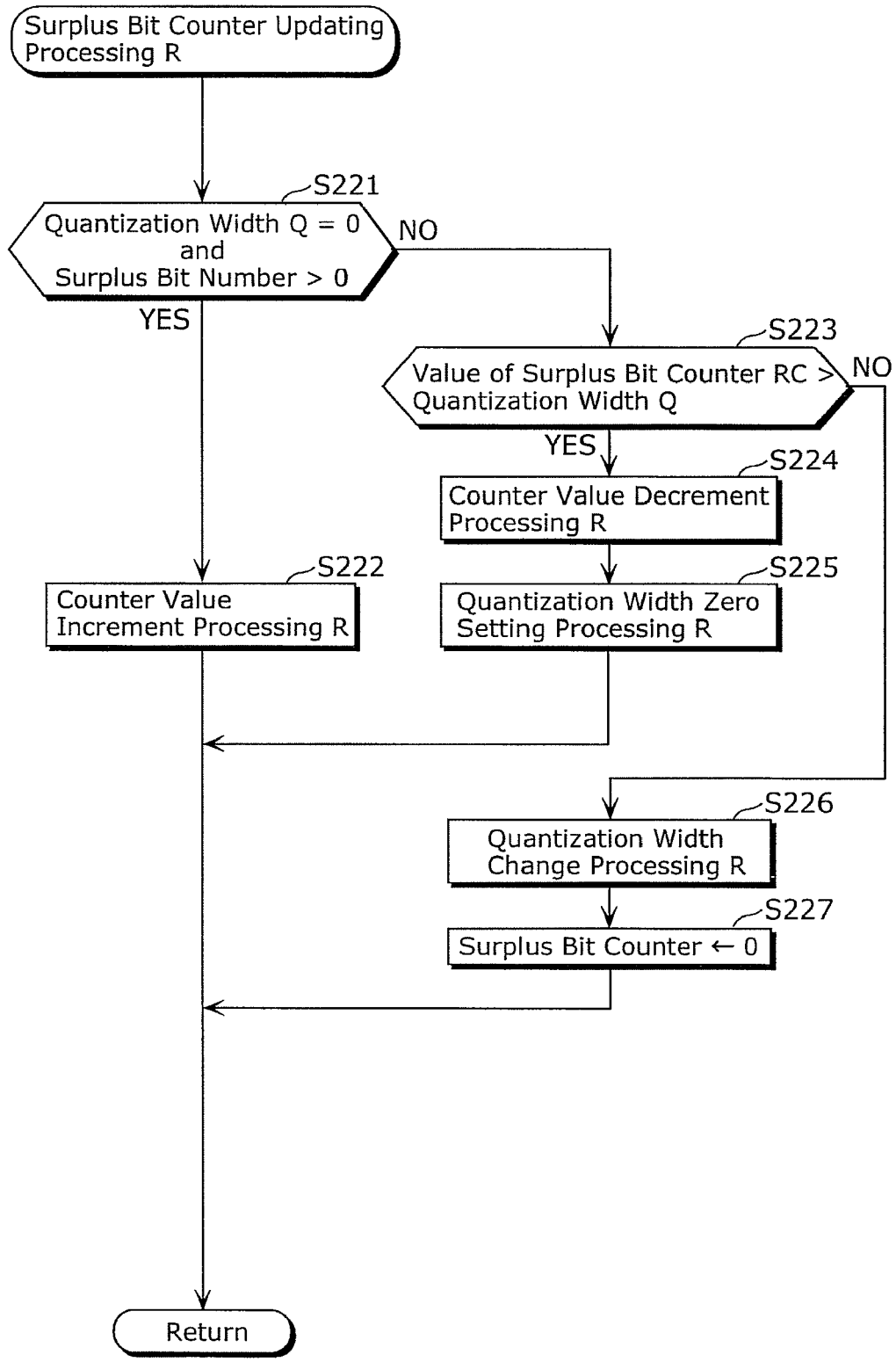
FIG. 11 is a flowchart of surplus bit counter updating processing R.

FIG. 11 is a flowchart of the surplus bit counter updating processing R. As shown in FIG. 11, in the surplus bit counter updating processing R, Step S221 is first performed.

At Step S221, the surplus bit count unit 115 determines whether or not the quantization width Q indicated in the received quantization information is "0" and whether or not the surplus bit number indicated in the received quantization information is greater than "0". If the determination at Step S221 is YES, then the processing proceeds to Step S222. On the other hand, if the determination at Step S221 is NO, then the processing proceeds to Step S223 as described later.

Here, it is assumed that the quantization width Q indicated in the received quantization information is "0". It is also assumed that the surplus bit number indicated in the received quantization information is "1". Under the assumption, the determination at Step S221 is YES, and therefore the processing proceeds to Step S222.

At Step S222, counter value increment processing R is performed. In the counter value increment processing R, the surplus bit count unit 115 increments a value indicated by the surplus bit counter RC by the surplus bit number indicated in the received quantization information. By the above processing, the surplus bit counter RC is assumed to indicate "1".

Then, the surplus bit counter updating processing R is completed, and the processing returns to the image decoding processing in FIG. 10 again and proceeds to Step S219.

At Step S219, coded pixel data obtainment processing R is performed. In the coded pixel data obtainment processing R, the unpacking unit 116 performs the following obtainment processing RA when a counter decrement value information R described later is not received from the quantization width setting unit 114.

In the obtainment processing RA, the unpacking unit 116 sets, for each pixel, a bit number of a piece of pixel data that is coded, by using surplus bit(s) based on (a) the data table DT110 of FIG. 8 stored in the internal memory and (b) the code indicated by the obtained quantization width information Code.

Here, the received quantization width information Code is assumed to indicate a code of "001". The code of "001" is associated with a code-added prediction difference binary digit number of "7" in the data table DT110. In this case, the number of bits used in a piece of pixel data read by the unpacking unit 116 from the internal memory is "7".

In other words, when pieces of pixel data are stored in an order from the left side in the internal memory as shown in FIG. 9B, the unpacking unit 116 obtains a piece of pixel data of the pixel P3, by reading, as the piece of pixel data of the pixel P3, the first to seventh bits. Then, the unpacking unit 116 provides the obtained piece of pixel data to the quantization width setting unit 114.

Here, in the coded pixel data obtainment processing R, the unpacking unit 116 performs the following obtainment processing RB, when counter decrement value information R described lather is received from the quantization width setting unit 114.

At Step S230, data transmission processing R is performed. In the data transmission processing R, the quantization width setting unit 114 provides the inverse quantization processing unit 118 with the quantization width Q corresponding to the to-be-decoded pixel, the obtained piece of pixel data, and the calculated prediction value of the to-be-decoded pixel.

At Step S231, decoding processing is performed. In the decoding processing, the inverse quantization processing unit 118 performs the following processing RA when counter decrement value information R described lather is not received.

In the processing RA, the inverse quantization processing unit 118 generates a piece of data (hereinafter, referred to as a "piece of decoded data) that expresses a value indicated by the received piece of pixel data by a code-added binary digit number of a dynamic range of the piece of pixel data received by the pixel data receiving unit 101. More specifically, since a dynamic range of a piece of pixel data in the first embodiment is 12 bits, a piece of 13-bit decoded data is generated.

Then, the inverse quantization processing unit 118 provides the output unit 119 with the generated piece of decoded data and the calculated prediction value of the to-be-decoded pixel.

Here, it is assumed that a value indicated by the received piece of pixel data is "40". Furthermore, the received piece of pixel data is assumed to be 7-bit data. Under the assumption, the inverse quantization processing unit 118 generates a piece of decoded data that expresses, by 13 bits, a value of "40" indicated by the received piece of pixel data.

Here, in the decoding processing, when the counter decrement value information R described later is received, the inverse quantization processing unit 118 performs the processing RB described later.

At Step S232, the quantization width setting unit 114 determines whether or not the quantization width Q corresponding to the to-be-decoded pixel is "0". If the determinations at Step S232 are YES, then the processing proceeds to Step S234. On the other hand, if the determination at Step S232 is NO, then the processing proceeds to Step S233 as described later. Here, it is assumed that the quantization width Q corresponding to the to-be-decoded pixel is "0", and therefore the processing proceeds to Step S234.

At Step S234, output processing is performed. In the output processing, when the output unit 119 receives a piece of decoded data, the output unit 119 generates a piece of decoded pixel data that indicates a value generated by adding (a) the value which is indicated by the received piece of decoded data with (b) the prediction value of the to-be-decoded pixel which is calculated in the prediction value calculation processing R at Step S215. Then, the output unit 119 stores the generated piece of decoded pixel data to an external memory. In addition, the output unit 119 provides the generated piece of decoded pixel data to the unpacking unit 116.

It should be noted that the output unit 119 may output the generated piece of decoded pixel data not to the external memory to store the generated piece in the external memory, but to an external circuit or the like which processes image.

Here, it is assumed that the value indicated by the piece of decoded data is "40". It is also assumed that the calculated prediction value of the to-be-decoded pixel is "220" that is the pixel value of the pixel P2 because the (g−1)th pixel data is a piece of initial pixel value data.

More specifically, in the output processing, the output unit 119 generates a piece of decoded pixel data which indicates a value that is generated by adding the value indicated by the piece of pixel data obtained as the prediction value to the value indicated by the received piece of decoded data.

In this case, the generated piece of decoded pixel data indicates "260". In other words, the generated piece of decoded pixel data is a piece of pixel data indicating a pixel value of the pixel P3 shown in FIG. 9A.

Then, Step S235 described previously is performed to increment the value of g by "1", and then Step S214 is performed again.

Next, it is assumed that a piece of pixel data corresponding to the to-be-decoded pixel is a piece of pixel data corresponding to the pixel P4 as a piece of coded pixel data. Under the assumption, the determination at Step S214 is NO, and therefore the processing proceeds to Step S215.

Next, prediction value calculation processing R at Step S215 is performed. Here, it is assumed that the (g−1)th pixel data is not a piece of initial pixel value data. Under the assumption, in the prediction value calculation processing R, the following calculation processing RB is performed.

In the calculation processing RB, it is assumed that the unpacking unit 116 sets the prediction value of the to-be-decoded pixel to a pixel value indicated by the piece of decoded pixel data provided from the output unit 119. Here, it is assumed that the piece of decoded pixel data provided from the output unit 119 is a piece of pixel data indicating the pixel value of the pixel P3 shown in FIG. 9A. Under the assumption, the prediction value of the to-be-decoded pixel is "260".

Furthermore, when prediction values of all pixels belonging to the above-described c-th group have been calculated, the unpacking unit 116 increments a value of c by "1".

At Step S216, the same processing as described previously is performed, so that the details are not explained again. Here, it is assumed that the determination at Step S216 is NO, and therefore the processing proceeds to Step S220.

Then, again, Steps S221 and S222 in FIG. 11 are performed, and thereby the value indicated by the surplus bit counter RC is assumed to be "2".

Then, the surplus bit counter updating processing R is completed, then the processing returns to the image decoding processing in FIG. 10 again, and Step S230 is performed again. At the step, the quantization width Q of "0" corresponding to the to-be-decoded pixel, the obtained piece of pixel data, and the calculated prediction value of "260" of the to-be-decoded pixel are provided to the inverse quantization processing unit 118.

Then, at Step S219, coded pixel data obtainment processing R is performed. Here, it is assumed that the obtainment processing RA is performed in the same manner as described previously.

Then, at Step S231, decoding processing is performed. Here, it is assumed that the processing RA is performed in the same manner as described previously.

In the processing RA, the inverse quantization processing unit 118 generates a piece of decoded data that expresses the value of "20" indicated by the received piece of pixel data, by a code-added binary digit number (13) of a dynamic range of the piece of pixel data received by the pixel data receiving unit 101.

Then, the inverse quantization processing unit 118 provides the generated piece of decoded data to the output unit 119.

Then, the determination at Step S232 is YES, and therefore Step S234 is performed in the same manner as described previously. At the step, the output unit 119 generates a piece of decoded pixel data indicating a pixel value of "280" of the pixel P4, and stores the generated piece of decoded pixel data into an external memory. In addition, the output unit 119 provides the generated piece of decoded pixel data to the unpacking unit 116.

Then, Step S235 described previously is performed to increment the value of g by "1", and then Step S214 is performed again.

Then, the processing proceeds to Step S215. At the steps, a prediction value of "280" of the to-be-decoded pixel is calculated. At this timing, prediction values of all pixels belonging to the group G1 have been calculated. Therefore, the unpacking unit 116 increments the value of c by "1". Here, it is assumed that the value of c is "2".

Then, Step S216 and Steps 221 and S222 in FIG. 11 are performed, and thereby the value indicated by the surplus bit counter RC is assumed to be "3".

In addition, Steps S219, S230, S231, S232, and S234 are performed in the same manner as described previously. At the steps, a piece of decoded pixel data which indicates a pixel value of "320" is generated, and the generated piece of decoded pixel data is provided to the unpacking unit 116.

Then, Step S235 described previously is performed to increment the value of g by "1", and then Step S214 is performed again.

Then, the processing proceeds to Step S215. At the steps, a prediction value of "320" of the to-be-decoded pixel is calculated.

Here, the piece of pixel data corresponding to the to-be-decoded pixel is the above-described first piece of pixel data in the group. The piece of pixel data is assumed to be a piece of coded pixel data having 10 bits which corresponds to the pixel P6 shown in FIG. 9B. In other words, the piece of pixel data corresponding to the to-be-decoded pixel is a piece of pixel data corresponding to the first pixel belonging to the group G2.

Under the assumption, the determination at Step S216 is YES, and therefore Step S217 is performed. At the step, the unpacking unit 116 obtains quantization width information Code corresponding to the second group (the group G2) from pieces of data stored in the internal memory, by reading the quantization width information Code from the internal memory. Here, the obtained quantization width information Code is assumed to indicate a code of "100".

In the quantization width setting processing at Step S218, the same processing as described previously is performed, so that the details are not explained again. In this processing, the quantization width Q is set to "2". Furthermore, the calculated surplus bit number is "0".

In this case, the set quantization width Q is a quantization width set for the three pixels belonging to the second group. Furthermore, the calculated surplus bit number is the number of surplus bit(s) corresponding to each of the three pixels belonging to the second group.

Then, the quantization width setting unit 114 provides quantization information indicating the set quantization width Q and the calculated surplus bit number, to the surplus bit count unit 115.

Then, Step S221 in FIG. 11 is performed again. Here, the determination at Step S221 is NO, and therefore the processing proceeds to Step S223.

At Step S223, the surplus bit count unit 115 determines whether or not the value of the surplus bit counter is greater then the quantization width Q indicated by the received quantization information. If the determination at Step S223 is YES, then the processing proceeds to Step S224. On the other hand, if the determination at Step S223 is NO, then the processing proceeds to Step S226 as described later.

Here, it is assumed that the value of the surplus bit counter RC is "3". It is also assumed that the quantization width Q indicated in the received quantization information is "2". Under the assumption, the determination is YES, and therefore the processing proceeds to Step S224.

At Step S224, counter value decrement processing R is performed. In the counter value decrement processing R, the surplus bit count unit 115 decrements the value (for example, "3") of the surplus bit counter RC by a value (for example, "2") of the quantization width Q indicated by the received quantization information. By the step, the surplus bit counter RC is assumed to indicate "1".

Furthermore, the surplus bit count unit 115 provides the counter decrement value information R to the quantization width setting unit 114. The counter decrement value information R is information indicating a value (for example, "2") by which the value of the surplus bit counter RC is decremented. In this case, the counter decrement value information R indicates the number of surplus bits available in the processing described later.

When the counter decrement value information R is received, the quantization width setting unit 114 provides the received counter decrement value information R to the inverse quantization processing unit 118 and the unpacking unit 116.

At Step S225, quantization width zero setting processing R is performed. In the quantization width zero setting processing R, the surplus bit count unit 115 issues quantization width zero change instruction to the quantization width setting unit 114. The quantization width zero change instruction R is instruction for setting the quantization width Q corresponding to the to-be-decoded pixel, to "0".

Then, the surplus bit counter updating processing R is completed, and the processing returns to the image decoding processing in FIG. 10 again and proceeds to Step S219.

When the quantization width zero change instruction R is received, the quantization width setting unit 114 changes the quantization width Q corresponding to the to-be-decoded pixel, to "0".

At Step S219, coded pixel data obtainment processing R is performed. Here, since the unpacking unit 116 receives the counter decrement value information R, in the coded pixel data obtainment processing R, the following obtainment processing RB is performed.

In the obtainment processing RB, the unpacking unit 116 obtains a piece of pixel data expressed by (reference bit width M+the value indicated by the counter decrement value information R) bits, namely, a piece of pixel data that is coded by consuming surplus bit(s), by reading the piece of pixel data from the internal memory.

It is assumed that the reference bit width M is 8 bits. Furthermore, the value indicated by the counter decrement value information R is assumed to be "2". Under the assumption, since a piece of pixel data corresponding to the to-be-decoded pixel is a piece of pixel data corresponding to the first pixel belonging to the group G2 shown in FIG. 9B, the unpacking unit 116 obtains a piece of pixel data corresponding to the pixel P6, by reading, as the piece of pixel data corresponding to the pixel P6, the first to tenth bits. Then, the unpacking unit 116 provides the obtained piece of pixel data to the quantization width setting unit 114.

As described above, the value of the counter decrement value information R is the number of available surplus bits.

Therefore, if the value indicated by the counter decrement value information R is "2", a piece of pixel data corresponding to the to-be-decoded pixel obtained by reading is a piece of data that is generated by using two surplus bits.

At Step S230, the same processing as described previously is performed, so that the details are not explained again. At the step, the quantization width Q of "0" corresponding to the to-be-decoded pixel, the obtained piece of pixel data, and the calculated prediction value of "320" of the to-be-decoded pixel are provided to the inverse quantization processing unit 118 and the unpacking unit 116.

Then, at Step S231, decoding processing is performed. Here, since the quantization width Q provided from the quantization width setting unit 114 indicates "0" and the inverse quantization processing unit 118 receives the counter decrement value information R described later, the following processing RB is performed in the decoding processing.

In the processing RB, the inverse quantization processing unit 118 generates a piece of data (hereinafter, referred to as a "piece of decoded data") that expresses the received piece of pixel data expressed by (reference bit width M+the value indicated by the counter decrement value information R) bits by a code-added binary digit number of a dynamic range of the piece of pixel data received by the pixel data receiving unit 101.

Then, the inverse quantization processing unit 118 provides the generated piece of decoded data to the output unit 119.

Here, it is assumed that a value indicated by the received piece of pixel data is "270". Under the assumption, the inverse quantization processing unit 118 generates a piece of decoded data that expresses, by 13 bits, the value of "270" that is indicated by 10 bits by the received piece of pixel data.

Then, the determination at Step S232 is YES, and therefore Step S234 is performed in the same manner as described previously. At the step, the output unit 119 obtains a piece of pixel data indicating a pixel value of "320" of the pixel P5, and generates a piece of decoded pixel data indicating a pixel value of "590" of the pixel P6. The output unit 119 stores the generated piece of decoded pixel data into the external memory. In addition, the output unit 119 provides the generated piece of decoded pixel data to the unpacking unit 116.

Then, Step S235 described previously is performed to increment the value of g by "1", and then Step S214 is performed again.

Then, the processing proceeds to Step S215. At the steps, a prediction value of "590" of the to-be-decoded pixel is calculated.

Then, the determination at Step S216 is NO, and therefore the processing proceeds to Step S221 in FIG. 11. Here, the determination at Step S221 is NO, and therefore the processing proceeds to Step S223.

Here, it is assumed that the value of the surplus bit counter RC is "1". It is also assumed that the quantization width Q indicated in the received quantization information is "2". Under the assumption, the determination at Step S223 is NO, and therefore the processing proceeds to Step S226.

At Step S226, quantization width change processing R is performed. In the quantization width change processing R, the surplus bit count unit 115 issues quantization width change instruction R to the quantization width setting unit 114. The quantization width change instruction R is instruction for changing a quantization width Q (for example, "2") corresponding to the to-be-decoded pixel, to a value generated by subtracting the quantization width Q by a value (for example, "1") of the surplus bit counter RC.

In receiving the quantization width change instruction R, the quantization width setting unit 114 changes the quantization width Q (for example, "2") corresponding to the to-be-decoded pixel, to a value generated by subtracting the quantization width Q by the value (for example, "1") of the surplus bit counter RC.

At Step S227, the surplus bit count unit 115 sets the value indicated by the surplus bit counter RC to "0".

Furthermore, the surplus bit count unit 115 provides the counter decrement value information R to the quantization width setting unit 114. The counter decrement value information R is information indicating a value (for example, "1") by which the value of the surplus bit counter RC is decremented. In this case, the counter decrement value information R indicates the number of surplus bits available in the processing described later.

When the counter decrement value information R is received, the quantization width setting unit 114 provides the received counter decrement value information R to the inverse quantization processing unit 118 and the unpacking unit 116.

Then, the surplus bit counter updating processing R is completed, and the processing returns to the image decoding processing in FIG. 10 again and proceeds to Step S219.

At Step S219, the obtainment processing RB as described previously is performed. It is assumed that the reference bit width M is 8 bits. Furthermore, the value indicated by the counter decrement value information R is assumed to be "1". Under the assumption, since a piece of pixel data corresponding to the to-be-decoded pixel is a piece of pixel data corresponding to the second pixel belonging to the group G2 shown in FIG. 9B, the unpacking unit 116 obtains a piece of pixel data corresponding to the pixel P7, by reading, as the piece of pixel data corresponding to the pixel P7, the first to ninth bits. Then, the unpacking unit 116 provides the obtained piece of pixel data to the quantization width setting unit 114.

As described above, the value of the counter decrement value information R is the number of available surplus bits. Therefore, if the value indicated by the counter decrement value information R is "1", a piece of pixel data corresponding to the to-be-decoded pixel obtained by reading is a piece of data that is generated by using one surplus bit.

At Step S230, the same processing as described previously is performed. At the step, the quantization width Q of "1" corresponding to the to-be-decoded pixel, the obtained piece of pixel data, and the calculated prediction value of "590" of the to-be-decoded pixel are provided to the inverse quantization processing unit 118.

At Step S231, the above-described decoding processing is performed. Here, it is assumed that the inverse quantization processing unit 118 receives a quantization width Q of "1" from the quantization width setting unit 114, and receives the counter decrement value information R. Under the assumption, the processing RB described below is performed in the decoding processing.

In the processing RB, as described previously, the inverse quantization processing unit 118 generates a piece of data (hereinafter, referred to as a "piece of decoded data") that expresses the received piece of data expressed by (reference bit width M+ the value indicated by the counter decrement value information R) bits by a code-added binary digit number of a dynamic range of the piece of pixel data received by the pixel data receiving unit 101.

Here, it is assumed that a value indicated by the received piece of pixel data is "−250". Under the assumption, the inverse quantization processing unit 118 generates a piece of decoded data that expresses, by 13 bits, the value of "−250" indicated by the received piece of pixel data.

Here, the determination at Step S232 is NO, and therefore the processing proceeds to Step S233. Hereinafter, a quantization width Q indicating a value of 1 or greater is referred to as a "non-zero quantization width Q".

At Step S233, inverse quantization processing is performed. In the inverse quantization processing, the inverse quantization processing unit 118 inversely quantizes the value of the piece of decoded data, by multiplying the value by the Q-th power of 2. Hereinafter, a value generated by inverse quantization is referred to as an "inverse quantized value".

Here, it is assumed that a value indicated by the piece of decoded data is "−250". It is also assumed that a quantization width Q corresponding to the to-be-decoded pixel indicates "1". Under the assumption, the inverse quantization processing unit 118 obtains an inverse quantized value of "−500", by multiplying (a) "−250" that is the value indicated by the obtained piece of pixel data by (b) the first power of 2 (2).

Then, the inverse quantization processing unit 118 provides the piece of decoded data indicating the inverse quantized value (for example, "−500") to the output unit 119.

Then, Step S234 is performed in the same manner as described previously. At the step, the output unit 119 obtains a piece of pixel data indicating a pixel value of "590" of the pixel P6, and generates a piece of decoded pixel data indicating a pixel value of "90" of the pixel P7. The output unit 119 stores the generated piece of decoded pixel data into the external memory. In addition, the output unit 119 provides the generated piece of decoded pixel data to the unpacking unit 116.

Then, Step S235 described previously is performed to increment the value of g by "1", and then Step S214 is performed again.

Then, at least a part of Steps S214 to S234 is repeated until the determination at Step S235 is YES.

If the determination at Step S235 is YES, then the processing proceeds to Step S237.

At Step S237, the surplus bit count unit 105 sets the value indicated by the surplus bit counter to "0".

At Step S238, the packing unit 116 determines whether or not the decoding processing is completed for the entire to-be-decoded picture. If the determination at Step S238 is YES, then the image decoding processing is completed. On the other hand, if the determination at Step S238 is NO, then Step S213 is performed again.

Then, at least a part of Steps S213 to S237 is repeated until the determination at Step S238 is YES. Eventually, all pieces of coded data necessary to reconstruct a picture are decoded.

It should be note that the image decoding processing according to the first embodiment may be implemented as hardware such as a Large Scale Integration (LSI).

As described above, in the image coding processing according to the first embodiment, if the number (code-added prediction difference binary number) of digits of binary data that expresses a prediction difference value of a pixel by code-added binary number is smaller than the reference bit width M, the prediction difference value is coded by leaving bit(s). Furthermore, if the code-added prediction difference binary number is greater than the reference bit width M and there is any surplus bit, the value is expressed by (reference bit width M+value indicated by available surplus bit number).

Thereby, it is possible to eliminate the quantization processing, or decrease the quantization width Q in the quantization processing. As a result, it is possible to suppress deterioration of image quality due to quantization errors. In other words, it is possible to reduce a degree of deterioration of image quality caused by coding.

In addition, in the first embodiment, pieces of coded data having the fixed bit width (s bits) are consecutively stored in the external memory. One piece of coded data includes pieces of coded pixel data necessary for reconstructing a picture. Therefore, if it is required to access a certain piece of coded pixel data, it is necessary only to access a piece of coded data including the piece of coded pixel data. Therefore, random accessibility for the data can be kept.

Furthermore, the fixed bit width (s bits) is set to a bus width of data transfer of a used integrated circuit. The fixed length of the bus width can be secured. Therefore, implementation is possible without losing random accessibility.

As described above, the first embodiment can reduce a degree of deterioration of image quality while keeping random accessibility.

Second Embodiment

In the second embodiment, description is given for an example of a digital still camera including the image coding device 100 and the image decoding device 110 which have been described in the first embodiment.

Figure 12:
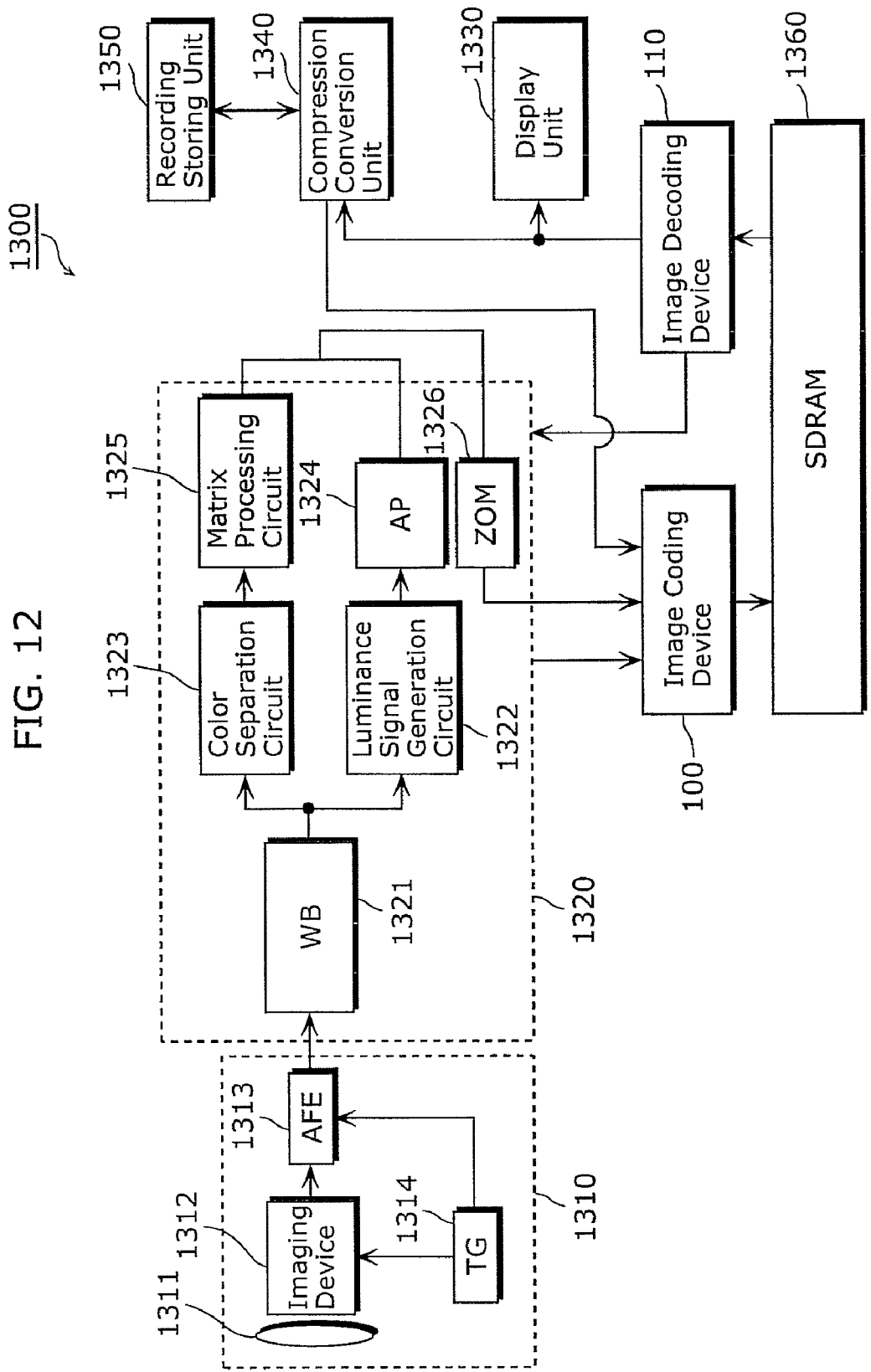
FIG. 12 is a block diagram showing a structure of a digital still camera according to a second embodiment.

FIG. 12 is a block diagram showing a structure of a digital still camera 1300 according to the second embodiment.

As shown in FIG. 12, the digital still camera 1300 includes the image coding device 100 and the image decoding device 110. Since the structures and functions of the image coding device 100 and the image decoding device 110 have been described in the first embodiment, they will not be described in detail again later.

The digital still camera 1300 includes an imaging unit 1310, an image processing unit 1320, a display unit 1330, a compression conversion unit 1340, a recording storing unit 1350, and a Synchronous Dynamic Random Access Memory (SDRAM) 1360.

The imaging unit 1310 captures image of an object and generates digital image data corresponding to the image. In this example, the imaging unit 1310 includes an optical system 1311, an imaging device 1312, an Analog Front End (abbreviated to AFE in FIG. 12) 1313, and a timing generator (abbreviated to TG in FIG. 12) 1314.

The optical system 1311 is a lens or the like which forms image of an object onto the imaging device 1312. The imaging device 1312 converts light incident from the optical system 1311 into electric signals. Examples of the imaging device 1312 are an imaging device using a Charge Coupled Device (CCD), an imaging device using CMOS, and other various imaging devices.

The analog front end 1313 performs signal processing such as noise cancellation, signal amplification, analog/digital conversion for analog signals provided from the imaging device 1312. Then, the analog front end 1313 generates image data indicating data obtained by the above signal processing. The generated image data consists of plural pieces of pixel data. The piece of piece of pixel data is RAW data.

The timing generator 1314 provides clock signals to the imaging device 1312 and the analog front end 1313. Based on the clock signals, the imaging device 1312 and the analog front end 1313 perform their operations.

The image processing unit 1320 performs predetermined image processing for the pieces of pixel data (RAW data) provided from the imaging unit 1310. Then, the image processing unit 1320 provides the pieces of pixel data (RAW data), for which the image processing have been performed, to the image coding device 100.

As shown in FIG. 12, the image processing unit 1320 generally includes a white balance circuit (abbreviated to WB in FIG. 12) 1321, a luminance signal generation circuit 1322, a color separation circuit 1323, an aperture correction processing circuit (abbreviated to AP in FIG. 12) 1324, a matrix processing circuit 1325, and a zoom circuit (abbreviated to ZOM in FIG. 12) 1326 that enlarges and reduces image.

The white balance circuit 1321 is a circuit that corrects color components, which are generated using a color filter of the imaging device 1312, to have a correct ratio, so that a white object is imaged as white under any light source.

The luminance signal generation circuit 1322 generates luminance signals (Y signals) from RAW data. The color separation circuit 1323 generates color difference signals (Cr/Cb signals) from RAW data.

The aperture correction processing circuit 1324 performs processing to increase a resolution by adding high-frequency components to luminance signals generated by the luminance signal generation circuit 1322. The matrix processing circuit 1325 adjusts, for the data provided from the color separation circuit 1323, hue balance that has been lost due to spectral characteristics of the imaging device or image processing.

In general, the image processing unit 1320 commonly temporarily stores a piece of pixel data to be processed into a memory such as a SDRAM, then performs predetermined image processing, YC signal (luminance signal or color difference signal) generation, zoom processing, and the like for the data temporarily stored, and temporarily stores the resulting processed data again into the SDRAM.

Therefore, it is considered that the image processing unit 1320 performs processing for providing data to the image coding device 100 and processing for receiving data from the image decoding device 110.

The display unit 1330 displays image data (decoded image data) provided from the image decoding device 110.

The compression conversion unit 1340 performs, according to a predetermined standard, compression-conversion for the image data provided from the image decoding device 110, and provides the resulting converted JPEG image data to the recording storing unit 1350. Furthermore, the compression conversion unit 1340 performs decompression-conversion for the JPEG image data that is read out from the recording storing unit 1350, and provides the resulting converted data to the image coding device 100.

In other words, the compression conversion unit 1340 can process data compliant with JPEG standard. Such compression conversion unit 1340 is generally embedded in a digital still camera.

The recording storing unit 1350 receives compressed image data and records the image data onto a recording medium (such as a nonvolatile memory). In addition, the recording storing unit 1350 reads the compressed image data from the recording medium, and provides the image data to the compression conversion unit 1340.

It should be noted that data processed by the image coding device 100 and the image decoding device 110 according to the second embodiment is not limited to RAW data. For example, the data processed by the image coding device 100 and the image decoding device 110 may be data of YC signal (luminance signal or color difference signal) that is generated from RAW data by the image processing unit 1320, or data (luminance signal data or color difference signal data) that is generated by decompressing JPEG image data that has been compression-converted to JPEG or the like, for example.

As described above, the digital still camera 1300 according to the second embodiment includes the image coding device 100 and the image decoding device 110 which process RAW data, YC signals, and the like, in addition to the compression conversion unit 1340 that is generally embedded in a digital still camera.

Thereby, the digital still camera 1300 according to the second embodiment can perform high-speed imaging operation increasing the number of consecutive pictures having the same resolution, while having the same memory capacity. In addition, the digital still camera 1300 can increase a resolution of moving pictures which are stored in a memory having the same capacity.

Furthermore, the structure of the digital still camera 1300 described in the second embodiment can also be applied to a structure of a digital camcorder that includes an imaging unit, an image processing unit, a display unit, a compression-conversion unit, a recording storage unit, and a SDRAM as the digital still camera 1300 does.

First Variation of Second Embodiment

It should be noted that, when a piece of pixel data provided from the image processing unit 1320 to the image coding device 100 is YC signal (luminance signal or color difference signal) data, it is also possible to perform coding of color difference signal data prior to coding of the luminance signal data in processing of generating data having a fixed bit width (s bits) set by the fixed bit width setting unit 107 in FIG. 1. The YC signal data is data converted in the image processing unit 1320.

Color difference signals do not have any sharp edge in comparison to luminance signal, since high-frequency components have been lost in a stage of being generated in the image processing unit 1320. Therefore, regarding color difference signals, it is expected that a prediction accuracy of a prediction value corresponding to a to-be-coded pixel is high and a quantization width Q is low. Thereby, it is considered that a value of the surplus bit counter is likely to be incremented for color difference signals.

Therefore, if coding of color difference signal data is performed prior to coding of the luminance signal data in the processing of generating data having the fixed bit width (s bits), a large number of surplus bits are produced. Thereby, it is possible to allocate more bits in coding luminance signal data that is visually sensitive. As a result, it is possible to code pixel data while suppressing visual deterioration.

Second Variation of Second Embodiment

In the second variation of the second embodiment, description is given for a variation where, when a piece of pixel data provided from the image processing unit 1320 to the image coding device 100 is YC signal (luminance signal or color difference signal) data, IQ axes conversion is performed on the color difference signal data to be coded.

IQ signal, on which the IQ axes conversion has been performed, is generated by modulating color difference signal. The IQ signal is expressed by the following equations.

$$I = 0.6R - 0.28G - 0.32B \quad \text{(Equation 9)}$$

$$Q = 0.21R - 0.52G + 0.31B \quad \text{(Equation 10)}$$

In the equations (9) and (10), R represents red signal component of color difference signal, G represents green signal component of color difference signal, and B represents blue signal component of color difference signal.

The IQ signal generated in the above modulation is a signal that simplifies color difference signals by human visual characteristics. If an I axis is set to an "orange-cyanogen axis" having the highest resolution for human eyes in the chromaticity diagram, I signal is used to be propagated in a wide band because I signal deals in detail. If a Q axis is set to an "yellow-magenta axis" which is perpendicular to the I axis and has the lowest resolution for human eyes in the chromaticity diagram, Q signal is used to be propagated in a narrow band.

In other words, even if an information amount of Q signal is restricted to some extend, it is possible to achieve propagation with reduced visual image quality deterioration. Therefore, by modulating color difference signal to IQ signal in the image coding device 100, it is possible to decrease the number of bits for the Q signal as much as possible, and allocate the bits to luminance signal that is sensitive for human eyes.

Figure 13A:
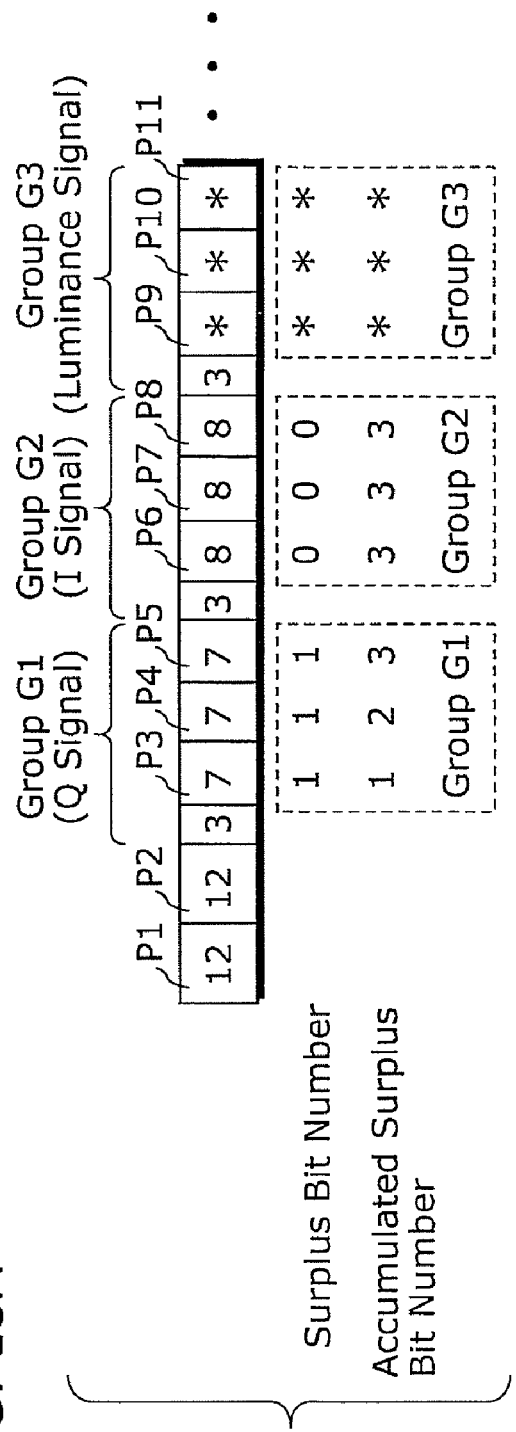
FIG. 13A is a diagram for explaining processing for IQ signals and luminance signals.

More specifically, as shown in FIG. 13A, Q signal is allocated to the group G1, and a bit width, which is generated by subtracting "1" from the reference bit width M, is ensured for a piece of coded pixel data of the Q signal. Redundant bits are previously ensured as surplus bits, for the number of pixels of Q signal which are packed in data having the fixed bit width (s bits) set by the fixed bit width setting unit 107.

Furthermore, as described in the first variation of the second embodiment, color signal is prioritized to be coded first among the data having the fixed bit width (s bits) (I signal is allocated to the group G2). Thereby, it is possible to prevent consumption of surplus bits, and to allocate, as much as possible, surplus bits to luminance signal that is visually sensitive.

As shown in FIG. 13A, if I signal is allocated to the group G2, surplus bits are neither increased nor decreased. However, it is considered that surplus bits are consumed (used) if components of I signal have a sharp change, and that the number of accumulated surplus bits is increased if the components have no change.

It is assumed in FIG. 13A that, for I signal, there is no input of pixel data that changes a value of the surplus bit counter. By allocating luminance signal to a later part of the group, it is possible to use all of increasing surplus bits for the luminance signal. This means that luminance signal data is coded by using surplus bits. As a result, it is possible to code pixel data while suppressing visual deterioration.

Furthermore, since increased or decreased surplus bit(s) and a bit width of a piece of coded pixel data which is generate by consuming surplus bit(s) depend on an input piece of piece of pixel data, they are shown as "*" in FIG. 13A.

It should be noted that it is possible to previously allocate bit(s) caused by decrease of a bit width of a piece of coded pixel data of Q signal, to a bit width of a piece of coded pixel data of luminance signal. More specifically, if a bit width of a piece of coded pixel data of Q signal is generated by subtracting "1" from the reference bit width M, it is possible to express luminance signal, which is packed in data having the same fixed bit width (s bits), by a bit width (reference bit width M+1).

Figure 13B:
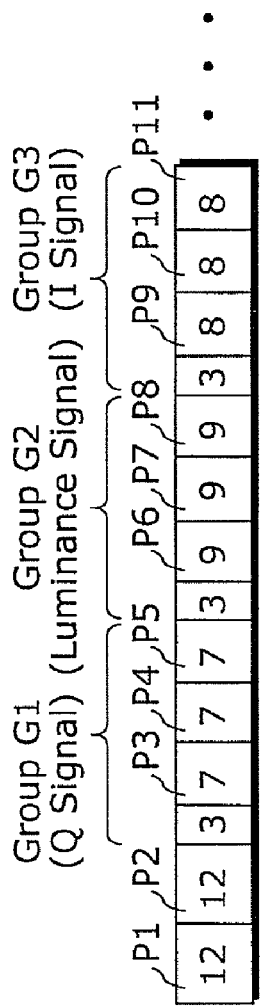
FIG. 13B is a diagram for explaining processing for IQ signals and luminance signals.

The reference bit width M in the above case is shown in FIG. 13B. As shown in FIG. 13B, in the second variation of the second embodiment, it is possible to previously allocate more bits to luminance signal that is visually sensitive, without prioritizing coding of color signal to be performed first among the data having the fixed bit width (s bits). As a result, it is possible to code pixel data while suppressing visual deterioration.

Third Embodiment

In the third embodiment, description is given for an example where each of the image coding device and the image decoding device, which have been described in the first embodiment, further includes a surplus bit control unit.

Figure 14:
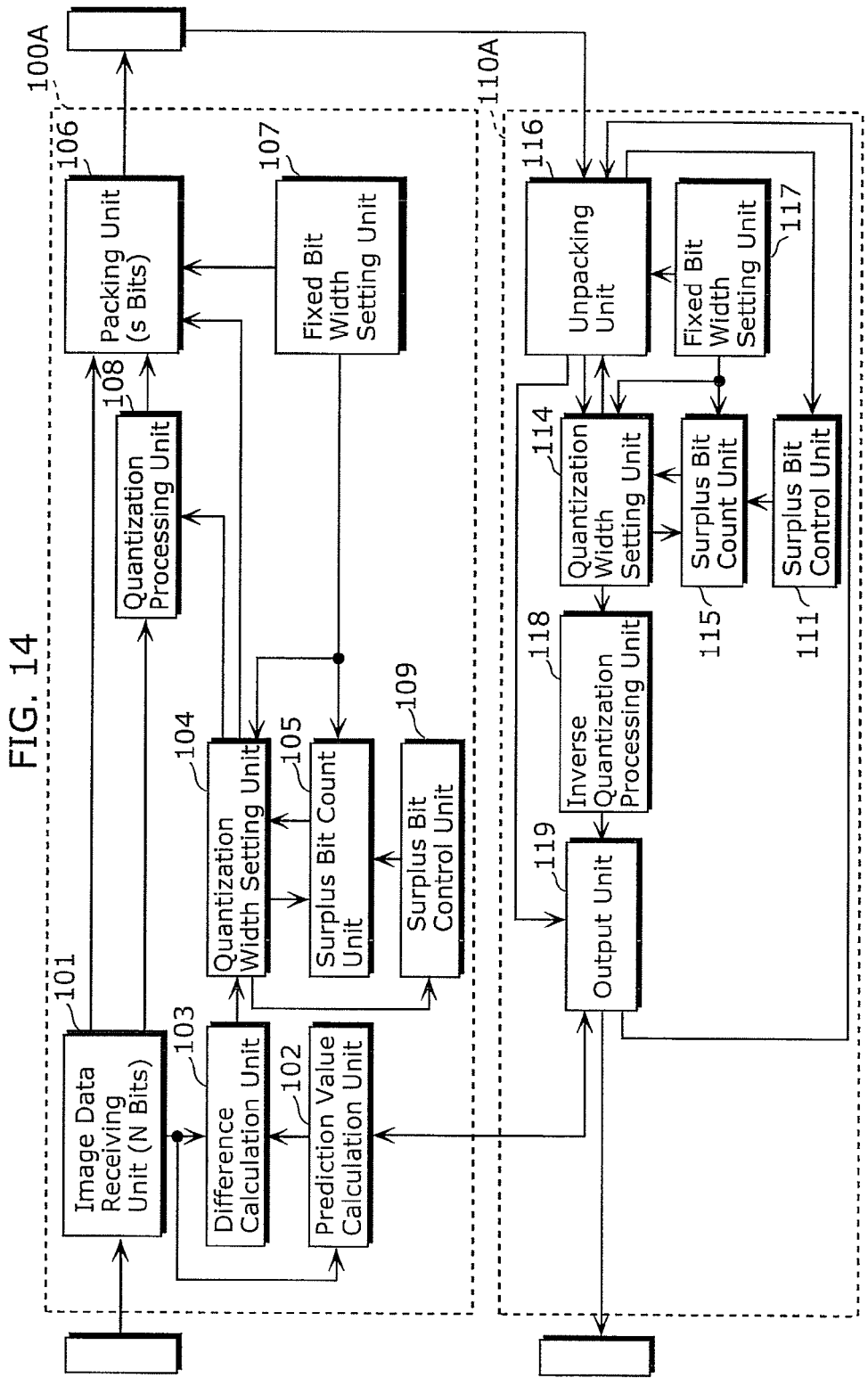
FIG. 14 is a block diagram showing structures of an image coding device and an image decoding device according to a third embodiment.

FIG. 14 is a block diagram showing structures of an image coding device 100A and an image decoding device 110A according to the third embodiment.

As shown in FIG. 14, the image coding device 100A differs from the image coding device 100 in FIG. 1 in further including a surplus bit control unit 109. Except the difference, the image coding device 100A is the same as the image coding device 100, and therefore the detailed description of the image coding device 100A is not repeated below. In addition, the image decoding device 110A differs from the image decoding device 110 in FIG. 1 in further including a surplus bit control unit 111. Except the difference, the image decoding device 110A is the same as the image decoding device 110, and therefore the detailed description of the image decoding device 110A is not repeated below.

(Coding Processing)

First, image coding processing in the case where the number of used surplus bits is not controlled is described.

Each of FIGS. 15A and 15B is a diagram for explaining the image coding processing in the case where the number of used surplus bits is not controlled.

FIG. 15A shows, as an example, 11 pieces of pixel data among 26 pieces of pixel data which are provided into the pixel data receiving unit 101. Each item shown in FIG. 15A are the same as explained with reference to FIG. 9A, and will not be therefore explained again.

It is assumed that the pixel data receiving unit 101 receives pieces of 12-bit pixel data corresponding to respective pixels in an order of the pixel P1, P2, . . . , P11. A numeral value indicated in each of the pixels P1 to P11 is a pixel value indicated in each piece of pixel data. It is also assumed that the pixel data corresponding to the pixel P1 is an initial pixel value data of green, and that the pixel data corresponding to the pixel P2 is an initial pixel value data of red.

In this example, a prediction value of a to-be-coded pixel is calculated by using the previously-described prediction equation (1). In other word, a prediction value of a to-be-coded pixel is a pixel value of a pixel on the immediately left of the to-be-coded pixel. Furthermore, in this example, a value (prediction difference value) of a difference between (a) a pixel value of the to-be-coded pixel and (b) the pixel value of the pixel on the immediately left of the to-be-coded pixel is quantized.

Moreover, in this example, a relationship among quantization width information Code, a prediction difference absolute value, a quantization width Q, and a surplus bit number is referred to the data table DT110 in FIG. 8.

The quantization width Q is, as described in the first embodiment, calculated from a maximum prediction difference absolute value that is calculated from prediction difference values of neighboring three pixels belonging to each group. The three pixels belonging to each group are quantized by the same quantization width Q.

FIG. 15B is a diagram showing a piece of pixel data (coded pixel data) that is generated by coding processing of the image coding device 100A. In FIG. 15B, a numeral value indicated in each piece of coded pixel data indicates the number of bits of the piece of coded pixel data.

In the image coding processing of this example, the same processing as described in the first embodiment is performed, so that a quantization width Q corresponding to three pixels belonging to the group G1 is set to "0". Therefore, a code of "000" is selected for quantization width information Code. Therefore, after coding prediction difference values of the three pixels belonging to the group G1, 6 surplus bits are produced. For each of the three pixels, a piece of coded pixel data can be expressed by 6 bits.

In each of the groups G2 and G3, there are a plurality of sharp level changes of pixel values. A quantization width Q is set to "4" in each of the groups G2 and G3.

However, when a prediction difference value corresponding to the pixel P6 (pixel value of "1590"), 4 surplus bits are used (consumed). In addition, when a prediction difference value corresponding to the next pixel P7 (pixel value of "2000"), 2 surplus bits are used (consumed). Therefore, at this timing, the accumulated surplus bit number is "0".

Therefore, after that, subsequent sharp edges are not solved at all, and coding is performed with the reference bit width M.

Figure 16A:
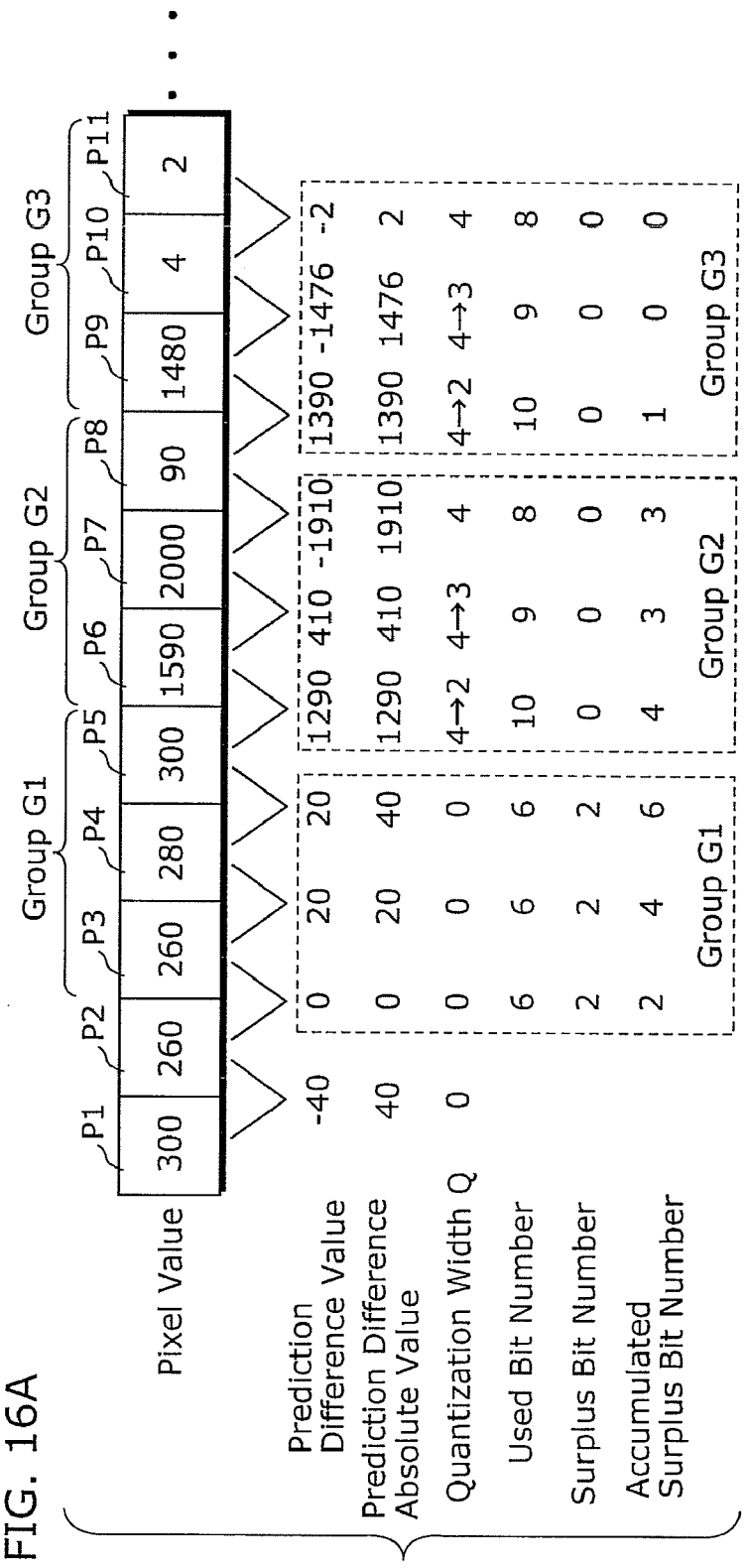
FIG. 16A is a diagram for explaining image coding processing in the case where the number of used surplus bits is controlled.
Figure 16B:
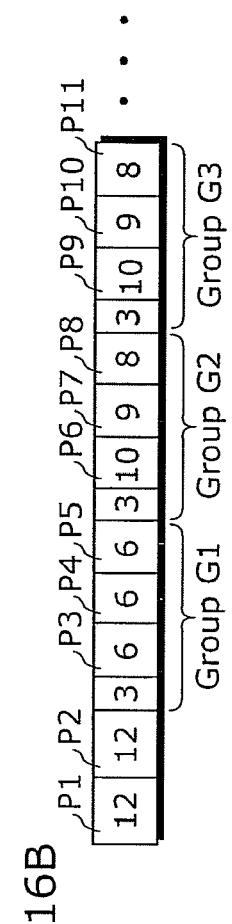
FIG. 16B is a diagram for explaining image coding processing in the case where the number of used surplus bits is controlled.

Each of FIGS. 16A and 16B is a diagram for explaining the image coding processing in the case where the number of used surplus bits is controlled.

FIG. 16A shows, as an example, 11 pieces of pixel data among 26 pieces of pixel data which are provided into the pixel data receiving unit 101. It should be noted that the 11 pieces of pixel data shown in FIG. 16A are the same as the 11 pieces of pixel data shown in FIG. 15A. The pixels except the pixels P1 and P2 shown in FIG. 16A are to-be-coded pixels that are to be coded.

The processing in the third embodiment is performed for the group G1 under the same conditions, and therefore 6 surplus bits are produced. The third embodiment is characterized in that the surplus bit control unit 109 controls the number (a value of the surplus bit counter) of used surplus bits so that local quantization errors are distributed.

In the third embodiment, the processing for controlling used surplus bits is referred to as "surplus bit control processing". It is assumed that the following processing is performed first prior to the surplus bit control processing.

First, the quantization width setting unit 104 provides the surplus bit control unit 109 with information of a quantization width Q of each group in data having a fixed bit width (s bits).

The surplus bit control unit 109 measures an occurrence frequency of prediction errors from the received information of the quantization width Q of each group. In the processing, how many surplus bits are to be ensured for each group is estimated.

For example, if the pieces of pixel data shown in FIG. 16A are provided to the image coding device 100A, the quantization width setting unit 104 provides the surplus bit control unit 109 with codes of "000", "110", and "110" which are pieces of quantization width information Code.

Then, the surplus bit control processing is performed.

Figure 17:
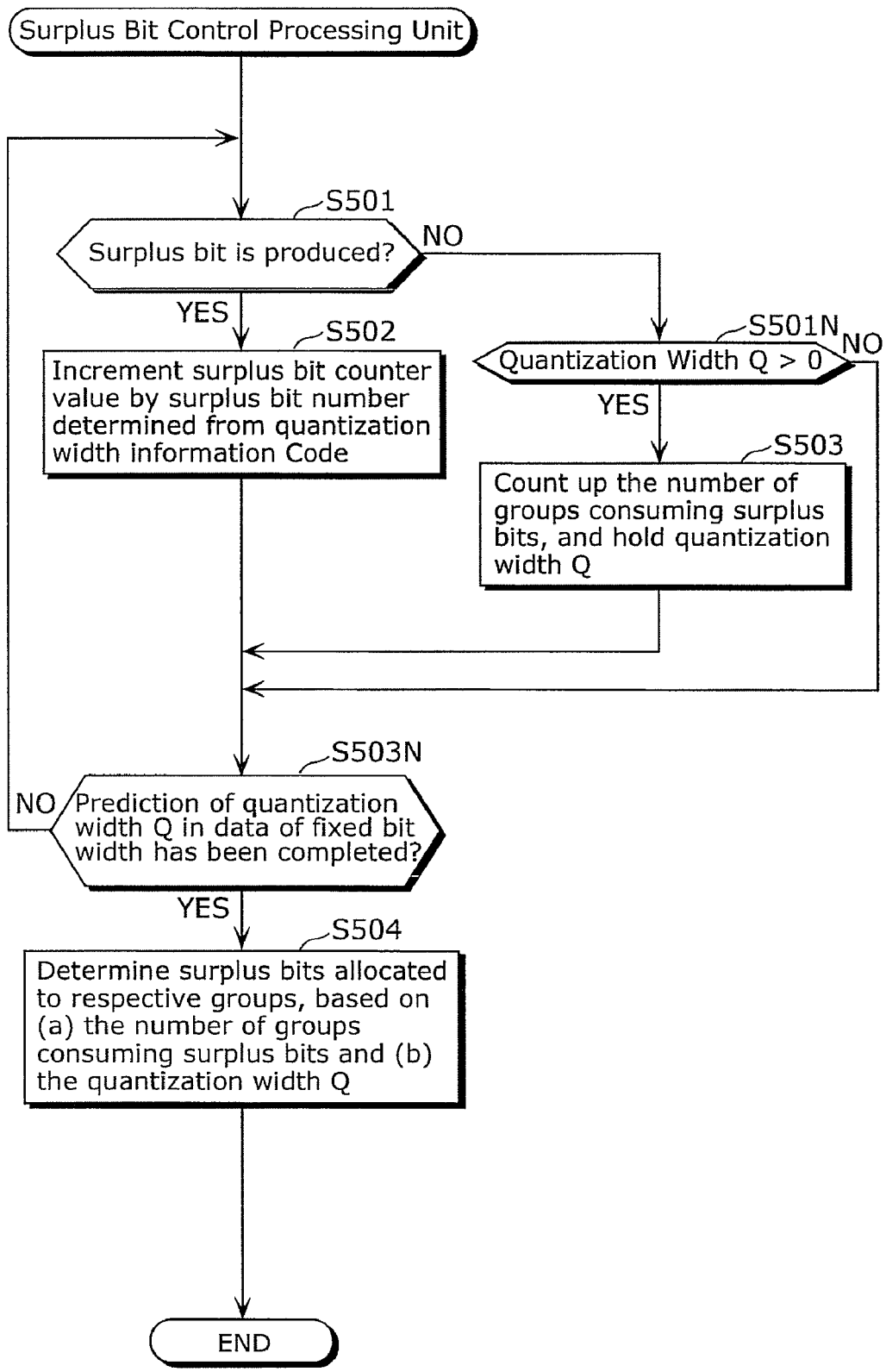
FIG. 17 is a flowchart of surplus bit control processing.

FIG. 17 is a flowchart of the surplus bit control processing.

The surplus bit control unit 109 receives the codes of "000", "110", and "110" which are pieces of quantization width information Code, and thereby determines that 2 surplus bits per one pixel are produced in the group G1. Therefore, the value of the surplus bit counter is increased to be 6 (S501, S502).

In each of the group G2 and G3, a corresponding quantization width Q is greater than "0". Therefore, prior to quantization, the surplus bit control unit 109 can predict that surplus bit(s) is to be used (consumed) (S503). Therefore, in the surplus bit control processing, instruction to consume a half (three bits) of the 6 surplus bits for each of the group G2 and the group G3 is issued to the surplus bit count unit 105 (S504).

In addition, a maximum bit number of surplus bits which can be consumed in single coding processing (including quantization processing) is previously determined. Thereby, it is possible to distribute consumption of surplus bits in a group. More specifically, a maximum bit number of surplus bits which can be consumed in single coding processing is previously determined to be 2 bits. In this case, when a prediction difference value corresponding to the pixel P6 in FIG. 15A is to be coded, 2 surplus bits, which are the maximum bit number, are consumed.

When a prediction difference value corresponding to the pixel P7 next to the pixel P6 is to be coded, there are 4 surplus bits and the number of surplus bits consumable in the group G2 is one. Therefore, when the prediction difference value corresponding to the pixel P7 is to be coded, one surplus bit is used (consumed).

When a prediction difference value corresponding to the pixel P8 is to be coded, there are 3 surplus bits. However, since the number of the surplus bits exceeds the number of surplus bits consumable in the group G2, the surplus bits are not consumed for quantization in this case.

Also in the group G3, three surplus bits can be consumed. Therefore, when the prediction difference value corresponding to the pixel P9 is to be coded, 2 surplus bits, which is a maximum bit number, is consumed. When a prediction difference value corresponding to the pixel P10 is to be coded, there is one surplus bit and therefore the quantization width Q can be decremented by "1".

When a prediction difference value corresponding to the pixel P11 belonging to the group G3 is to be coded, there is no more surplus bit and therefore any surplus bit is not used in coding the prediction difference value.

In the example of FIG. 16A, since the quantization width Q of the group G2 is the same as the quantization width Q of the group G3, a plurality of produced surplus bits are divided into halves to be allocated.

It should be noted in Step S504 in FIG. 17 that surplus bits may be allocated based on a quantization width of a group consuming the surplus bits so that more surplus bits are allocated for a greater quantization width.

Next, description is given for processing (hereinafter, referred to as "surplus bit counter updating processing A") for updating the surplus bit counter which is performed by the surplus bit count unit 105 in the third embodiment.

The surplus bit counter updating processing A is processing performed instead of the surplus bit counter updating processing at Step S120 in the image coding processing in FIG. 2.

Figure 18:
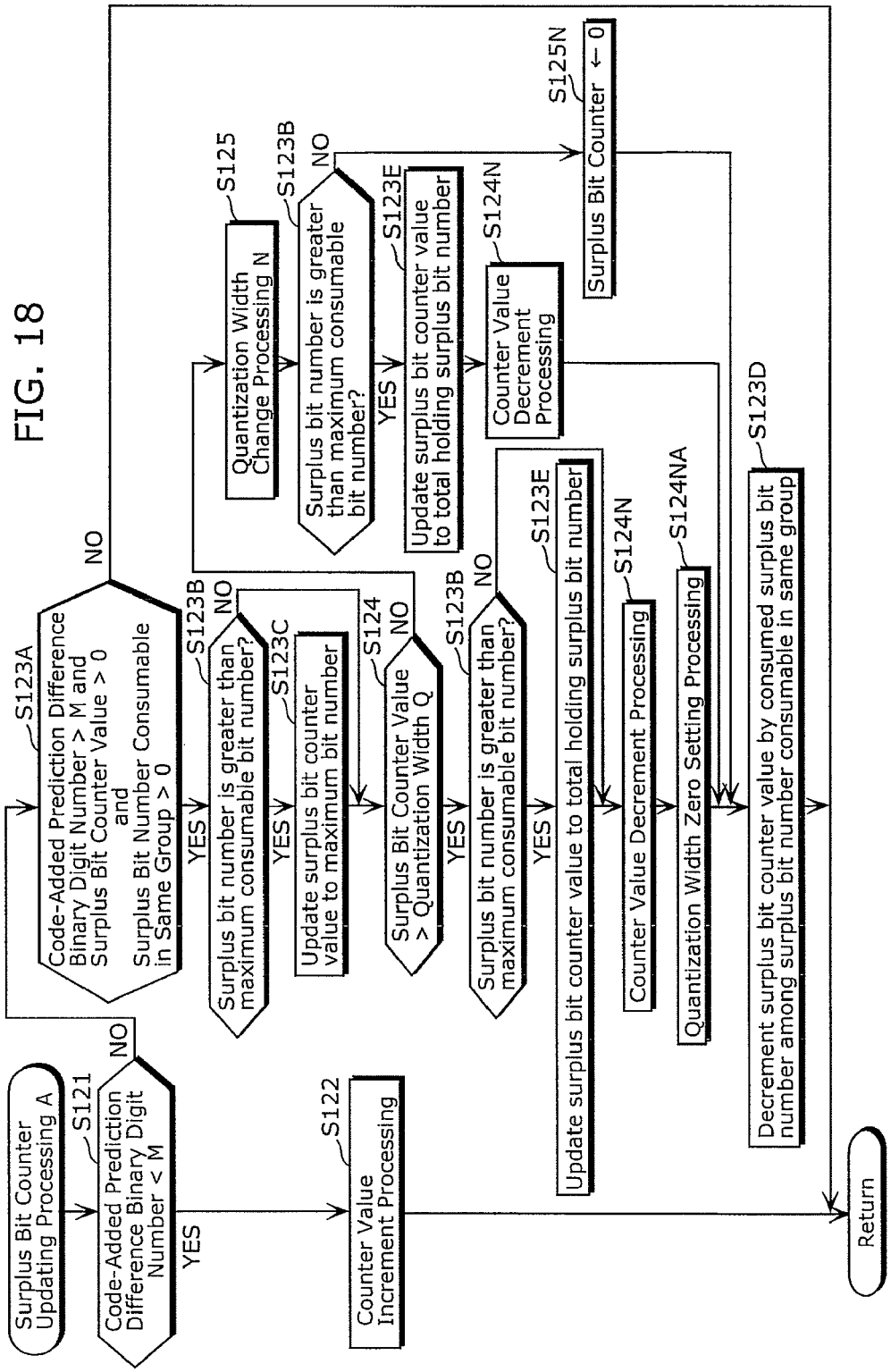
FIG. 18 is a flowchart of surplus bit counter updating processing A.

FIG. 18 is a flowchart of the surplus bit counter updating processing A. As shown in FIG. 18, the surplus bit counter updating processing A differs from the surplus bit counter updating processing in FIG. 3 in that Step S123A is performed instead of Step S123, and that Steps S123B, S123C, S123D, and S123E are further performed.

It should be noted that the same step numerals in FIG. 3 assigned to the steps described in the first embodiment are assigned to the identical steps in FIG. 18, so that the details are not explained again.

First, Step S123A, which is performed when consumption of surplus bit(s) is necessary, differs from Step S123 in adding a determination as to whether or not there is any surplus bit consumable in the same group. In other words, Step S123A controls the number of surplus bits not to exceed the number of surplus bits consumable in the group.

Next, Step S123B determines whether or not the number of surplus bits is greater than a consumable maximum bit number. If the number of surplus bits is greater than the consumable maximum bit number (YES at S123B), then the surplus bit count unit 105 updates the value of the surplus bit counter to be the consumable maximum bit number (S123C). Thereby, control is performed to distribute consumption of surplus bits in the group.

Next, at Step S123D, the surplus bit count unit 105 decrements the value of the surplus bit counter by the number of consumed surplus bits among the number of consumable surplus bits in the same group. At the step, when a prediction difference value corresponding to a next pixel in the same group is to be coded, a threshold value is updated not to exceed the number of consumable surplus bits in the group.

Next, if the determination at Step S123B is made that the number of surplus bits is greater than the maximum consumable bit number (YES at S123B), then, at Step S123E, the surplus bit count unit 105 updates the value of the surplus bit counter, which has been updated to the maximum consumable bit number, to the previous surplus bit number (a total number of holding surplus bits).

In the first embodiment, quantization errors are suppressed in an order of occurrence. However, in the third embodiment, the surplus bit control unit 109 predicts pieces of pixel data in data having the fixed bit width (s bits). By the processing, quantization errors are not locally solved, but quantization errors can be suppressed as much as possible within a range of available surplus bits, and can be distributed.

(Decoding Processing Performed by Image Decoding Device 110A)

In the decoding processing in the third embodiment, the unpacking unit 116 separates obtained data into a piece of initial pixel value data, pieces of coded pixel data, and quantization width information Code. Therefore, the surplus bit control unit 111 in the image decoding device 110A previously obtains only the quantization width information Code. By the processing, the surplus bit control unit 111 can easily estimate how many surplus bits are to be ensured for each group.

The control processing of the surplus bit control unit 111 is the same as the surplus bit control unit 109 described with reference to FIG. 17, so that the description is not repeated in detail below.

First Variation of Third Embodiment

In the third embodiment, the surplus bit control unit 109 obtains, from the quantization width setting unit 104, information of a quantization width Q of each group among the data having the fixed bit width (s bits). By the processing, the surplus bit control unit 109 estimates how many surplus bits are to be ensured for each group in data having the fixed bit width.

However, in the above method, as shown in FIG. 17, it is impossible to determine surplus bits to be allocated to each group until all prediction processing of the quantization width Q in data having the fixed bit width has been completed. Therefore, in the image coding processing, processing delay occurs.

Therefore, it is possible to previously determine only a maximum consumable bit number per one quantization, without predicting a quantization width Q in data having the fixed bit width. Thereby, it is possible to distribute local quantization errors in data having the fixed bit width.

However, according to the first variation of the third embodiment, even if there is only one sharp change in pixel data to be included in data having the fixed bit width, there are disadvantages that the number of consuming surplus bits is restricted.

Therefore, in the coding processing, it is possible to switch between the third embodiment and the first variation depending on necessity.

Fourth Embodiment

In the fourth embodiment, description is given for an example of a structure of a digital still camera in the case where an imaging device provided in the digital still camera includes an image coding device.

Figure 19:
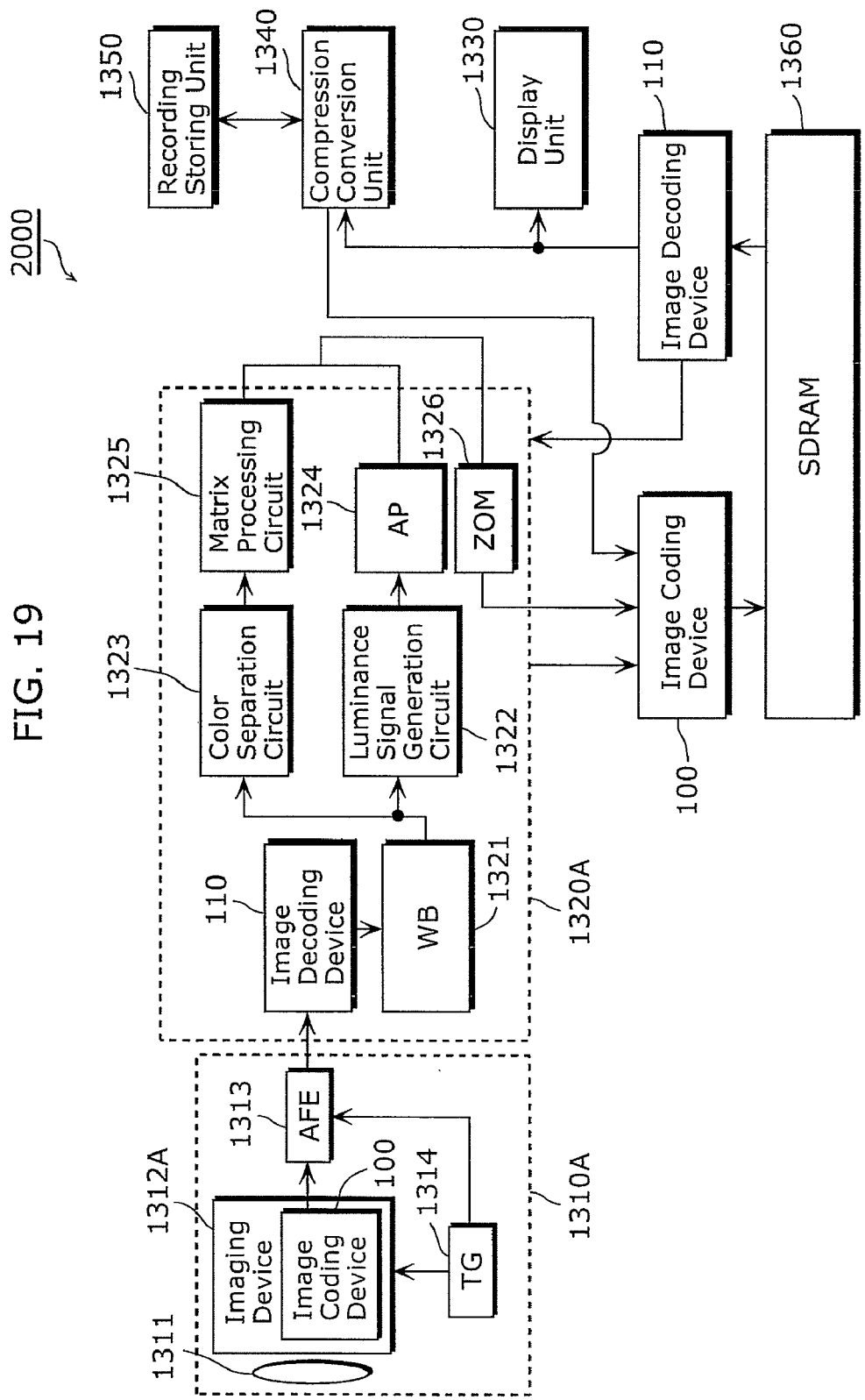
FIG. 19 is a block diagram showing a structure of a digital still camera according to a fourth embodiment.

FIG. 19 is a block diagram showing a structure of the digital still camera 2000 according to the fourth embodiment. As shown in FIG. 19, the digital still camera 2000 differs from the digital still camera 1300 in FIG. 12 in that an imaging unit 1310A is included instead of the imaging unit 1310, and that an image processing unit 1320A is included instead of the image processing unit 1320. Other units in the structure are the same as those in the digital still camera 1300, so that they are not described in detail again below.

The imaging unit 1310A differs from the imaging unit 1310 in FIG. 12 in that an imaging device 1312A is included instead of the imaging device 1312. Other units in the structure are the same as those in the imaging unit 1310, so that they are not described in detail again below. The imaging device 1312A includes the image coding device 100 shown in FIG. 1.

Furthermore, the image processing unit 1320A differs from the image processing unit 1320 in FIG. 12 in that the image decoding device 110 in FIG. 1 is further included. Other units in the structure are the same as those in the image processing unit 1320, so that they are not described in detail again below.

The image coding device 100 included in the imaging device 1312A codes pixel signals generated by the imaging device 1312A, and provides the resulting coded data to the image decoding device 110 in the image processing unit 1320A.

The image decoding device 110 in the image processing unit 1320A decodes the data provided from the image coding device 100. By the processing, it is possible to improve efficiency of data transfer between the imaging device 1312A and the image processing unit 1320A in an integrated circuit.

Therefore, the digital still camera 2000 according to the fourth embodiment can perform, better than the digital still camera 1300 according to the second embodiment, high-speed imaging operations such as an operation for increasing the number of consecutive pictures having the same resolution, an operation for increasing a resolution of moving pictures, for example, while having the same memory capacity.

Fifth Embodiment

In general, printer apparatuses are required to print print objects with a higher accuracy and at a higher speed. Therefore, the following processing is commonly performed.

First, a personal computer performs compression-coding for digital image data to be printed, and provides the resulting coded data to a printer. Then, the printer decodes the received coded data.

Here, in the fifth embodiment, the image coding device 100 according to the first embodiment is embedded in the personal computer, and the image decoding device 110 according to the first embodiment is embedded in the printer, so that image quality deterioration of printed objects can be suppressed.

Figure 20:
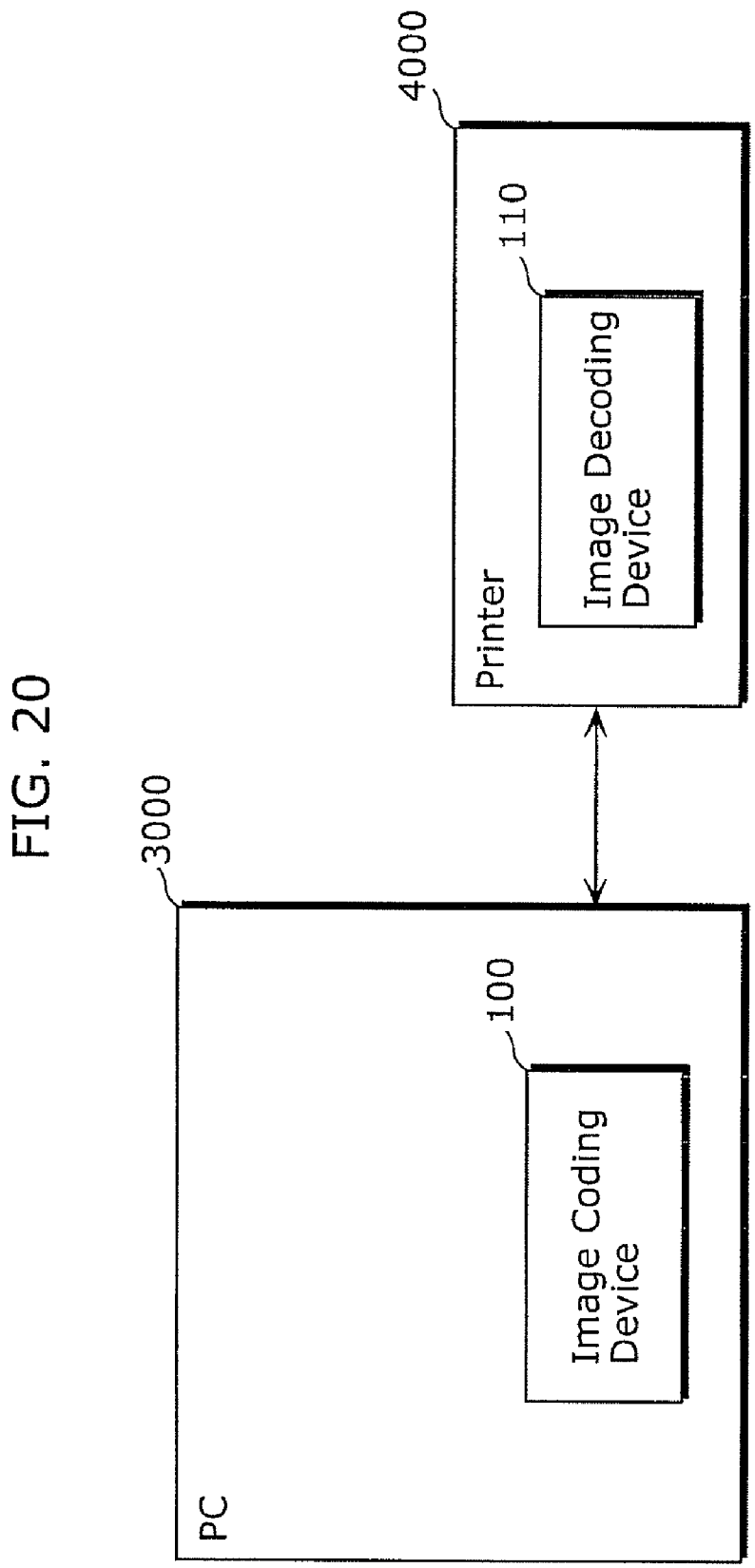
FIG. 20 is a diagram showing a personal computer and a printer according to a fifth embodiment.
Figure 21:
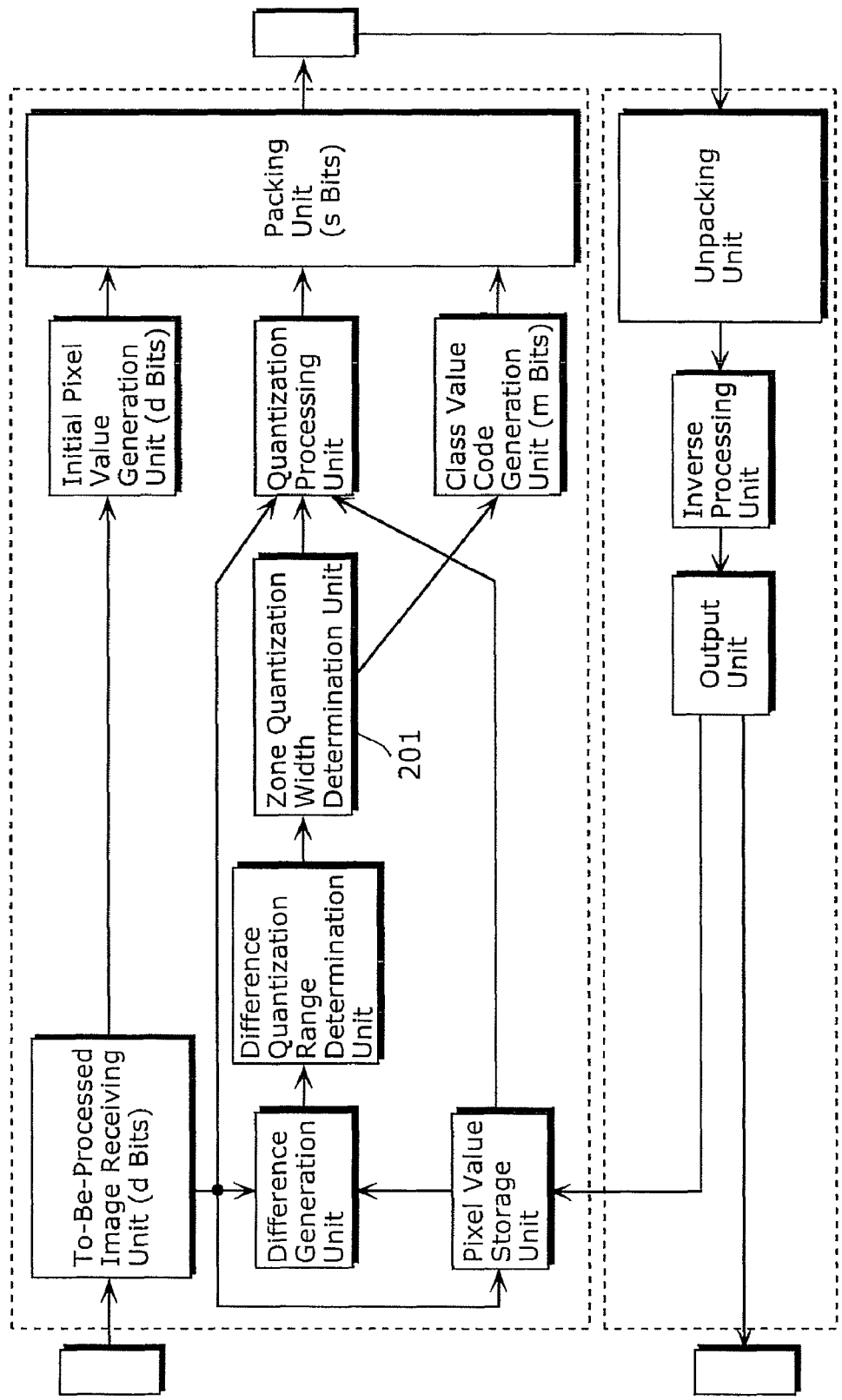
FIG. 21 is a diagram for explaining a conventional technology.
Figure 22:
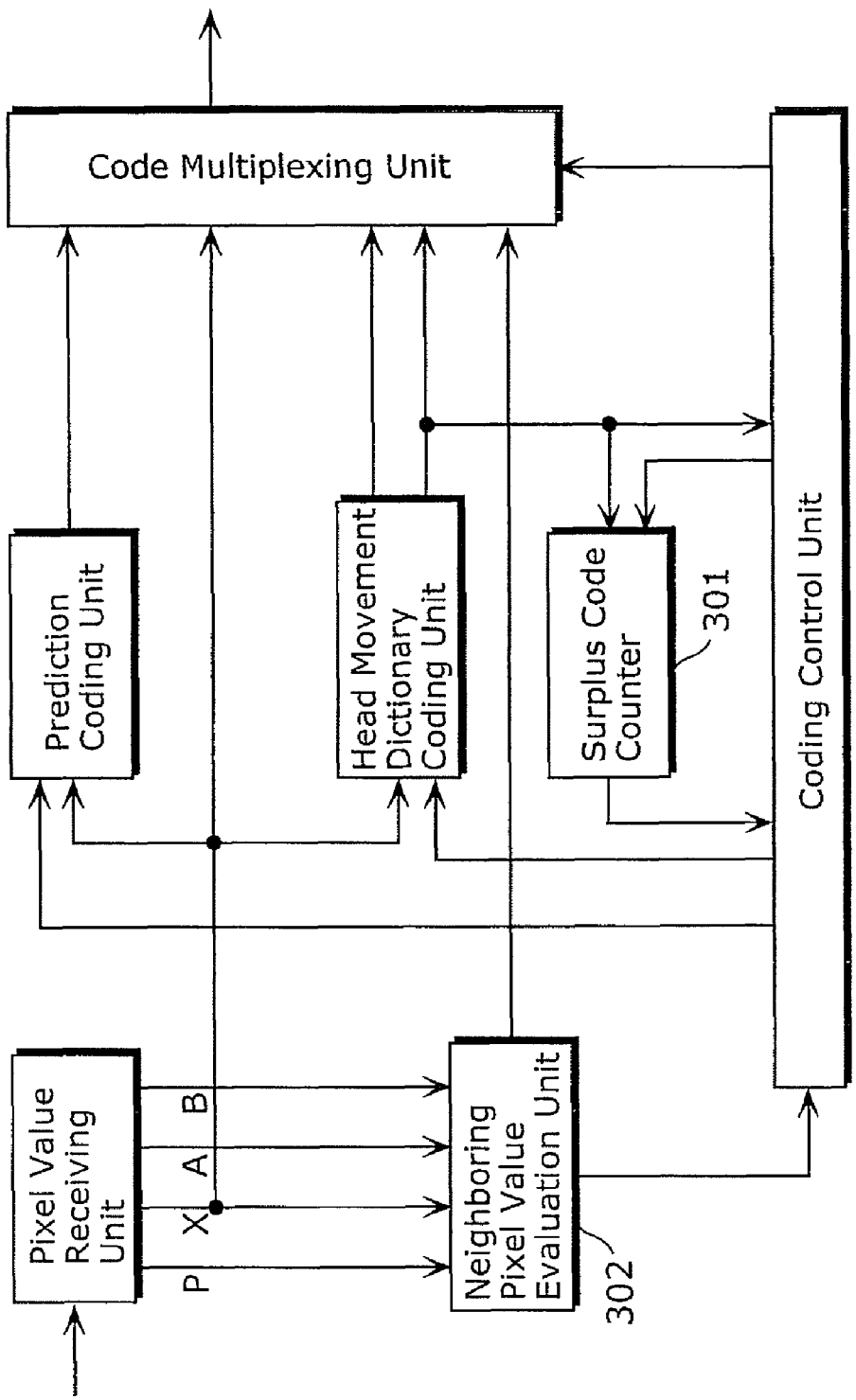
FIG. 22 is a diagram for explaining a conventional technology.

FIG. 20 is a diagram showing the personal computer 300 and the printer 4000 according to the fifth embodiment. As shown in FIG. 20, the personal computer 3000 includes the image coding device 100. The printer 4000 includes the image decoding device 110.

Recently, image indicated by image data to be printed includes various data such as characters, figures, and natural images, as seen in a poster, an advertisement, or the like. Regarding such image, when data of image indicating characters or a figure which is expressed by a single color is provided to the image coding device 100 in the personal computer 3000, there is a high possibility of causing surplus bits.

The image coding device 100 codes image by using the caused surplus bits. Thereby, it is possible to suppress quantization errors in the case where sharp concentration change, which results in a boundary between characters or figures and natural image, occurs in data having a fixed bit width.

It should also be noted that the embodiments disclosed above are merely exemplary in every aspect and do not limit the present invention. The scope of the present invention is indicated not by the above description but by the appended claims. Any modifications in the embodiments are intended to have the same meaning and be included within the scope of the claims.

INDUSTRIAL APPLICABILITY

The image coding device and the image decoding device according to the present invention can perform variable length coding in each transfer unit, which ensuring a fixed length of a bus width of data transfer of an integrated circuit. Thereby, the present invention allows an apparatus dealing image, such as digital still cameras, network cameras, and printers, to code and decode image data while preventing image quality deterioration, still keeping random accessibility. Therefore, the present invention is useful to deal with the recent increase of image data processing amount.

NUMERICAL REFERENCES 100, 100A image coding device
102 prediction value calculation unit
103 difference calculation unit
104, 114 quantization width setting unit
105, 115 surplus bit count unit
106 packing unit
107, 117 fixed bit width setting unit
108 quantization processing unit
109, 111 surplus bit control unit
110, 110A image decoding device
116 unpacking unit
118 inverse quantization processing unit
119 output unit
1300, 2000 digital still camera
1310, 1310A imaging unit
1312, 1312A imaging device
1320, 1320A image processing unit
3000 personal computer
4000 printer

What is claimed is:

1. An image coding device that codes image,
said image coding device performing coding processing for coding image,
the image including a plurality of pixels which are previously ordered,
the coding processing including:
when a digit number B of binary data of a difference value between (a) a value of a to-be-coded pixel that is a pixel to be coded and (b) a prediction value that is a value generated by predicting the value of the to-be-coded pixel is smaller than a predetermined bit number M, processing of coding the difference value corresponding to the digit number B smaller than M by leaving J surplus bit which are calculated by M−B; and
when the digit number B is greater than M and there are K surplus bit, processing of coding the difference value corresponding to the digit number B greater than M by using L surplus bit, where L≦K, and said image coding device generating pieces of coded data each having a predetermined coding amount, by performing processing for each of consecutive T pixels, where T≧2, among the plurality of pixels so as to perform the coding processing for each of U pixels, where U≦T, among the consecutive T pixels, wherein the pieces of coded data each having the predetermined coding amount are pieces of data necessary to reconstruct the image, and each of the pieces of coded data each having the predetermined coding amount is a piece of data necessary to reconstruct the corresponding T pixels.

2. The image coding device according to claim 1, comprising:

a setting unit configured to set the predetermined coding amount;

a prediction value calculation unit configured to calculate the prediction value by using a pixel value of at least one neighboring pixel of the to-be-coded pixel;

a difference calculation unit configured to calculate the difference value between the value of the to-be-coded pixel and the calculated prediction value;

a quantization width setting unit configured to set a quantization width value based on the digit number B of the binary data that expresses the calculated difference value by code-added binary number, the quantization width value being used in quantization of the difference value;

a bit count unit configured to increment a value of a bit counter indicating the number of the surplus bits when the digit number B is smaller than M, and decrement the value of the bit counter when the digit number B is greater than M; and a quantization processing unit configured to (i) update the value of the bit counter to be a value smaller than the quantization width value set by said quantization width setting unit when said bit count unit decrements the value of the bit counter, (ii) perform quantization processing for quantizing the difference value after the updating, and (iii) codes a value resulting from the quantization processing.

3. The image coding device according to claim 2, wherein said bit count unit is configured to set the value of the bit counter to "0", each time one piece of the coded data having the predetermined coding amount is generated.

4. The image coding device according to claim 2, wherein the value of the bit counter is a positive value equal to or greater than 0.

5. The image coding device according to claim 2, wherein a value of a surplus bit used by said quantization processing unit in the quantization processing is equal to or smaller than the quantization width value set by said quantization width setting unit.

6. The image coding device according to claim 2, wherein each of the pieces of coded data each having the predetermined coding amount includes: at least one piece of information indicating the quantization width value set by said quantization width setting unit; and at least one piece of data that is coded.

7. The image coding device according to claim 2, further comprising a surplus bit control unit configured to (i) calculate, prior to the coding processing, a difference between the prediction value and a value of every to-be-coded pixel to be included in each of the pieces of coded data each having the predetermined coding amount, (ii) measure an occurrence frequency of a prediction difference, and (iii) control surplus bits used in the coding processing so that local quantization errors are distributed within each of the pieces of coded data each having the predetermined coding amount.

8. The image coding device according to claim 2, further comprising a maximum use bit setting unit configured to control a surplus bit used in the coding, by designating a maximum number of the surplus bit available in coding of one to-be-coded pixel.

9. The image coding device according to claim 1, said image coding device generating U pieces of data by performing the coding processing for each of the U pixels among the consecutive T pixels, and said image coding device comprising a packing unit configured to generate the coded data having the predetermined coding amount including the U pieces of data, by using the generated U pieces of data.

10. The image coding device according to claim 1, wherein the coding processing is processing of (i) coding the difference value corresponding to the digit number B smaller than M when the digit number B is smaller than M, and (ii) coding the difference value corresponding to the digit number B greater than M by using the L surplus bit to have (M+L) bits when the digit number B is greater than M and there are the K surplus bit.

11. The image coding device according to claim 1, wherein a piece of pixel data indicating the value of the to-be-coded pixel is RAW data provided from an external imaging device.

12. The image coding device according to claim 1, wherein a piece of pixel data indicating the value of the to-be-coded pixel is one of luminance signal data and color difference signal data which are generated from RAW data provided from an external imaging device.

13. The image coding device according to claim 12, wherein, when a piece of pixel data indicating the value of the to-be-coded pixel is one of the luminance signal data and the color difference signal data, the color difference signal data is coded prior to the luminance signal data in processing of generating the coded data having the predetermined coding amount.

14. The image coding device according to claim 12, wherein, when a piece of pixel data indicating the value of the to-be-coded pixel is one of the luminance signal data and the color difference signal data, IQ axes conversion is performed on the color difference signal data to set the number of bits allocated to Q signal to be E, where E is a natural number smaller than M, so that F bit, where F is a natural number, which are calculated by M−E, are left as surplus bits, and the luminance signal data are coded by using the surplus bit.

15. The image coding device according to claim 12, wherein, when a piece of pixel data indicating the value of the to-be-coded pixel is one of the luminance signal data and the color difference signal data, IQ axes conversion is performed on the color difference signal data to set the number of bits allocated to Q signal to be E, where E is a natural number smaller than M, and the luminance signal data are coded by W bit, where W is a natural number greater than M, which are allocated to the luminance signal data.

16. The image coding device according to claim 1,
wherein a piece of pixel data indicating the value of the to-be-coded pixel is one of luminance signal data and color difference signal data which are generated by decompressing image data generated by Joint Photographic Experts Group (JPEG) standard.

17. A digital still camera comprising
the image coding device according to claim 1.

18. An imaging device comprising
the image coding device according to claim 1.

19. An image coding method of coding image, said image coding method comprising
performing coding processing for coding image,
wherein the image including a plurality of pixels which are previously ordered,
the coding processing including:
when a digit number B of binary data of a difference value between (a) a value of a to-be-coded pixel that is a pixel to be coded and (b) a prediction value that is a value generated by predicting the value of the to-be-coded pixel is smaller than a predetermined bit number M, processing of coding the difference value corresponding to the digit number B smaller than M by leaving J surplus bit which are calculated by M−B; and
when the digit number B is greater than M and there are K surplus bit, processing of coding the difference value corresponding to the digit number B greater than M by using L surplus bit, where $L \leq K$, and
said image coding method further comprising
generating pieces of coded data each having a predetermined coding amount, by performing processing for each of consecutive T pixels, where $T \geq 2$, among the plurality of pixels so as to perform the coding processing for each of U pixels, where $U \leq T$, among the consecutive T pixels,
wherein the pieces of coded data each having the predetermined coding amount are pieces of data necessary to reconstruct the image, and
each of the pieces of coded data each having the predetermined coding amount is a piece of data necessary to reconstruct the corresponding T pixels.

20. The image coding method according to claim 19, said image coding method further comprising
setting the predetermined coding amount;
calculating the prediction value by using a pixel value of at least one neighboring pixel of the to-be-coded pixel;
calculating the difference value between the value of the to-be-coded pixel and the calculated prediction value;
setting a quantization width value based on the digit number B of the binary data that expresses the calculated difference value by code-added binary number, the quantization width value being used in quantization of the difference value;
incrementing a value of a bit counter indicating the number of the surplus bits when the digit number B is smaller than M, and decrementing the value of the bit counter when the digit number B is greater than M; and
(i) updating the value of the bit counter to be a value smaller than the quantization width value set in said setting when said bit count unit decrements the value of the bit counter, (ii) performing quantization processing for quantizing the difference value after the updating, and (iii) coding a value resulting from the quantization processing.

* * * * *